(12) United States Patent
Volin

(10) Patent No.: US 10,980,219 B2
(45) Date of Patent: Apr. 20, 2021

(54) DRAW-RAMP EGG-TEETER-TOTTER WILD-ANIMAL-SHIELD CHICKEN COOP, HAVING EASY-ACCESS VENTILATED ROOSTING SYSTEM, AUTOMATIC-EGG-COLLECTING-AND-INDICATING-TEETER-TOTTER NESTING SYSTEM, CABLE DRAW-RAMP SYSTEM, AUTOMATIC-HOOK SLIDING-DOOR SYSTEM, EASY-ACCESS PIVOTABLE FEEDER-AND-WATER SYSTEM, EXTENDABLE CHICKEN-RUN SYSTEM, ANTI-PUSHING ANTI-GROWING ANTI-DIGGING ANTI-ROTTING SHIELD SYSTEMS, AND AUTOMATIC-RELATCHING-TWISTABLE-COMPRESSABLE-SPRING LATCH SYSTEMS

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 333 days.

(21) Appl. No.: 16/274,262

(22) Filed: Feb. 13, 2019

(65) Prior Publication Data
US 2019/0254261 A1    Aug. 22, 2019

Related U.S. Application Data

(60) Provisional application No. 62/633,079, filed on Feb. 21, 2018.

(51) Int. Cl.
*A01K 31/16* (2006.01)
*A01K 31/18* (2006.01)
(Continued)

(52) U.S. Cl.
CPC ............ *A01K 31/165* (2013.01); *A01K 31/18* (2013.01); *A01K 31/04* (2013.01); *A01K 31/10* (2013.01); *A01K 31/20* (2013.01); *A01M 29/30* (2013.01)

(58) Field of Classification Search
CPC .............................. A01K 31/165; A01K 31/18
See application file for complete search history.

(56) References Cited

U.S. PATENT DOCUMENTS

| 3,124,102 A | 3/1964 | Kurtz |
| 3,650,246 A | 3/1972 | Fowler |

(Continued)

*Primary Examiner* — Jessica B Wong

(57) ABSTRACT

A draw-ramp egg-teeter-totter wild-animal-shield chicken coop, comprising: a first and a second and a third and a fourth roosting walls attached to one another, a roosting roof attached to the first and the second and the third and the fourth roosting wall, a passage opening formed in the fourth roosting wall, a first nesting wall attached to the third roosting wall along the opposite passage-opening edges, a second nesting wall attached to the first nesting wall, a third nesting wall attached to the second nesting wall, a slanted nesting floor attached to the first nesting wall and the third nesting wall, a teeter-totter axle attached to the slanted nesting floor, an automatic egg-collecting teeter-totter seesawingly attached to the teeter-totter axle, an automatic egg-laying indicator attached to one of the two opposite teeter-totter ends, a teeter-totter-angle-adjusting screw threadedly attached to another one of the two opposite teeter-totter ends, a draw-ramp opening formed in the first roosting wall, two rails respectively attached to the first roosting wall along the top and the bottom of the draw-ramp opening edges, a sliding door slidably attached to and between the two rails, a door rod attached to the sliding door, a door-rod handle attached to the door rod, an automatic spring-loaded handle hook seesawingly attached to the door-rod handle, a handle-hook ring attached to the second roosting wall, a plurality of wall panels respectively attached to one another or the first roosting wall or the second roosting wall or the third roosting wall or the fourth roosting wall, a door panel hinged to one of the wall panels, a (Continued)

latch-tip brace attached to one of the wall panels, a latch-body brace attached to the door panel, a C-shaped cut-out formed in the latch-body brace, a latch pivotably and slidably attached to the latch-body brace, a latch lever molded to the latch, a spring housing molded to the latch-body brace, an automatic-relatching twistable compressable spring attached to the latch at one of the two opposite spring ends and attached to the spring housing at another one of the two opposite spring ends, a wire-strengthening anti-pushing vertical shield positioned on the inside of the chicken coop against the wall panels and the door panel, a panel-strengthening anti-growing anti-digging horizontal shield molded to the wire-strengthening anti-pushing vertical shield and positioned under the wall panels or the door panel, a plurality of wire-panel-coupling hooks respectively molded on or formed on the wire-strengthening anti-pushing vertical shield, a plurality of panel-raising anti-rotting ridges respectively molded on or formed on the wire-strengthening anti-pushing vertical shield and the panel-strengthening anti-growing anti-digging horizontal shield, a plurality of water-evaporation-inducing alleys respectively formed between the panel-raising anti-rotting ridges, and a plurality of water-draining holes respectively drilled in or formed in the wire-strengthening anti-pushing vertical shield or the panel-strengthening anti-growing anti-digging horizontal shield.

20 Claims, 43 Drawing Sheets

(51) Int. Cl.
  *A01K 31/10* (2006.01)
  *A01K 31/20* (2006.01)
  *A01M 29/30* (2011.01)
  *A01K 31/04* (2006.01)

(56) References Cited

U.S. PATENT DOCUMENTS

| | | | |
|---|---|---|---|
| 3,867,903 A * | 2/1975 | Fleshman | A01K 31/17 119/455 |
| 3,941,091 A * | 3/1976 | Fleshman | A01K 31/17 119/457 |
| 3,993,026 A | 11/1976 | Shreckhise | |
| 4,188,911 A | 2/1980 | Rafaely | |
| 4,364,332 A | 12/1982 | Smith | |
| 4,463,705 A * | 8/1984 | Bressler | A01K 31/16 119/336 |
| 4,516,532 A | 5/1985 | Rafaeli | |
| 4,653,430 A | 3/1987 | Mass | |
| 4,791,884 A | 12/1988 | Cassuto | |
| 5,222,459 A | 6/1993 | Johnson | |
| 5,282,440 A | 2/1994 | Hostetler | |
| 5,660,145 A | 8/1997 | Rumbaugh | |
| 5,740,763 A | 4/1998 | Hollingsworth | |
| 5,996,530 A | 12/1999 | Miller | |
| 6,305,327 B1 | 10/2001 | Bounds, Jr. | |
| 6,349,672 B1 | 2/2002 | Daffi | |
| 6,412,439 B1 | 7/2002 | Otto-Lubker | |
| 6,571,732 B2 | 6/2003 | Hight | |
| 7,047,904 B2 | 5/2006 | Smith | |
| 7,107,932 B2 | 9/2006 | Cole | |
| 7,111,584 B2 | 9/2006 | Wang | |
| 7,681,526 B2 | 3/2010 | Roes | |
| 7,958,849 B2 | 6/2011 | Tsubai | |
| 7,958,850 B2 | 6/2011 | Tsubai | |
| 8,020,519 B2 | 9/2011 | Stamper | |
| 8,141,517 B2 | 3/2012 | Shimoda | |
| 8,550,034 B2 | 10/2013 | Potter | |
| D719,704 S | 12/2014 | Lee | |
| 8,910,594 B2 | 12/2014 | Kuking | |
| D734,570 S | 7/2015 | Hawk | |
| 9,226,482 B2 | 1/2016 | Cardaropoli | |
| 9,374,981 B2 | 6/2016 | Powers | |
| 9,376,781 B2 | 6/2016 | Staller | |
| D767,215 S | 9/2016 | Lalonde | |
| 9,504,234 B2 | 11/2016 | Rust | |
| 9,551,149 B1 | 1/2017 | Scott | |
| 9,635,832 B2 | 5/2017 | Link | |
| 9,635,833 B2 | 5/2017 | Oeltjen | |
| 9,820,472 B2 | 11/2017 | Bussema | |
| D804,737 S | 12/2017 | Fisher | |
| 2004/0144326 A1 | 7/2004 | Smith | |
| 2015/0122191 A1 | 5/2015 | Rust | |
| 2015/0122193 A1 * | 5/2015 | Rust | A01K 31/17 119/334 |
| 2018/0007870 A1 | 1/2018 | Finco | |
| 2018/0310530 A1 | 11/2018 | Lockstedt | |

* cited by examiner

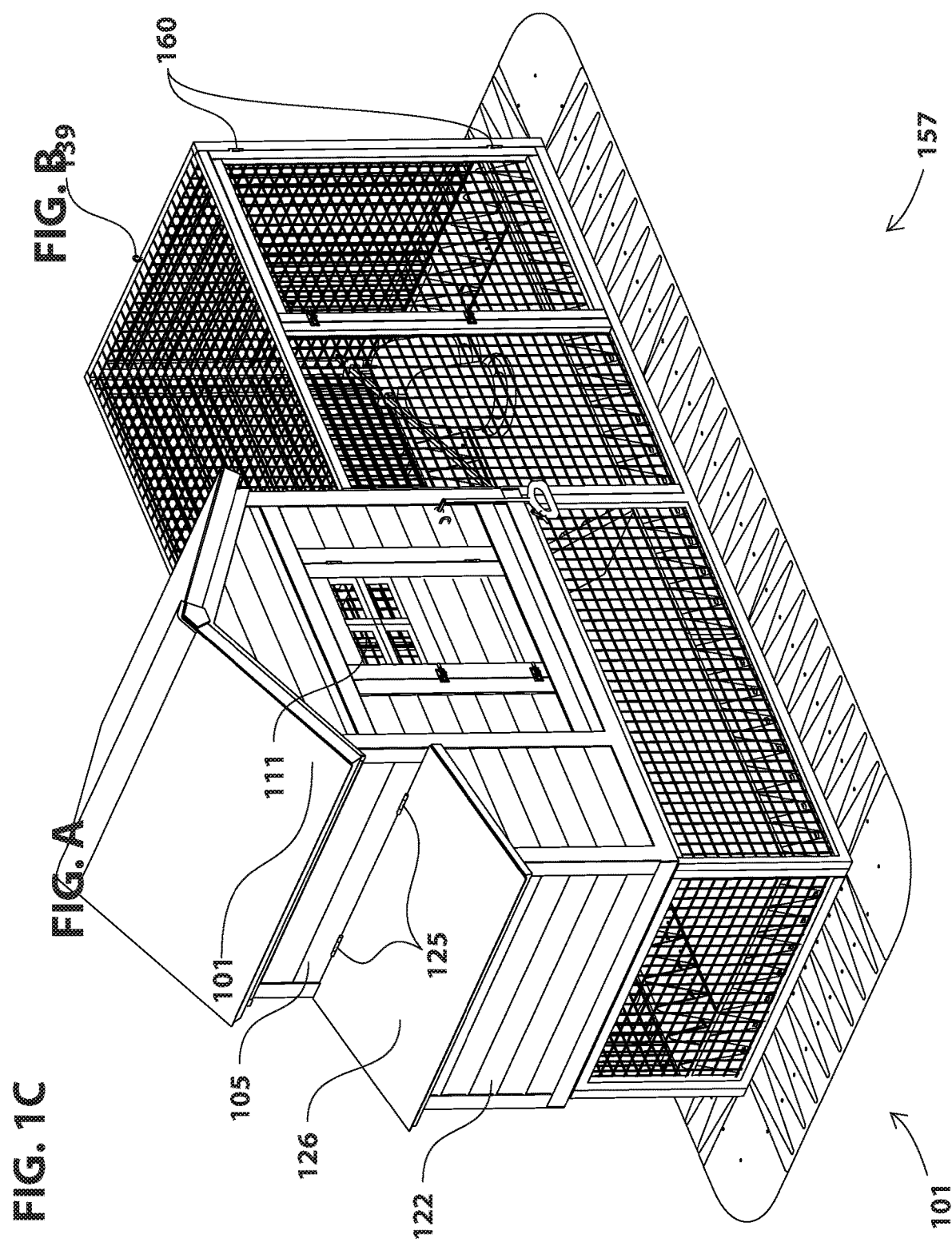

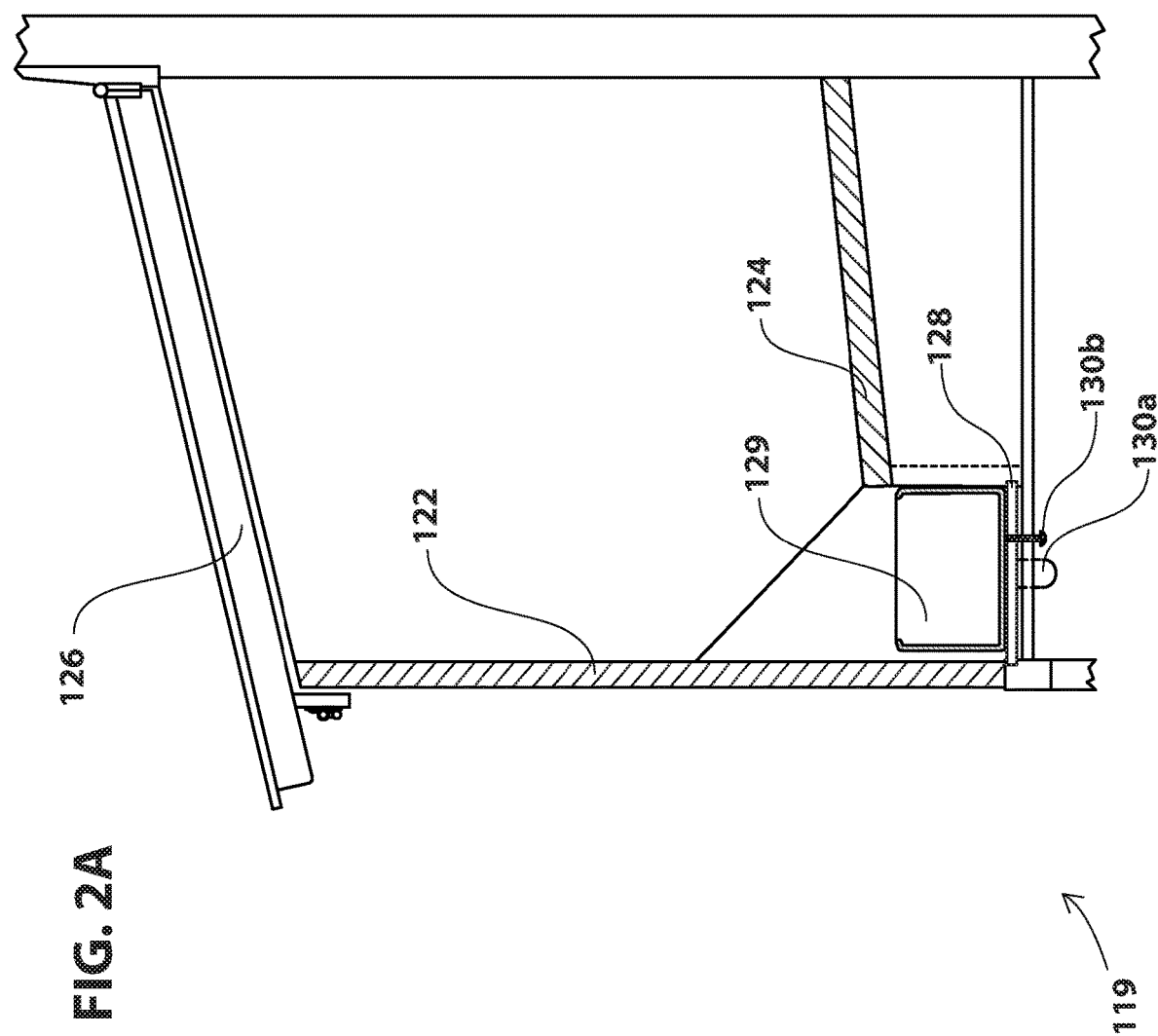

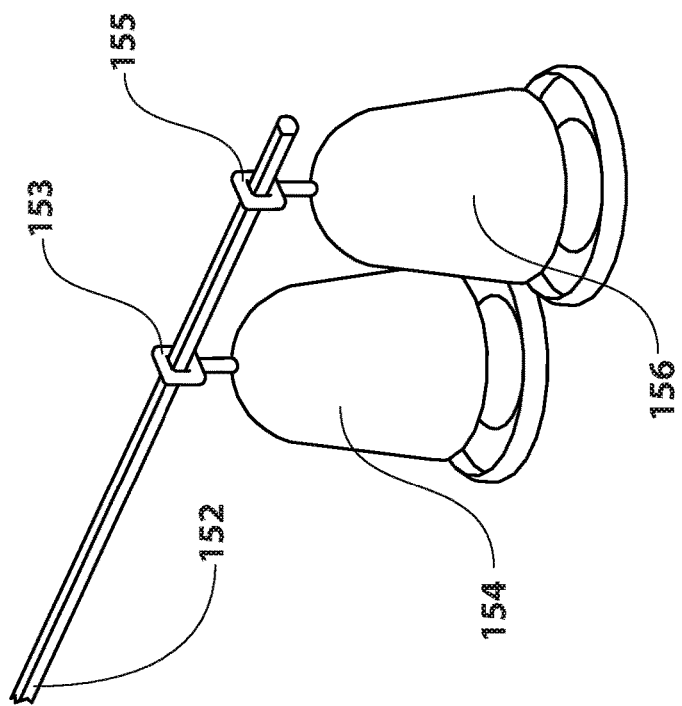
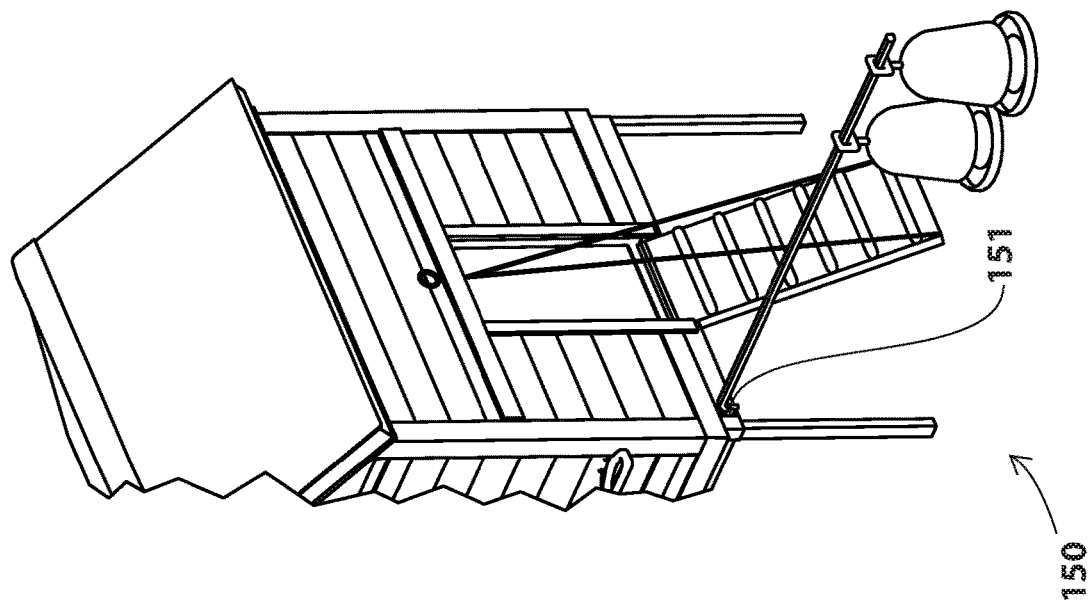
FIG. 6A
FIG. 6B

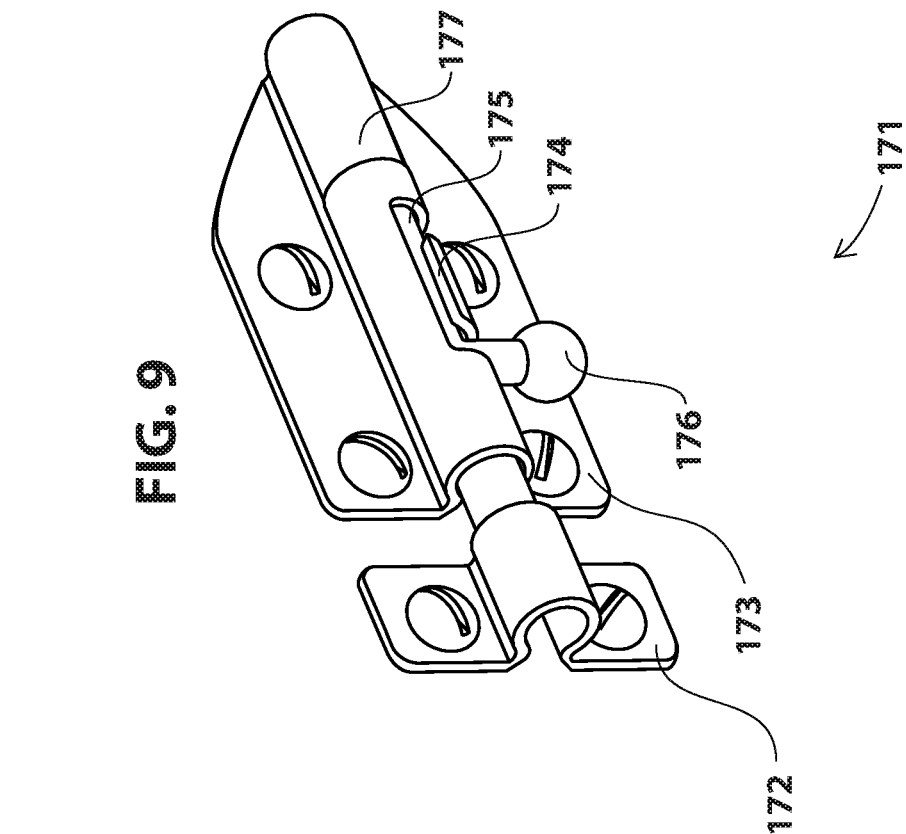
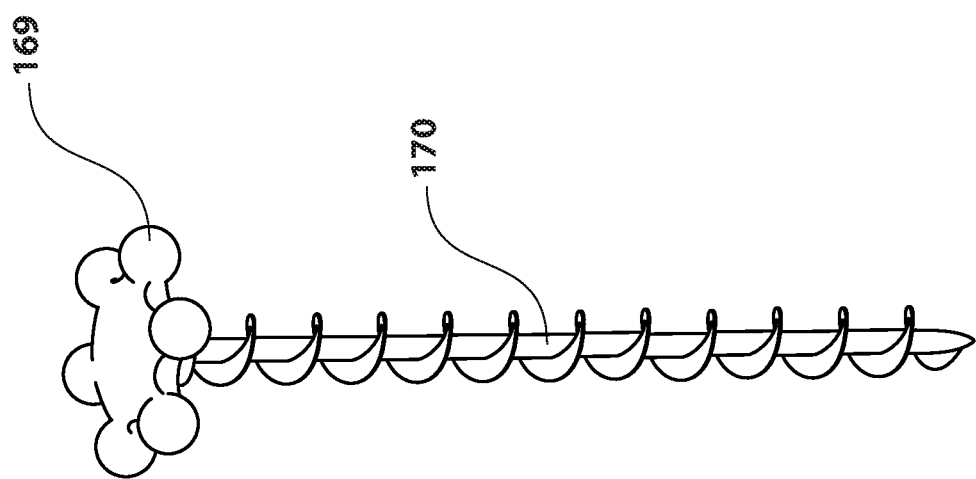

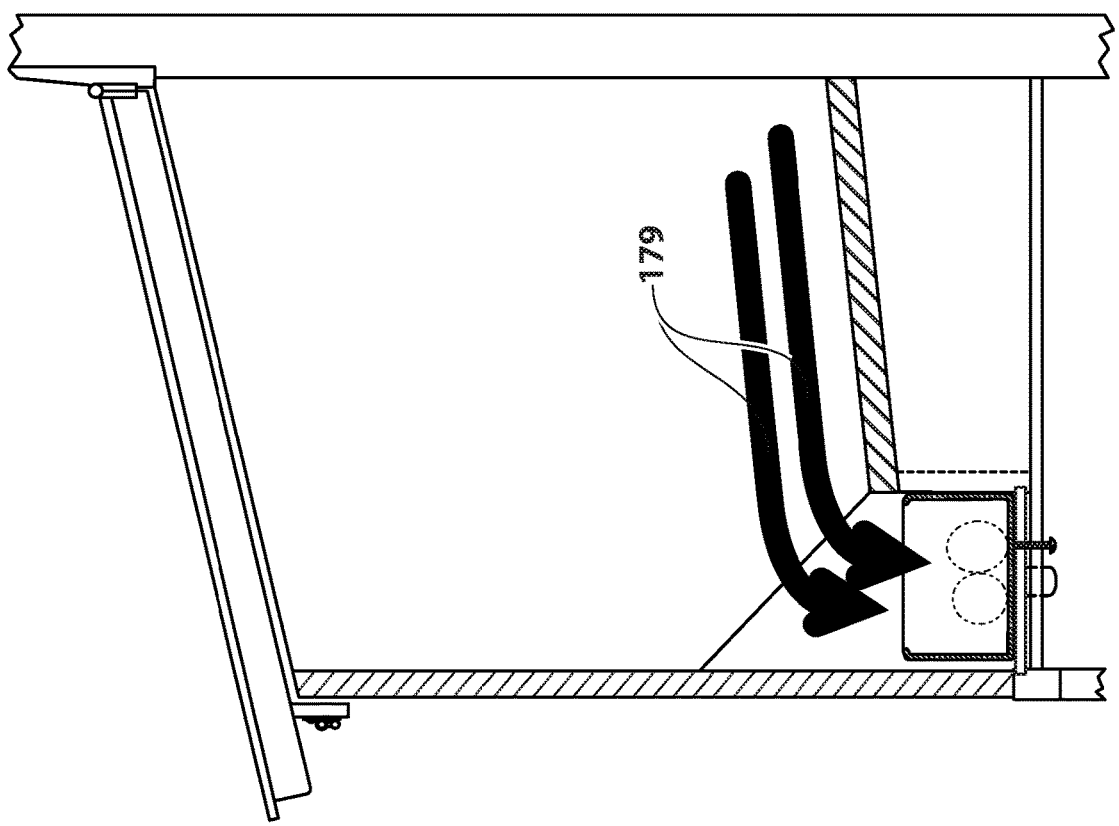

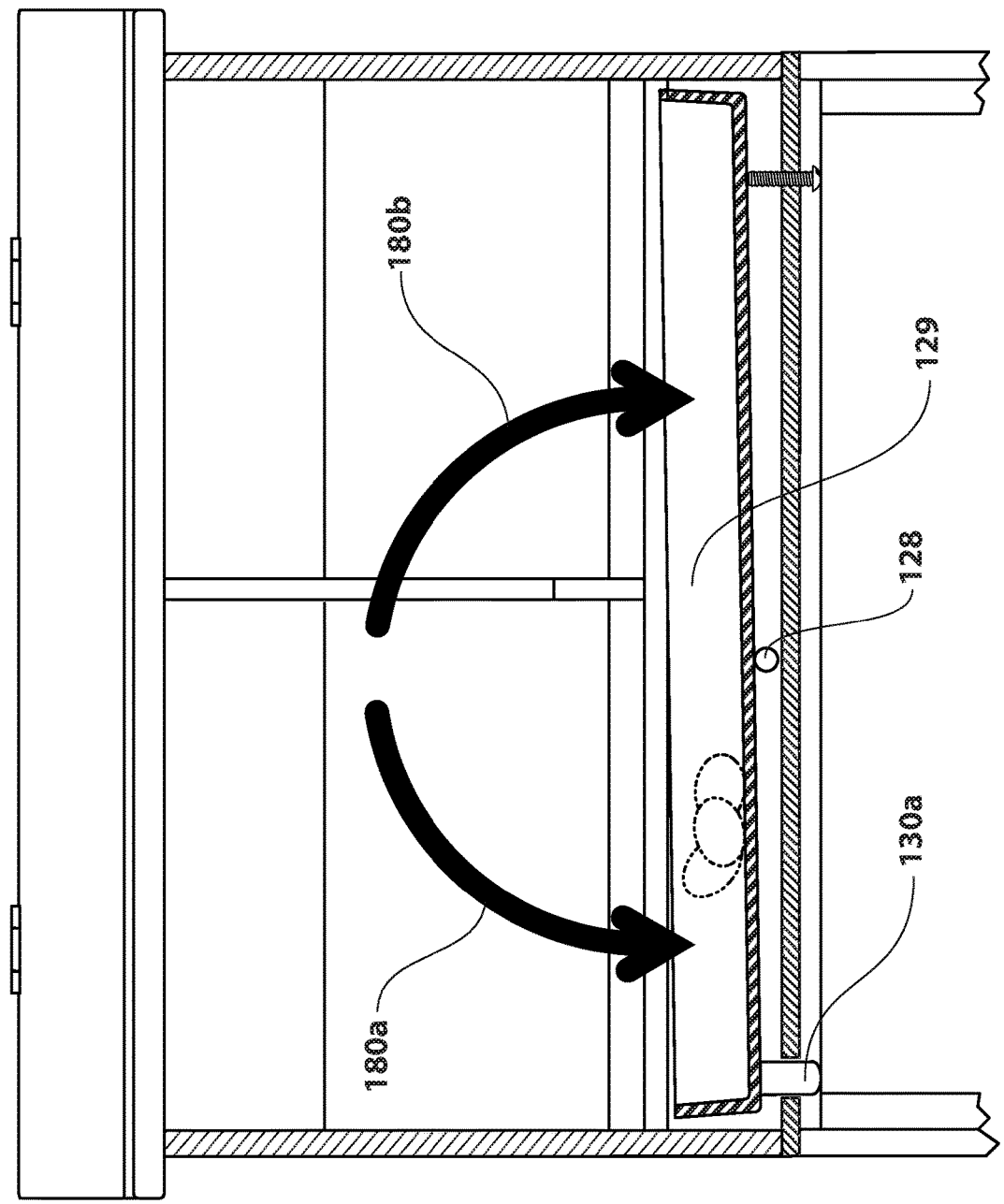

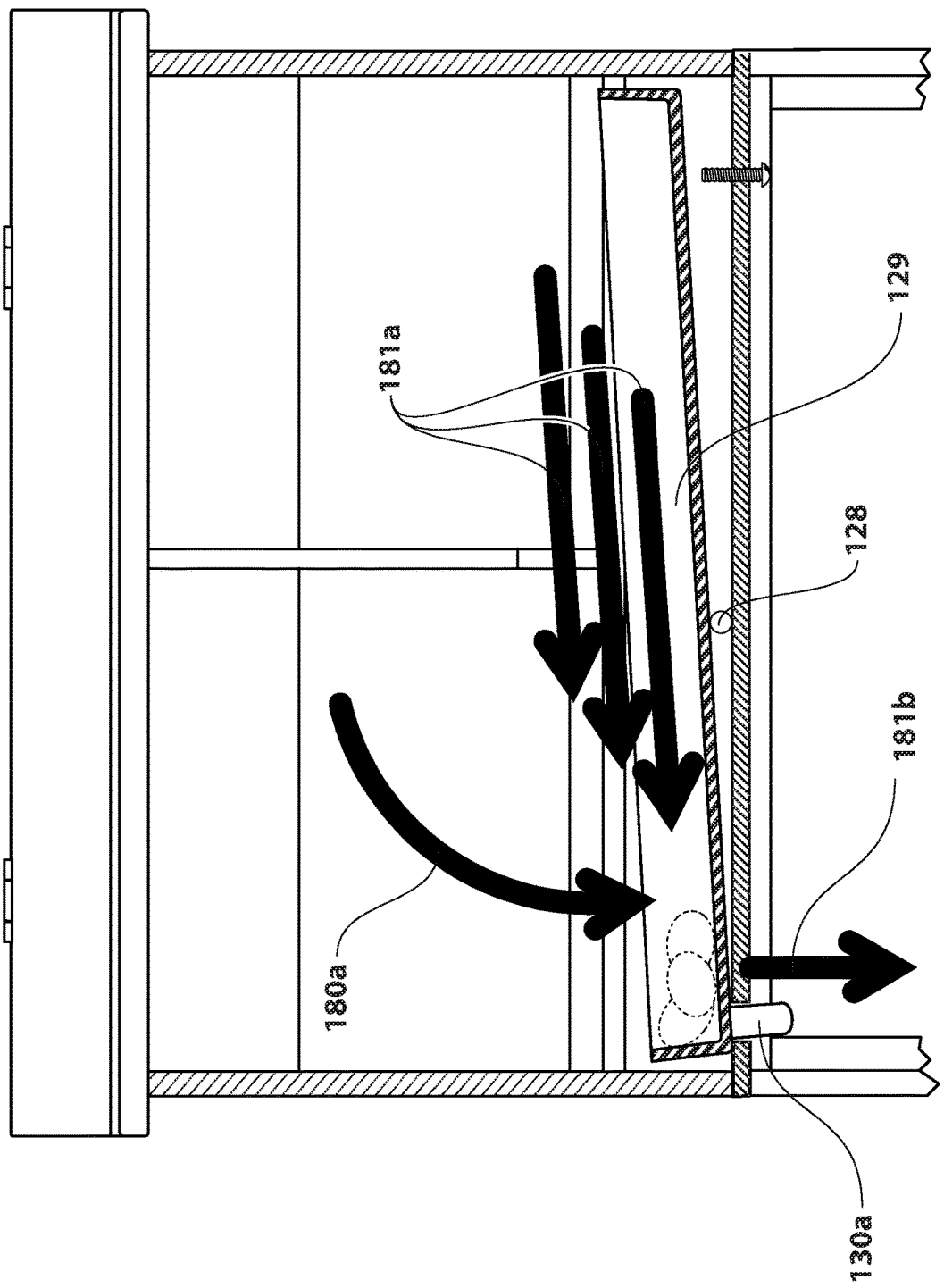

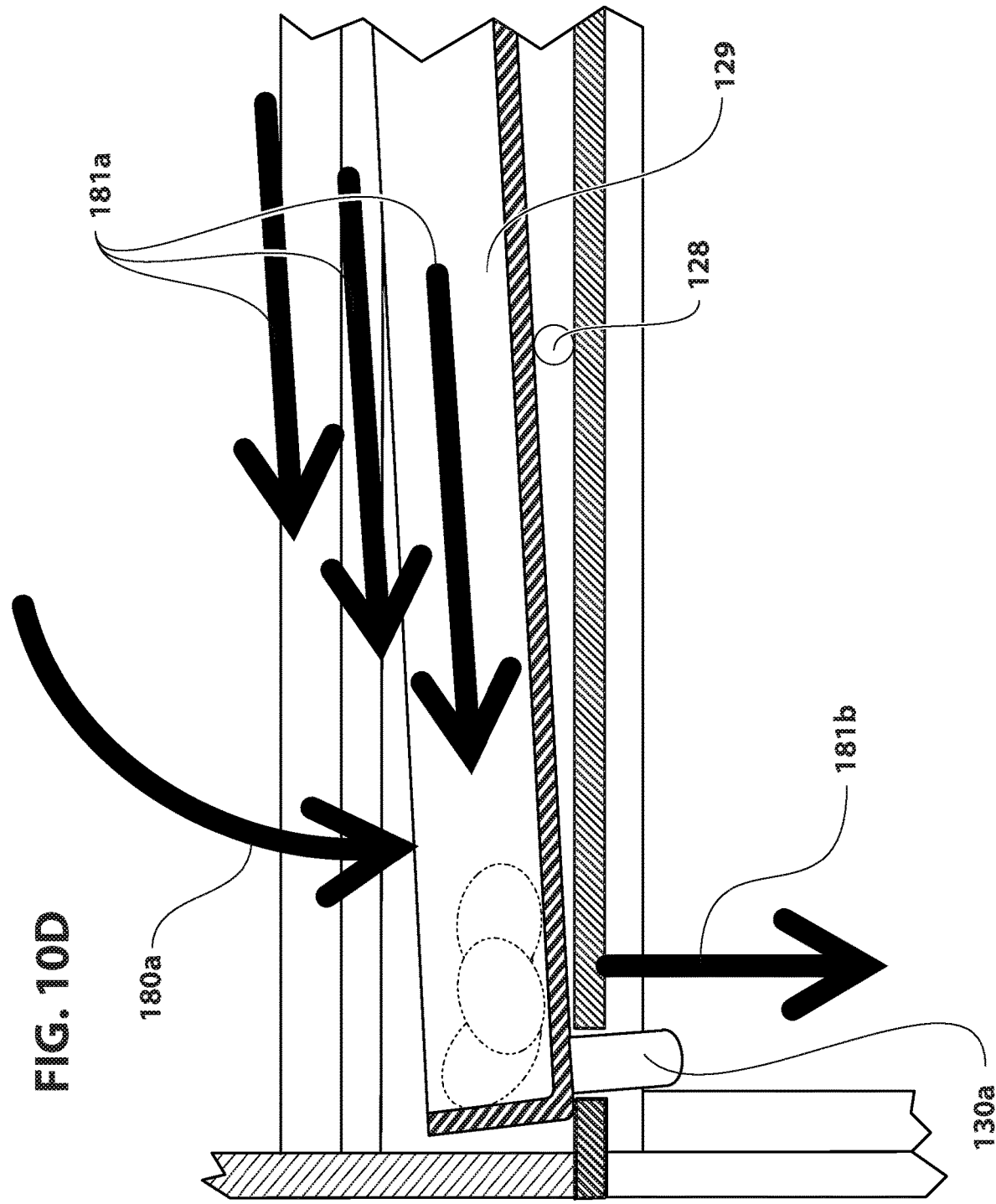

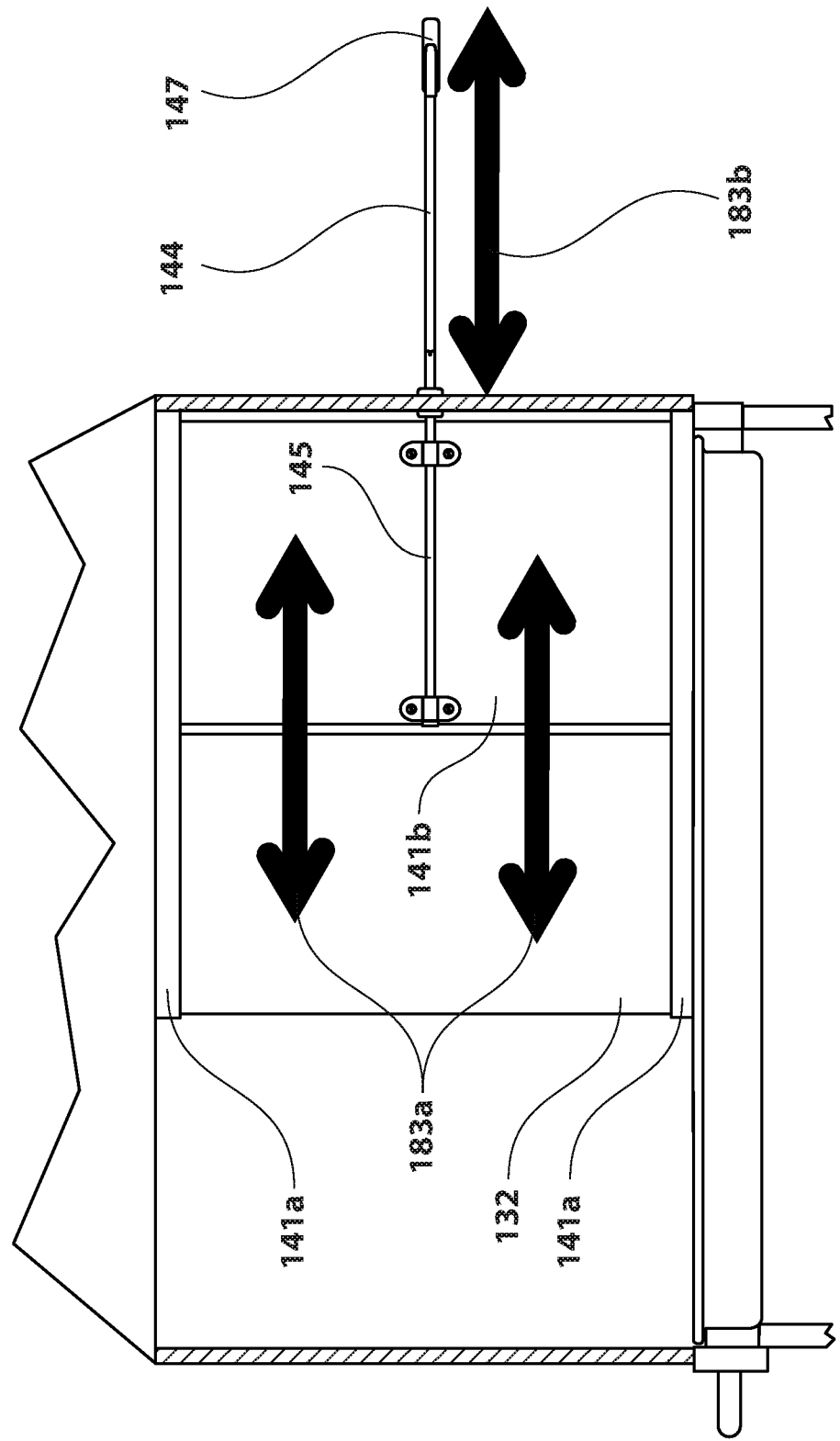

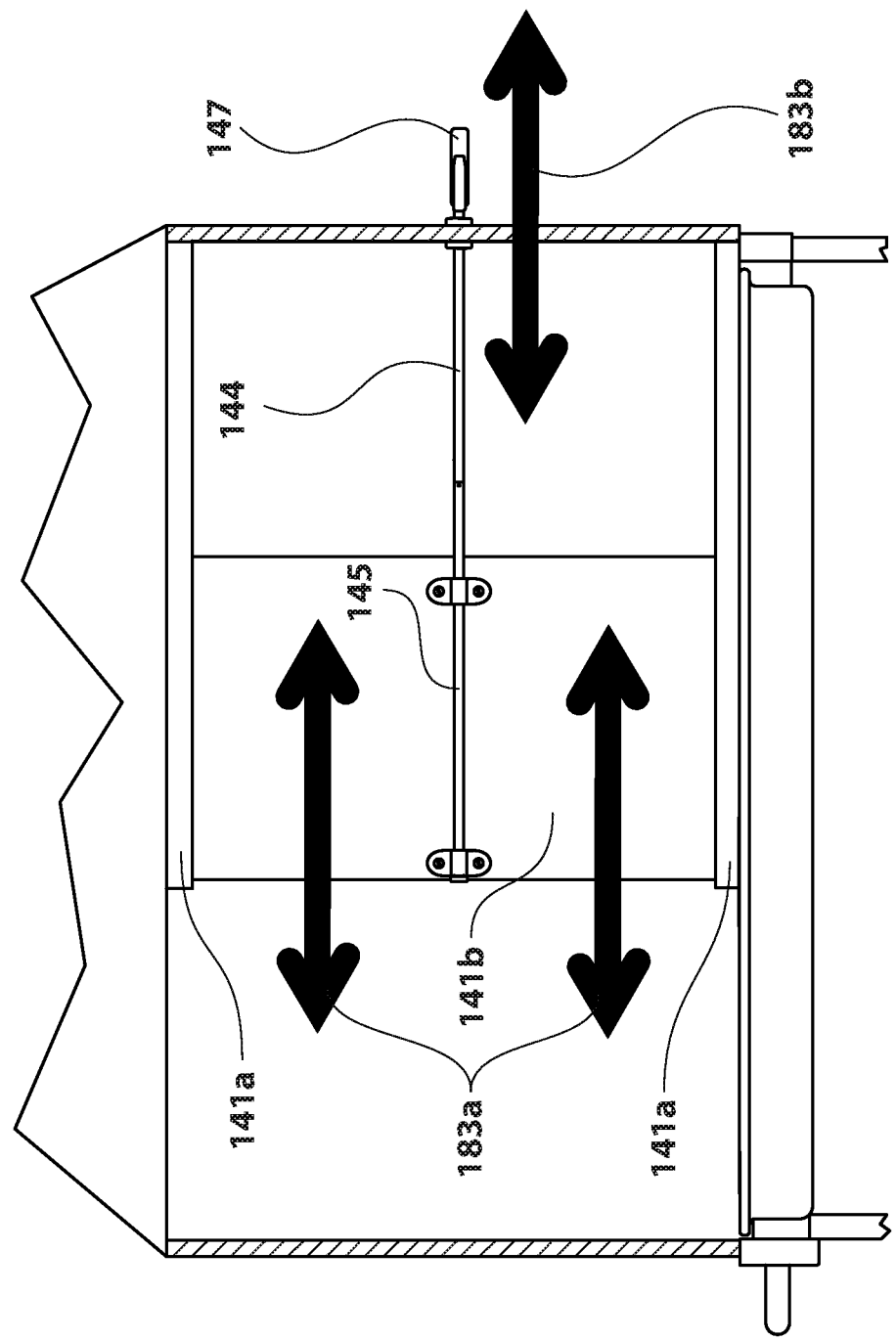

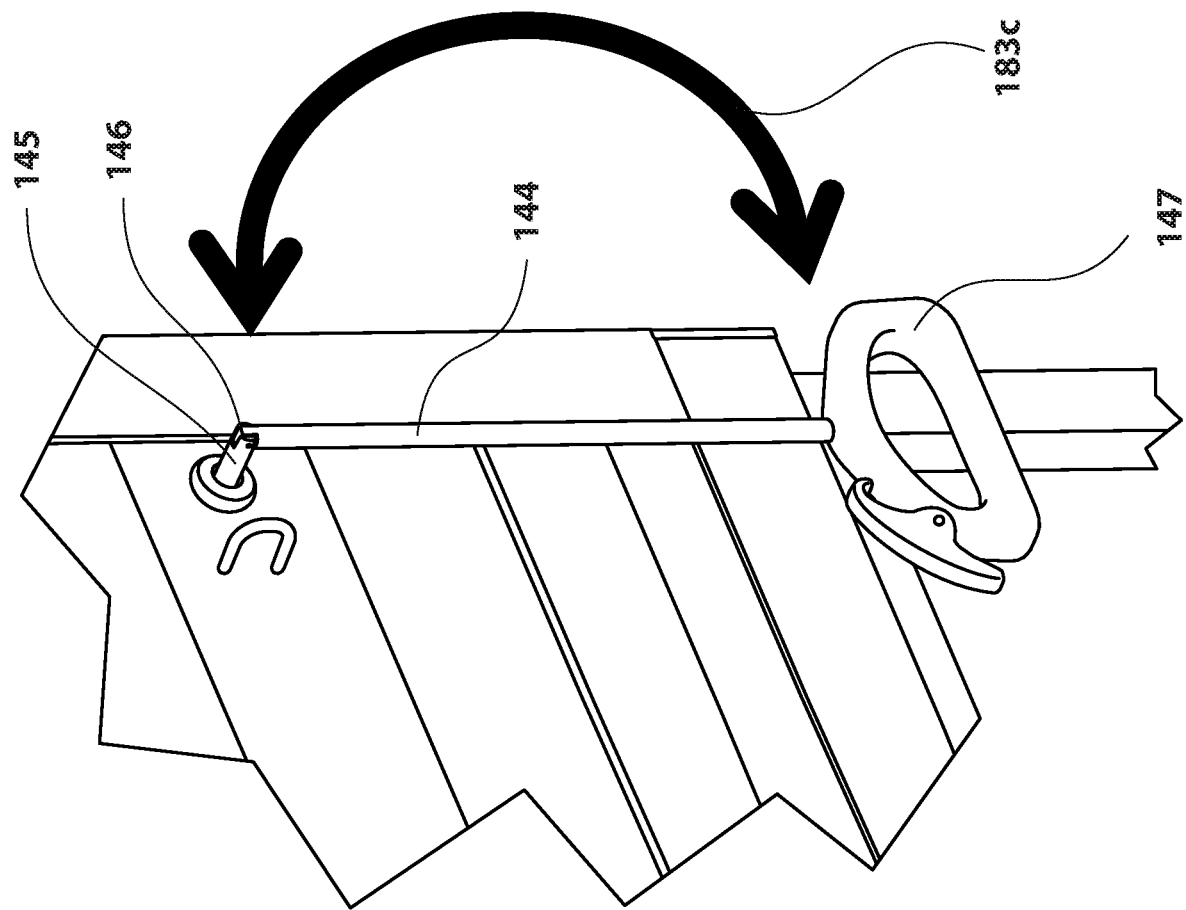

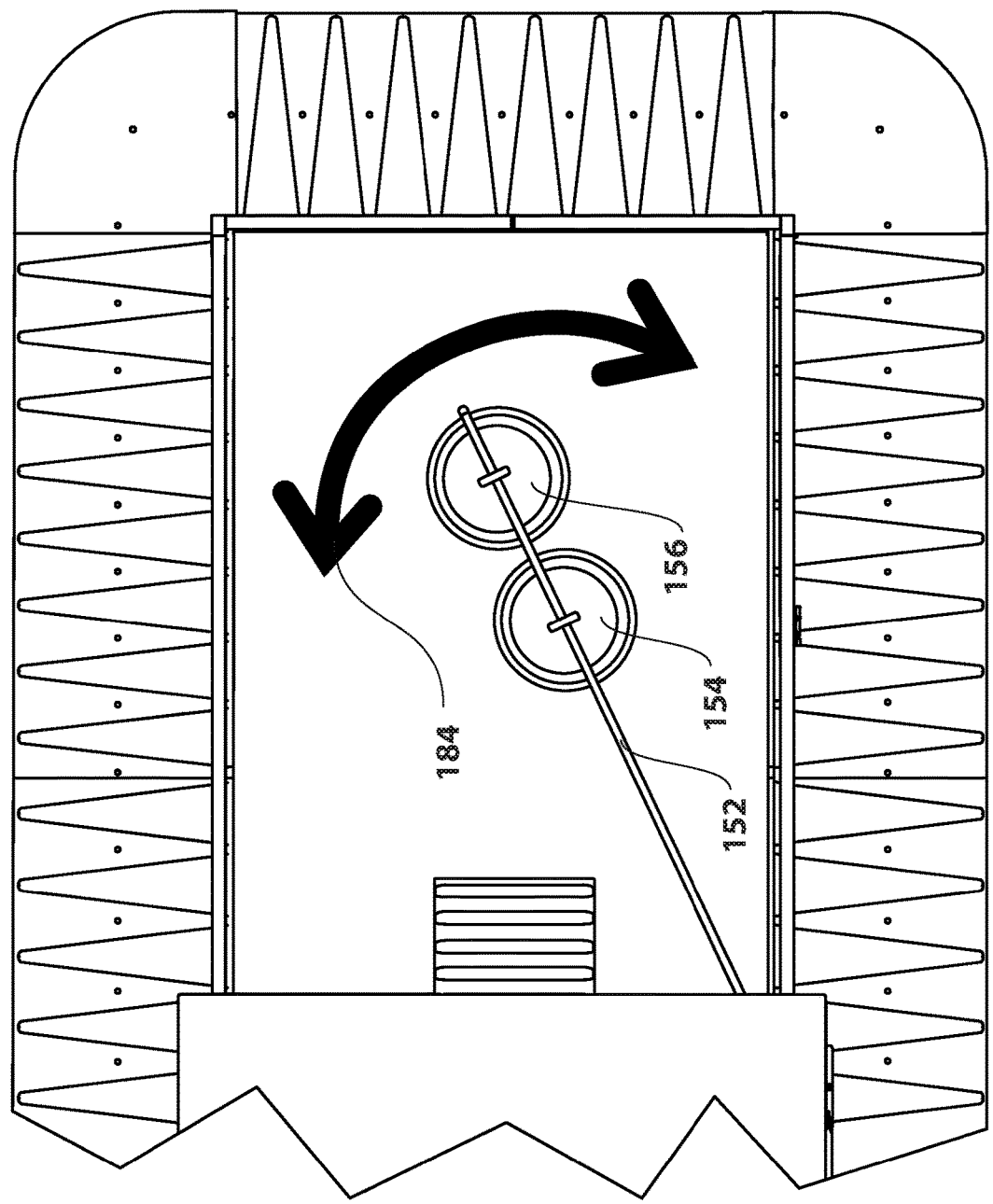

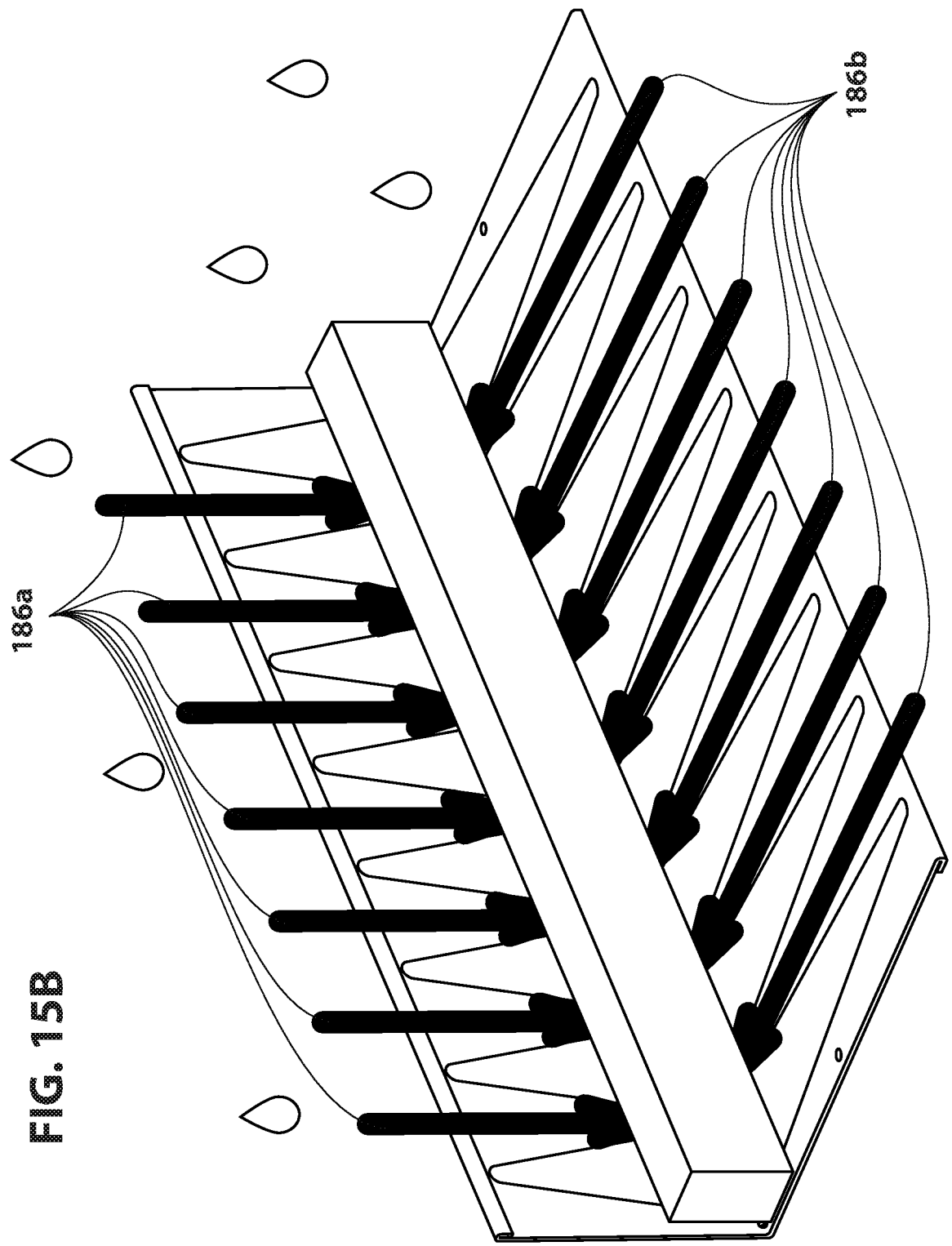

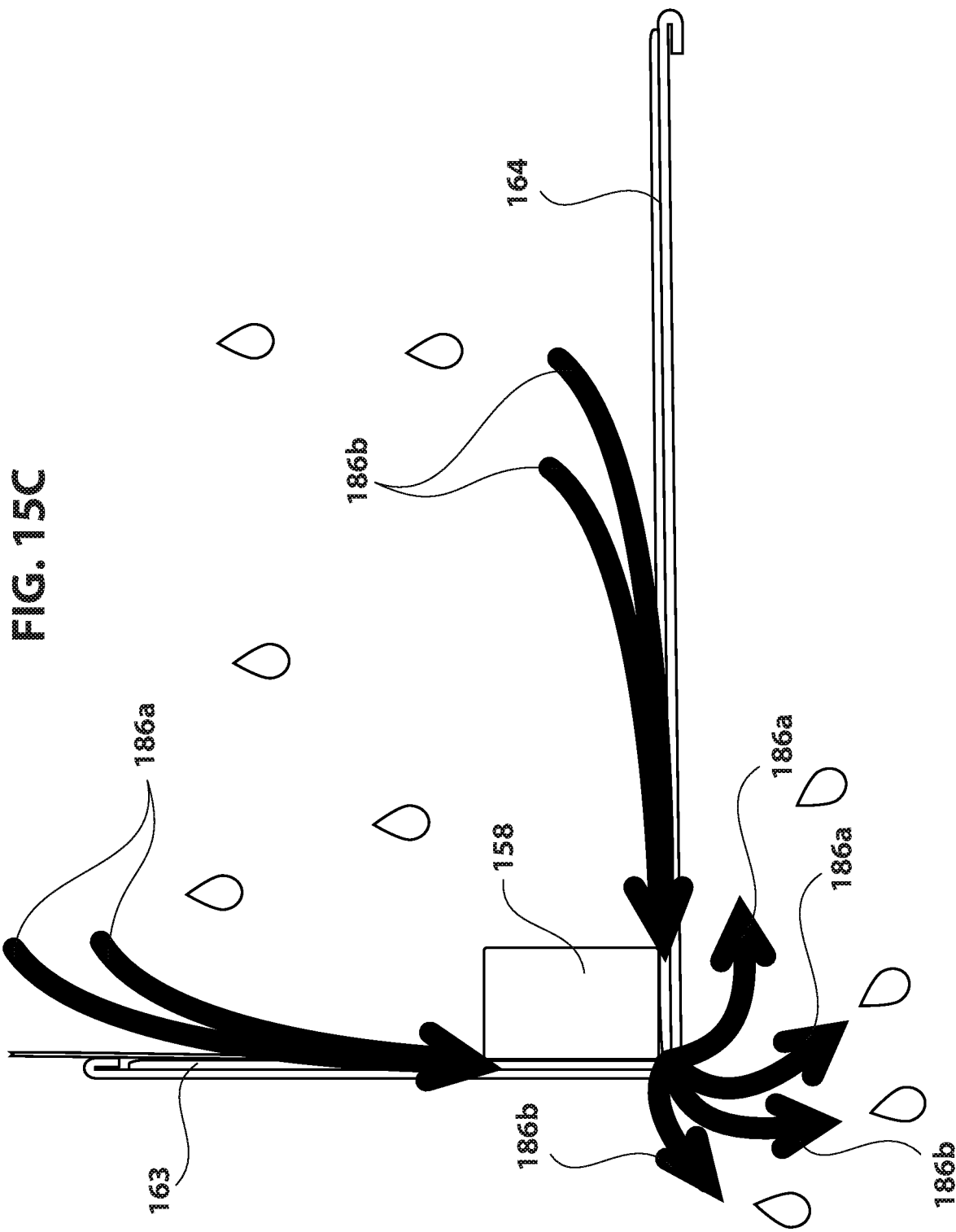

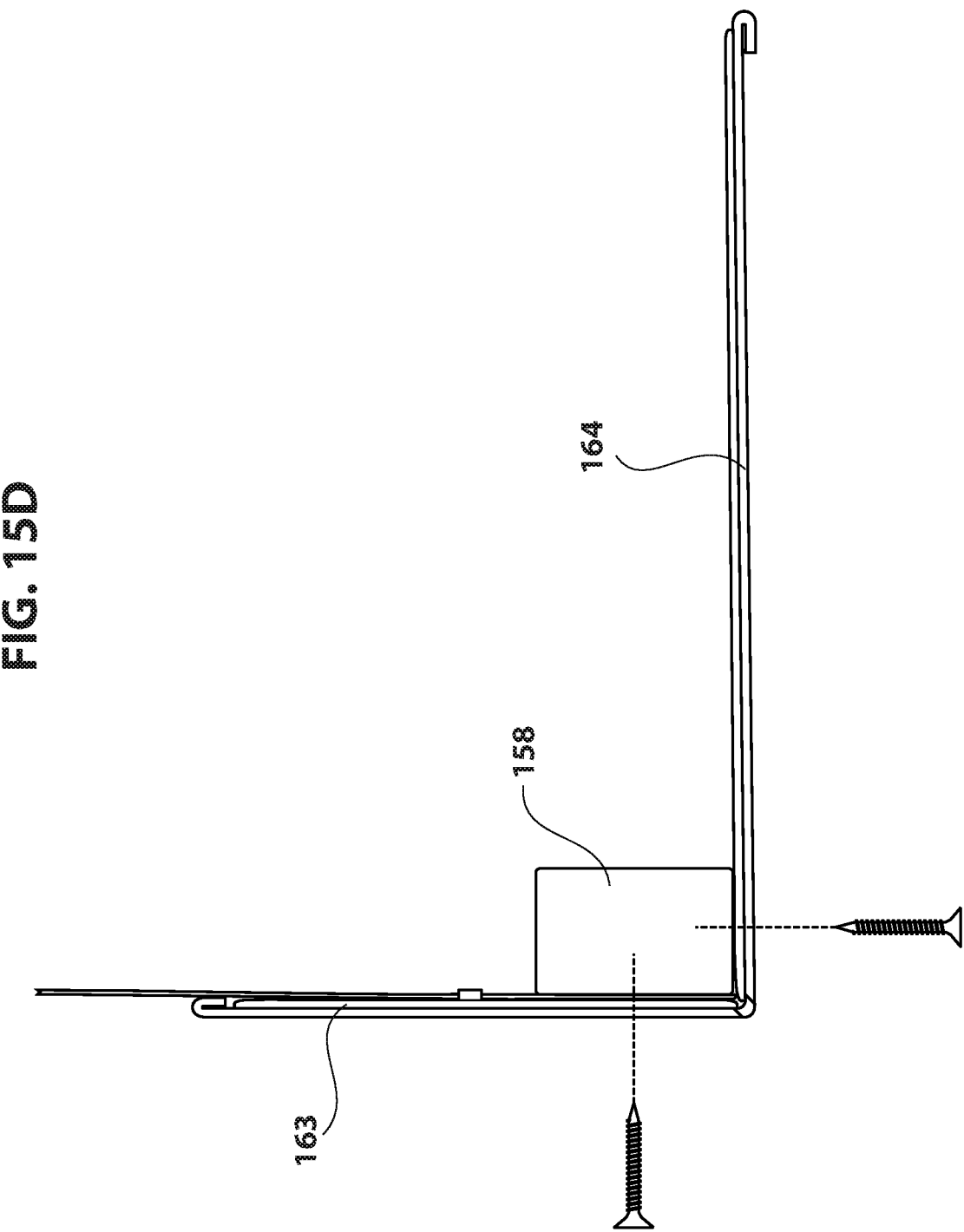

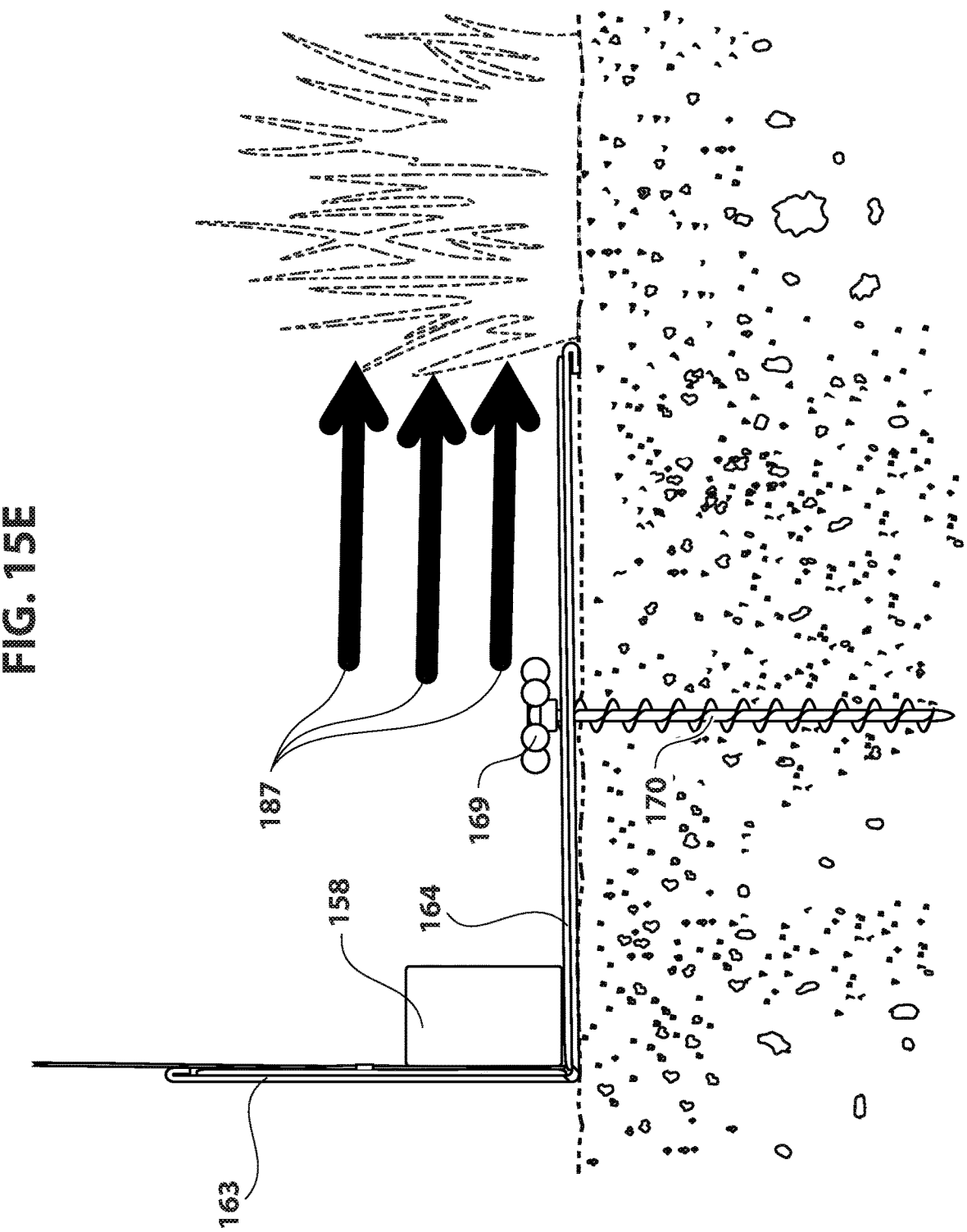

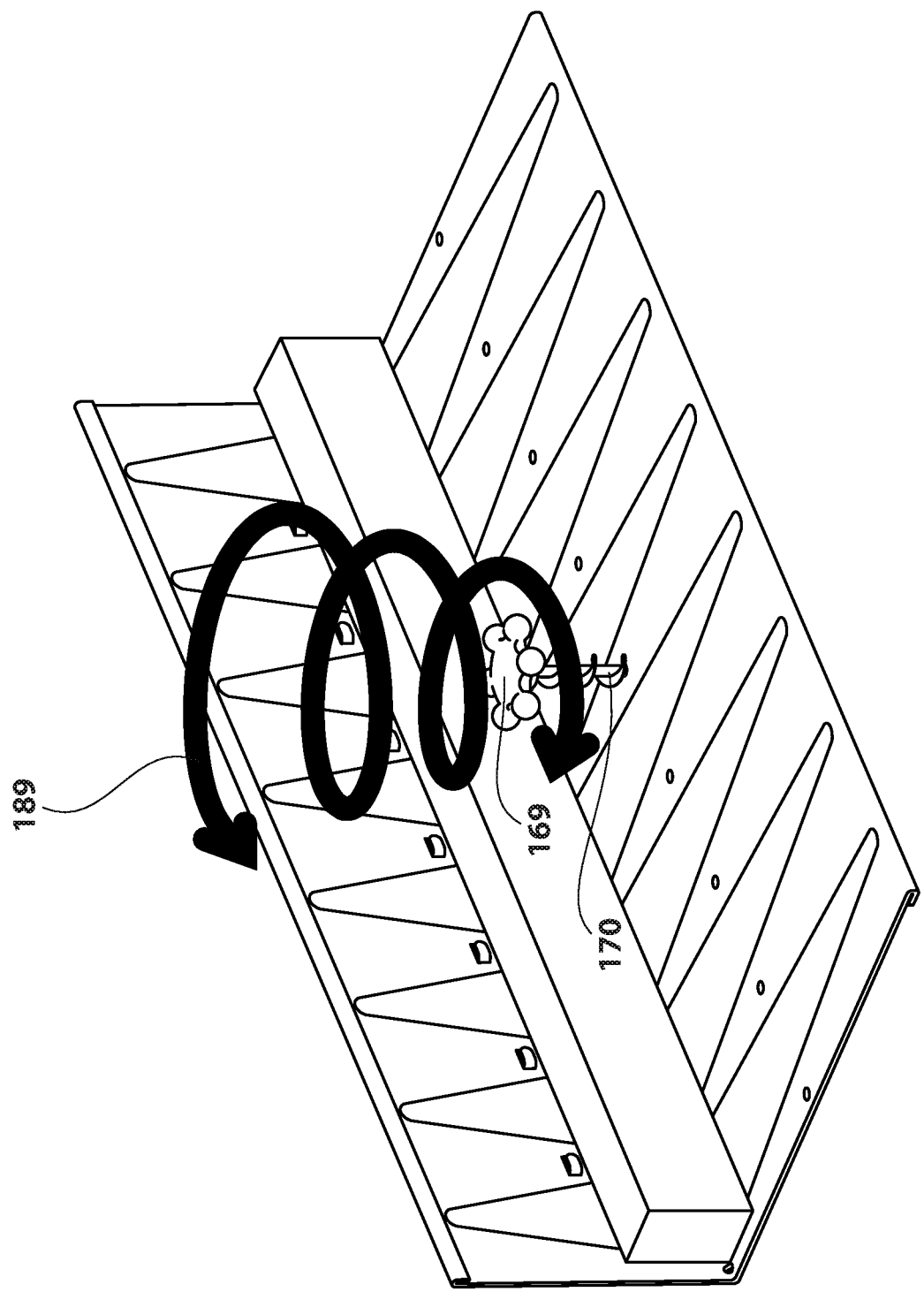

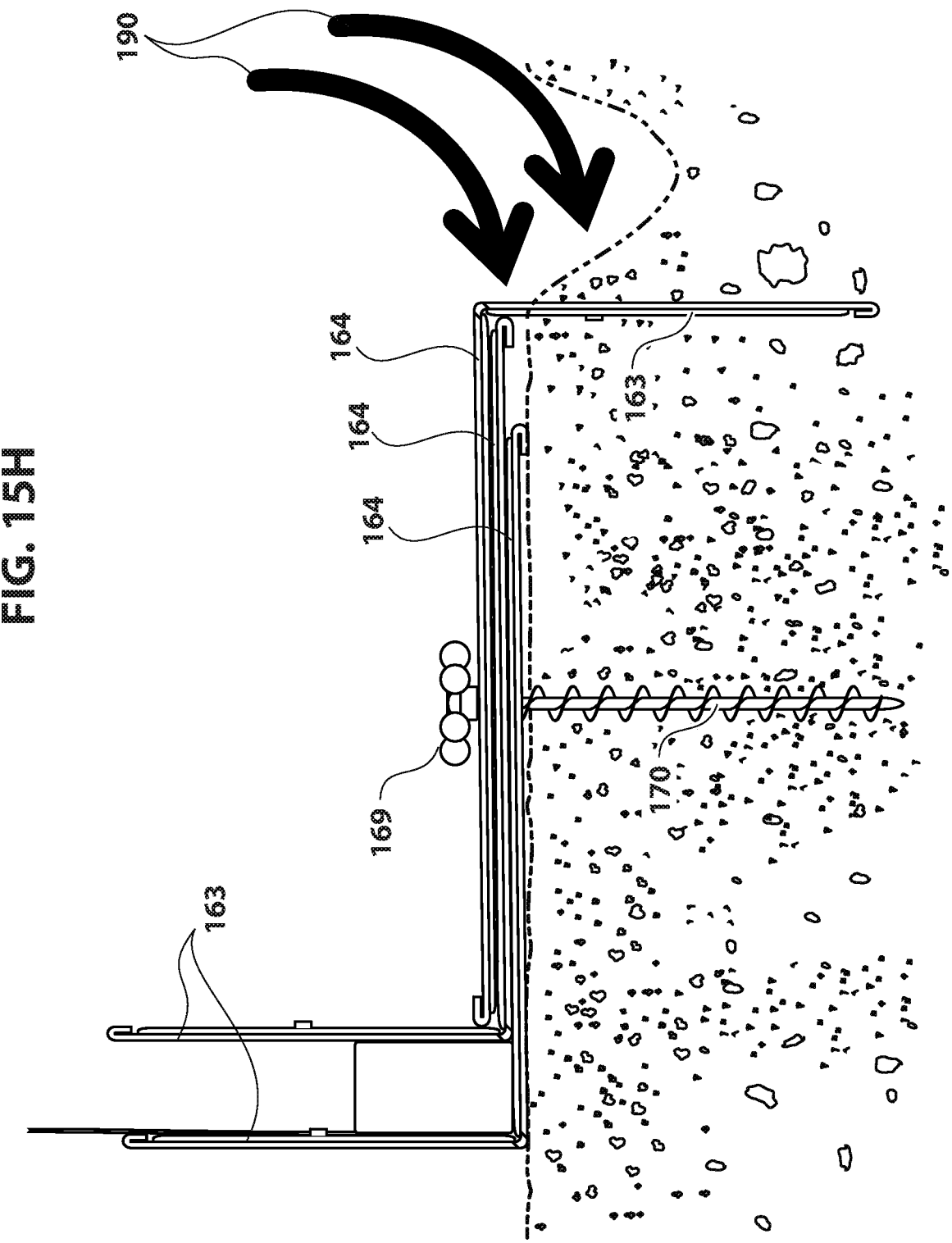

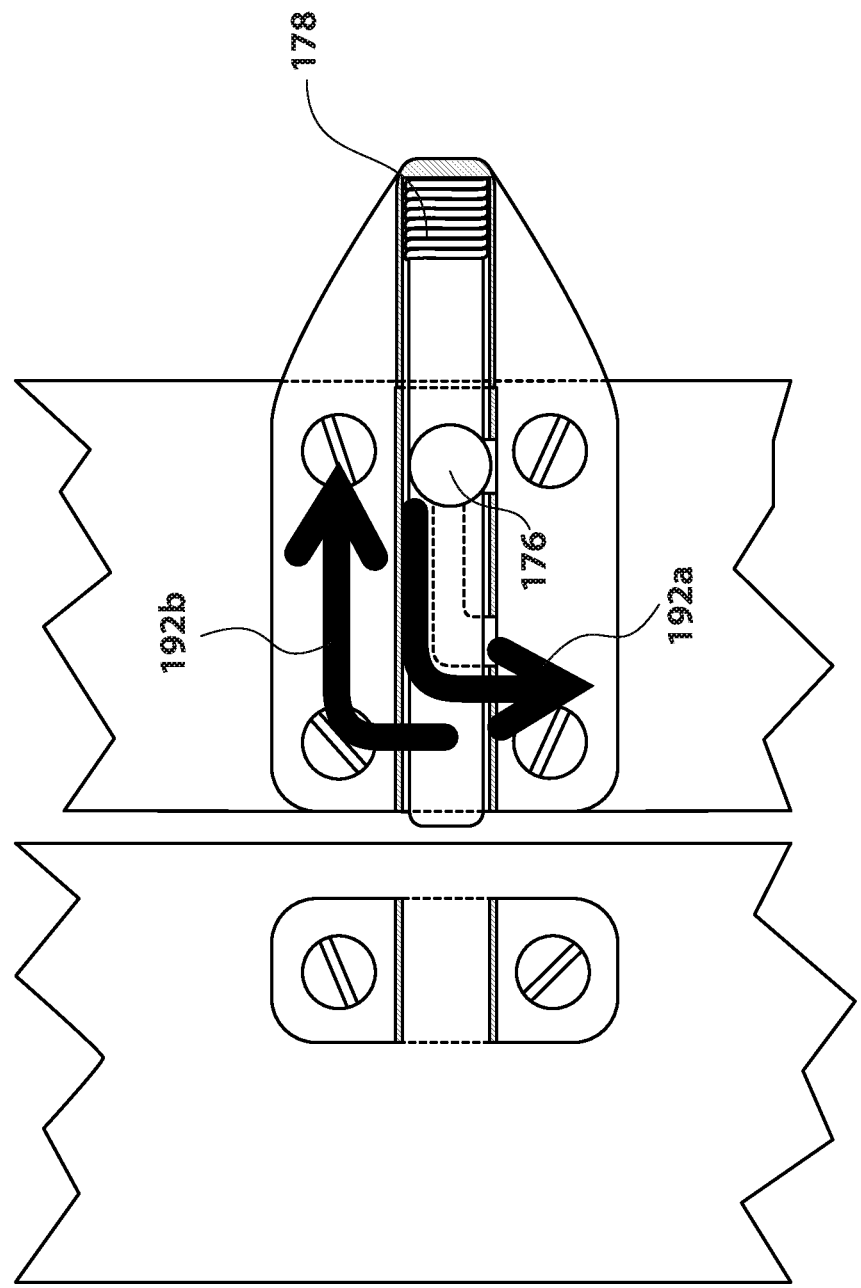

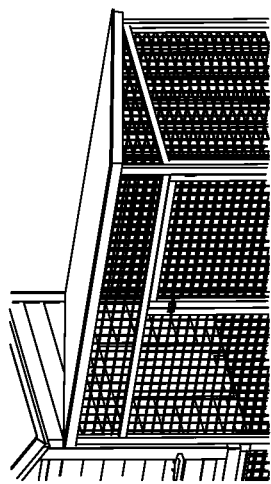
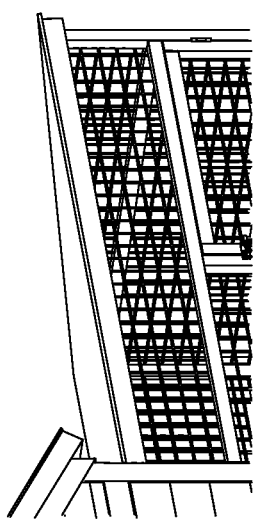
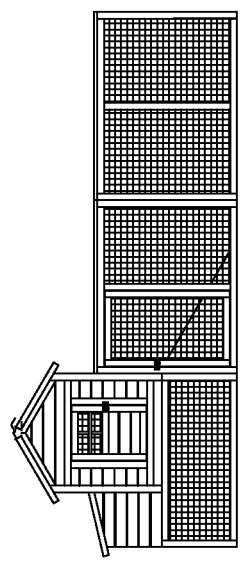

DRAW-RAMP EGG-TEETER-TOTTER
WILD-ANIMAL-SHIELD CHICKEN COOP,
HAVING EASY-ACCESS VENTILATED
ROOSTING SYSTEM,
AUTOMATIC-EGG-COLLECTING-AND-
INDICATING-TEETER-TOTTER NESTING
SYSTEM, CABLE DRAW-RAMP SYSTEM,
AUTOMATIC-HOOK SLIDING-DOOR
SYSTEM, EASY-ACCESS PIVOTABLE
FEEDER-AND-WATER SYSTEM,
EXTENDABLE CHICKEN-RUN SYSTEM,
ANTI-PUSHING ANTI-GROWING
ANTI-DIGGING ANTI-ROTTING SHIELD
SYSTEMS, AND AUTOMATIC-RELATCHING-
TWISTABLE-COMPRESSABLE-SPRING
LATCH SYSTEMS

1. FIELD OF THE INVENTION

The present invention relates to a chicken coop, which is cheap to produce, is easy to ship as one unit and can be quickly and easily be assembled. Particularly, the present invention relates to a draw-ramp egg-teeter-totter wild-animal-shield chicken coop, which comprises:
1) Easy-access ventilated roosting system,
2) Automatic-egg-collecting-and-indicating-teeter-totter nesting system,
3) Cable draw-ramp system,
4) Automatic-hook sliding-door system,
5) Easy-access pivotable feeder-and-water system,
6) Extendable chicken-run system,
7) Anti-pushing anti-growing anti-digging anti-rotting shield systems, and
8) Automatic-relatching-twistable-compressable-spring latch systems.

2. DESCRIPTION OF THE PRIOR ART

A number of chicken coops have been introduced.

U.S. Pat. No. 3,124,102, issued 1964 Mar. 10, to John S. Kurtz, relates to nest structures, and more particularly to a combination nest structure and egg conveyor mechanism and to a unique support means for a combination egg conveyor and nest housing.

U.S. Pat. No. 3,650,246, issued 1972 Mar. 21, to Grady C. Fowler, relates primarily to a system for gathering eggs from a plurality of nesting units and conveying the eggs to a collection area for grading. A conveyor having a resilient surface with egg-receiving indentations spaced therealong is completely covered within the nesting area to prevent egg damage. The eggs are dispensed automatically from the nests onto the conveyor and from the conveyor to a grading table.

U.S. Pat. No. 3,993,026, issued 1976 Nov. 23, to George W. Shreckhise, refers to a poultry coop which is provided that has a full length, half-top, non-bruise loading door. The poultry coop also includes a full-width and length non-bruise self-dumping side door. The poultry coop is especially useful for squeeze lift operations and automatic conveyor and self-dumping operations for poultry handling.

U.S. Pat. No. 4,188,911, issued 1980 Feb. 19, to Gilad Rafaely, describes an enclosure device for encouraging the laying of eggs by domestic fowls particularly turkeys, comprising a cage open at opposite ends, one end constituting the fowl-entry end for permitting the entry and exit of the domestic fowl, and the opposite end constituting the egg-removal end for removing the egg layed by the fowl when in the cage. An ejector member is movable within the cage to force the fowl to exit from the fowl-entry end, and an egg-removing member is coupled to the ejector member within the cage to remove any eggs therein through the egg-removal end.

U.S. Pat. No. 4,364,332, issued 1982 Dec. 21, to William V. Smith, demonstrates an automatic egg collection system that comprises an elongated integrally constructed housing including two spaced apart rows of individual laying nests that are inclined such that the eggs laid in the respective nests are induced by gravity to move inwardly towards a common central conveying system that collects eggs from each row of nests and conveys them from the housing structure to a central collection area.

U.S. Pat. No. 4,516,532, issued 1985 May 14, to Gilad Rafaeli, relates to an egg-collection system which is described for collecting the eggs of laying hens or the like. The system comprises an enclosure defining a plurality of hen laying-stations in side by side relationship, each station including a floor for supporting a hen and formed with a discharge opening therethrough at one end of the respective station.

U.S. Pat. No. 4,653,430, issued 1987 Mar. 31, to Nissim Mass, demonstrates chicken coops which are built up of modular parts, the basic element being partitions separating individual cells from one another in which cells egg laying hens are confined. Each such partition has an uppermost edge which extends obliquely relative to one of the vertical edges of the partition and forms an acute angle therewith.

U.S. Pat. No. 4,791,884, issued 1988 Dec. 20, to Daniel Cassuto, describes a laying nest for domestic fowl with automatic egg collection. The nest includes a housing consisting of a substantially horizontal, at least in part substantially cylindrical drum-like structure provided with a window-like opening extending at least along a portion of its length, a rotatable rake-like member provided with a tine portion comprised of a plurality of tines and located inside the housing in substantially parallel, but eccentric relationship with the axis thereof, the tine portion, when rotating, sweeping out a layer of the housing interior corresponding in depth to the length of the tines, and a counter-rake attached to the housing and having a tine portion comprised of a plurality of inwards-pointing tines, the counter-rake tine portion penetrating the path of sweep of the rotating tine portion.

U.S. Pat. No. 5,222,459, issued 1993 Jun. 29, to William H. Johnson, describes an elongated plural nest section for a poultry nesting system providing nests arranged as a plurality of like modular sections. Each section is an elongated enclosure providing the nests with front access openings. A lifting at a rear edge portion of the nest bottoms that collectively raises all the nest bottoms about a front axis from a lowered laying position to an elevated upwardly tilting expulsion position to eject poultry from the nests.

U.S. Pat. No. 5,282,440, issued 1994 Feb. 1, to Eldon Hostetler, demonstrates a poultry watering system which is provided having a support conduit integrally formed within a flange extending from and integrally formed with a fluid conduit. That flange further includes a snap-fit connection to a hanger bracket which also mounts a two wire anti-roosting device. The fluid conduit also includes saddle flanges retained via snap-fit which shield the saddles and associated drinker devices from run off. When so retained, the saddles penetrate the fluid conduit and permit fluid flow to the drinker devices.

U.S. Pat. No. 5,660,145, issued 1997 Aug. 26, to Lawrence Howard Rumbaugh, depicts an egg laying assembly wherein eggs are laid onto an endless belt, and a roller at one end of the belt effects a reversal in direction of the belt, and a brush is positioned against the belt where it passes under the roller, wherein debris is loosened from the belt and vacuumed from it. The output of the vacuum system has an output into an enclosure which houses egg laying.

U.S. Pat. No. 5,740,763, issued 1998 Apr. 21, to Tracy Hollingsworth, refers to a coop litter removal apparatus that incorporates a frame under which a blade is pivotally mounted to extend outside the side of the frame to scrape along the walls of chicken coops. The blade is pivotally mounted to the frame held in its normal working position by tension. When the blade contacts an object such as a structural pole, it rotates relative to the frame backwards.

U.S. Pat. No. 5,996,530, issued 1999 Dec. 7, to Lavone L. Miller, demonstrates a drinker, which is connected to a supply pipe, includes a novel attachment member that forces a bird's beak open during activation to deliver water directly into the bird's open beak so that the amount of water the bird receives is maximized. A pin is provided as a valve which selectively blocks or allows flow from the supply pipe to the attachment member.

U.S. Pat. No. 6,305,327, issued 2001 Oct. 23, to Edward G. Bounds, Jr., refers to an automation of delivery of newborn avian chicks into grow-out houses is accomplished by use of a delivery vehicle which has a powered telescoping conveyor mounted to this vehicle. The vehicle is positioned at one of the personnel doors of a grow-out house and the conveyor extended into the interior of the building. A moving blower is provided at the discharge end of the telescoping conveyor to distribute the chicks over the floor of a grow-out house in such a manner as to prevent piles of chicks from forming.

U.S. Pat. No. 6,349,672, issued 2002 Feb. 26, to Giuseppe Daffi, relates to a feeding pan for automatic feed dispensers for poultry in general, which comprises a tray-shaped body connected to a duct for supplying feed which can be coupled to a supply tube. The duct ends with openings for delivery into the tray-shaped body which can be controlled by a rack arranged at preselectable heights, further elements for lifting the rack which can be actuated by the resting of the tray-shaped body on the ground being also provided.

U.S. Pat. No. 6,412,439, issued 2002 Jul. 2, to Friedrich Otto-Lubker, demonstrates a sitting pole for poultry having a surface designed substantially straight on an incline, forcing the poultry perching on the sitting pole to sit in a defined alignment. The inclined plane is set at an angle of approximately 35.degree. The surface has a U-shaped profile with a U-base forming the inclined plane. U-legs are provided and are bent off from the U-base. The U-base can be formed by two surface sections that are set at different angles from each other.

U.S. Pat. No. 6,571,732, issued 2003 Jun. 3, to Susan S. Hight, refers to a novel feeder that is used to attract agricultural animals to the feeder to enhance the animals' feeding behavior by providing a non-reflective feeder that is integrally formed with a plurality of reflective particles that attract the attention of the animals. Once the animals notice the reflective particles, the animals are drawn toward the feeder, thus encouraging them to find and eat the food in the feeder.

U.S. Pat. No. 7,047,904, issued 2006 May 23, to Colin James Smith, refers to an egg harvester which has a shuttle where a top run of a conveyor defines horizontal slots to receive eggs from a mat on which eggs are laid. Damaged eggs and litter are separated on a transfer conveyor, and the sound eggs are transferred to an egg belt by a transverse conveyor. Fresh litter can be laid on the mat as the shuttle advances under the birds in the nests.

U.S. Pat. No. 7,107,932, issued 2006 Sep. 19, to Theodore J. Cole, relates to a feeder assembly for feeding birds of all kinds which is provided in three separate embodiments. The feeder assembly of each embodiment is configured to provide for the welfare of birds as they feed from the feeder assembly by allowing the birds' breasts to conform to a rim member of the feeder assembly. The feeder assembly of two embodiments also provides for a lower feed gate to provide feed into a pan member of the feeder assembly. The lower feed gate is always open and can be raised or lowered as desired.

U.S. Pat. No. 7,111,584, issued 2006 Sep. 26, to Steve Wang, relates to a kennel which includes a plurality of side panels that are connected or coupled together with a gate panel to form an enclosure. The gate panel has a pair of ends that are configured for connecting to the side panels and allow access into and out of the enclosure via a doorway positioned between the ends. A door configured for opening and closing the doorway is positioned therein, and has a frame member directly and rotatably attached to a doorway frame member to form a compact door and doorway combination in the gate panel.

U.S. Pat. No. 7,681,526, issued 2010 Mar. 23, to Christopher Richard Roes, relates to a watering disc for use in a nipple assembly of a watering line system which has an outer rim portion and an upper surface extending inwardly from said outer rim portion to an aperture provided through a center of the watering disc. The upper surface defines a plurality of separators and a plurality of individual compartments in an alternating manner about a circumference of the watering disc. The plurality of separators generally extend from proximate the center of the watering disc to the outer rim portion in order to define each individual compartment between the outer rim portion and two adjacent separators.

U.S. Pat. No. 7,958,849, issued 2011 Jun. 14, to Yasushi Tsubai, refers to an egg collection conveyor and a vertical feeding device for egg collection, and particularly relates to an egg roll out mechanism for an egg collector. The egg collection conveyor collects eggs produced at each cage of a multiple-stage chicken cage and conveys the eggs to horizontally one end side of the conveyor. The vertical feeding device for egg collection is provided on one end side of the multiple-stage chicken cage, conveys the eggs in the vertical direction, and discharges the eggs, collected by the egg collection conveyor, at a previously set position.

U.S. Pat. No. 7,958,850, issued 2011 Jun. 14, to Yasushi Tsubai, describes a cage which is provided which is sanitary and efficient and can make hens who tend to gather at the four corners scatter. An oblong and rectangular cage having a floor formed to allow hens and cocks to move freely thereon. The cage includes an outer peripheral section substantially surrounding the entire floor and allowing air to freely pass through it.

U.S. Pat. No. 8,020,519, issued 2011 Sep. 20, to Thomas Perry Stamper, demonstrates a chicken coop door module having a frame, a door, and a motor drive unit. The motor drive unit is configured to move the door toward the open position in response to receiving an opening signal so that the frame opening is unobstructed, move the door toward the closed position in response to receiving a closing signal so that the frame opening is obstructed, and prevent the door from moving when no signal is received. The door module receives an opening signal in the morning to let the chickens out of the chicken coop, and a closing signal in the evening to close the door to secure the chickens in the coop.

U.S. Pat. No. 8,141,517, issued 2012 Mar. 27, to Naoki Shimoda, relates to a pet pen for housing a pet which is provided. The pet pen comprises a plurality of enclosing members with each enclosing member having a wall body and an opening end. The enclosing members form the pen by overlapping a portion of the wall body at two or more of the opening ends, and the pen width can be adjusted by adjusting the length of the overlapping portion. The pen width can be adjusted without removing an enclosing member.

U.S. Pat. No. 8,550,034, issued 2013 Oct. 8, to Cheryl Potter, demonstrates an improved poultry coop that facilitates the prevention of entry of predators and the transmission of pathogens to and between the housed birds. In a preferred embodiment, the coop, which advantageously meets bird flu guidelines, includes an insulated house, a covered run coupled to the house, and a covered feed house. All openings are preferably covered with ½" hardware cloth or mesh wire. the same cloth or mesh wire is preferably buried beneath the earth below the coop and coupled to the coop.

U.S. Pat. No. 8,910,594, issued 2014 Dec. 16, to Jorg Kuking, describes a poultry cage comprising a cage floor, preferably having a grid structure, end and side walls which extend upward from the cage floor and define all sides of an area where the animals are kept, an introducing device for introducing litter material, which is disposed above the cage floor and from which the litter material can be dispensed from at least one discharge opening, wherein at least one section of the device for introducing litter is disposed between the side walls, a litter plate connected to the cage floor, which has an upwardly facing floor standing area, comprising one section which lies above the at least one discharge opening and has fixing means for fixing the litter plate to the cage floor. According to the invention, the floor standing area has at least one abrasive surface section, the roughness of which serves to shorten the claws of the poultry walking thereon and to blunt the beaks of the poultry picking thereon.

U.S. Pat. No. 9,226,482, issued 2016 Jan. 5, to Frank Ralph Cardaropoli, describes an article for providing fresh water to fowl and a method for making the same. The article comprises a valve which is adapted to be attached to a bottle. The valve is adapted to be attached to a bottle by way of a female connection adapter. This specification also discloses a valve comprising a valve body and an actuating mechanism comprising an actuating pin, a receiver pin and a ball.

U.S. Pat. No. 9,374,981, issued 2016 Jun. 28, to Kenneth Jay Powers, demonstrates an animal feeder which is configured to resist clogging, enable user cleaning of the feed dispensing canister assembly and resist pest intrusion. The animal feeder includes an outer shell assembly detachably connected to a dispensing canister assembly configured to push the feed over the top of the dispensing canister assembly into the outer shell assembly. The expelled feed is collected into a feed passage and delivered to a feed receptacle.

U.S. Pat. No. 9,376,781, issued 2016 Jun. 28, to Todd Staller, depicts a ground anchor having an elongated shaft with upper and lower ends, a grooved locking post on the upper end, an threaded auger fixed to the lower end, an engagement area for engaging an external tool, a sleeve mounted over the main shaft, which spins freely, and an attachment member configured to secure one or more of an external lock, chain, rope or cable attached to an external object to thereby anchor the external object when the main shaft is screwed into the ground, and a lock device configured to cover and lock onto the grooved locking post so the attachment member and sleeve cannot be removed, whereby the sleeve covers the main shaft and obstructs access to the main shaft to prevent unwanted persons from removing it.

U.S. Pat. No. 9,504,234, issued 2016 Nov. 29, to Marcus D. Rust, refers to an aviary which is provided, wherein the aviary includes a cage tower including an outside surface. An egg collector extends from the outside surface of the cage tower. A cover is positioned over the egg collector. A perch is positioned adjacent to the egg collector so that a gap is formed between the perch and the cover. The gap is sized to prevent eggs from rolling between the perch and the cover.

U.S. Pat. No. 9,551,149, issued 2017 Jan. 24, to Douglas Wayne Scott, demonstrates embodiments described herein which include systems and methods for efficiently assembling a structure. In one embodiment, a system includes multiple panels, with each panel having a frame made of multiple members. Each member of the frame has at least two pairs of passageways. Each pair of passageways can include two passageways that intersect each other in a perpendicular manner.

U.S. Pat. No. 9,635,832, issued 2017 May 2, to David Link, relates to a tray lock mechanism for a pet enclosure which is disclosed. The tray lock mechanism includes a sliding component that has a camming surface that interacts with a leading-edge of the tray to generate an upward force to move the sliding component out of the way so that the tray can be inserted into an opening and into the pet enclosure.

U.S. Pat. No. 9,635,833, issued 2017 May 2, to Jarret C. Oeltjen, refers to a pet enclosure kit which can include multiple discrete flat panels and multiple panel connectors. Each panel can include joined edge segments forming a rigid perimeter of the panel. An area bound by the perimeter can include a mesh, where a weave of the mesh is sufficiently tight to restrain a pet for which a pet enclosure is constructed. Each panel connector can couple two adjacent panels together by connecting to an edge segment of each of the adjacent panels, each of the panels can be coupled using only the panel connectors to other ones of said panels at either approximately one hundred and eighty degree angle or approximately ninety degree angle relative to an adjacent panel.

U.S. Pat. No. 9,820,472, issued 2017 Nov. 21, to John Bussema, demonstrates a poultry cage which comprises a resting surface in a horizontal plane having a plurality of openings, a manure collecting surface arranged underneath the resting surface, and a drying air channel comprising a first side wall having a set of first openings for directing drying air towards the manure collecting surface and a set of second openings for directing drying air towards the manure collecting surface.

U.S. Pat. No. D719704, issued 2014 Dec. 16, to Melody Lee, depicts an ornamental design for a chicken coop.

U.S. Pat. No. D734570, issued 2015 Jul. 14, to T. Daniel Hawk, depicts an ornamental design for a pet ramp U.S. Pat. No. D767215, issued 2016 Sep. 20, to Marc J. Lalonde, depicts an ornamental design for a portable chicken coop.

U.S. Pat. No. D804737, issued 2017 Dec. 5, to J. David Fisher, depicts an ornamental design for a chicken coop.

U.S. Publication No. 20040144326, published 2004 Jul. 29, to Colin James Smith, relates to an egg harvester having a shuttle where a top run of a conveyor defines horizontal slots to receive eggs from a mat on which eggs are laid. Damaged eggs and litter are separated on a transfer conveyor, and the sound eggs are transferred to an egg belt by a transverse conveyor. Fresh litter can be laid on the mat as the shuttle advances under the birds in the nests.

U.S. Publication No. 20150122191, published 2015 May 7, to Marcus Rust, relates to an aviary cage having a cage tower. The cage tower includes a nesting area positioned in the cage tower and a belt extending below the nesting area. A scratching floor extends from the cage tower and is oriented with respect to the belt such that a deposit on the scratching floor is directed back to the belt. The belt is configured to capture eggs laid outside the nesting area.

U.S. Publication No. 20180007870, published 2018 Jan. 11, to Massimo Finco, relates to an aviary apparatus for rearing laying hens, which comprises mutually laterally adjacent multistory rearing batteries, each one of the batteries comprising at least one lower stop surface and one upper stop surface, with areas on which the poultry can walk between the batteries and laterally to the outermost batteries. The lower stop surfaces and upper stop surfaces comprise corresponding conveyor belts for eggs and feces, the walkable areas comprising inclined floors which are arranged descending toward a contiguous conveyor belt of a lower stop surface of a corresponding battery.

U.S. Publication No. 20180310530, published 2018 Nov. 1, to Alan Wayne Lockstedt, relates to a poultry house habitat with a discrete natural environment enclosure which protects poultry while granting them freedom to move during their normal egg-laying period and a cage area structure with cubbyholes in which to sleep. The attached enclosed grazing area allows the poultry to maintain a more complete diet by supplementing normal feed with insects, grass, and soil. Because the poultry have greater freedom of movement and a more complete diet, the resulting eggs and meat are of a much higher nutritional quality and have a better taste.

DISADVANTAGES OF THE PRIOR ART

The prior art have failed to solve many problems associated with chicken coops, as follows:

1) No prior art mention or disclose any chicken coop, having
    automatic egg-collecting teeter-totter 129.
    Therefore, the prior art of chicken coop:
      a) Can not collect eggs; and
      b) Can not allow eggs to roll down to one end of automatic egg-collecting teeter-totter 129
        in the direction of arrow 180a
        (see FIG. 10C and FIG. 10D)
        to lower automatic egg-laying indicator 130a out of the draw-ramp egg-teeter-totter wild-animal-shield chicken coop
        in the direction of arrow 181b
        (see FIG. 10C and FIG. 10D)
        to indicate that there is at least one egg inside automatic egg-collecting teeter-totter 129
        to conveniently let a user from inside a house comfortably know that there is egg(s) laid, without the needs for getting out of a house, walking to nesting system 119, and lifting nesting roof 126 up to check and see if there is any egg laid.
      c) Can not eliminate the needs for getting out of the house, opening nesting roof 126, and looking inside the draw-ramp egg-teeter-totter wild-animal-shield chicken coop to see whether or not there is any egg in automatic egg-collecting teeter-totter 129.

2) No prior art mention or disclose any chicken coop, having
    automatic egg-laying indicator 130a.
    Therefore, the prior art of chicken coop:
      Can not indicate that there is at least one egg inside automatic egg-collecting teeter-totter 129
        in the direction of arrow 181b
        (see FIG. 10C and FIG. 10D)
        to conveniently let a user from inside a house comfortably know that there is egg(s) laid, without the needs for getting out of a house, walking to nesting system 119, and lifting nesting roof 126 up to check and see if there is any egg laid.

3) No prior art mention or disclose any chicken coop, having
    teeter-totter-angle adjusting screw 130b.
    Therefore, the prior art of chicken coop:
      Can not adjust the slanted angle of automatic egg-collecting teeter-totter 129
        to allow eggs to roll down to one end of automatic egg-collecting teeter totter 129
        in the direction of arrow 181b
        (see FIG. 10C and FIG. 10D),
        to allow automatic egg-collecting teeter-totter 129 to lower automatic egg-laying indicator 130a out of the draw-ramp egg-teeter-totter wild-animal-shield chicken coop
        to indicate that there is at least one egg inside automatic egg-collecting teeter-totter 129.

4) No prior art mention or disclose any chicken coop, having
    automatic-egg-collecting-teeter-totter axle 128.
    Therefore, the prior art of chicken coop:
      Can not allow the two opposite ends of automatic egg-collecting teeter-totter 129 to seesaw
        in the direction of arrow 180a
        when there is at least one egg inside automatic egg-collecting teeter-totter 129
        (see FIG. 10B), and
        in the direction of arrow 180b
        when there is no egg inside automatic egg-collecting teeter-totter 129
        (see FIG. 10B).

5) No prior art mention or disclose any chicken coop, having
    wire-strengthening anti-pushing vertical shield 163.
    Therefore, the prior art of chicken coop:
      a) Can not strengthen wire wall panels 158 and wire door panel 161,
      b) Can not prevent the wires of wire wall panels 158 and wire door panel 161
        from being pushed inward by wild animals
        in the direction of arrow 185a
        (see FIG. 15A), and
      c) Can not retain the designed shape of the chicken run.

6) No prior art mention or disclose any chicken coop, having
    panel-strengthening anti-growing anti-digging horizontal shield 164.
    Therefore, the prior art of chicken coop:
      a) Can not raise wire wall panels 158 and wire door panel 161 above the ground
        in the direction of arrow 185b
        (see FIG. 15A)
        to allow water to drain and evaporate
        in the direction of arrow 186a and 186b
        (see FIG. 15B, FIG. 15C, and FIG. 15D)
        to prevent wire wall panels 158 and wire door panel 161 from rotting away;

b) Can not prevent wild animals from digging under wire wall panels 158 and wire door panel 161 into the chicken coop; and c) Can not prevent grass from growing around and close to the draw-ramp egg-teeter-totter wild-animal-shield chicken coop.
in the direction of arrow 187
(see FIG. 15E).

7) No prior art mention or disclose any chicken coop, having
wire-panel-coupling hooks 165*a*.
Therefore, the prior art of chicken coop:
Can not hook on the wires of wire wall panels 158 and wire door panel 161
in the direction of arrow 188
(see FIG. 15F)
to couple wire-strengthening anti-pushing vertical shield 163 and panel-strengthening anti-growing anti-digging horizontal shield 164 to wire wall panels 158 and wire door panel 161
to strengthen and stabilize the draw-ramp egg-teeter-totter wild-animal-shield chicken coop.

8) No prior art mention or disclose any chicken coop, having
panel-raising anti-rotting ridges 165*b*.
Therefore, the prior art of chicken coop:
Can not raise wire wall panels 158 and wire door panel 161 above the ground
in the direction of arrow 185*b*
(see FIG. 15A)
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

9) No prior art mention or disclose any chicken coop, having
water-evaporation-inducing alleys 166.
Therefore, the prior art of chicken coop:
Can not create empty space between panel-raising anti-rotting ridges 165*b*
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

10) No prior art mention or disclose any chicken coop, having
water-draining holes 167.
Therefore, the prior art of chicken coop:
Can not allow water to drain
in the direction of arrow 186*a* and 186*b*
(see FIG. 15B, FIG. 15C, and FIG. 15D)
to prevent wire wall panels 158 and wire door panel 161 from rotting away.

11) No prior art mention or disclose any chicken coop, having
automatic-relatching twistable compressable spring 178.
Therefore, the prior art of chicken coop:
a) Can not twist latch lever 176 back into its locking position
in the direction of arrow 191*a*
when latch lever 176 is lifted up out of its locking position
in the direction of arrow 191*b*
(see FIG. 16A); and b) Can not push and twist latch lever 176 back into its locking position.
in the direction of arrow 192*a*
when latch lever 176 is lifted up and slid out of its locking position
in the direction of arrow 192*b*
(see FIG. 16B)
to push and twist latch 175 back into its locking position
to relatch the tip of latch 175 inside latch-tip brace 172.

12) No prior art mention or disclose any chicken coop, having
spring housing 177.
Therefore, the prior art of chicken coop:
Can not house automatic-relatching twistable compressable spring 178.

13) No prior art mention or disclose any chicken coop, having
automatic spring-loaded handle hook 148.
Therefore, the prior art of chicken coop:
Can not releasably and automatically hook on handle-hook ring 149
in the direction of arrow 183*d*
(see FIG. 13C and FIG. 13D).

14) No prior art mention or disclose any chicken coop, having
draw ramp 134.
Therefore, the prior art of chicken coop:
Can not close draw-ramp opening 132 in addition to draw-ramp-opening sliding door 141*b*
in the direction of arrow 182*a*
(see FIG. 11A)
to protect the roosting area.

15) No prior art mention or disclose any chicken coop, having
pivotable L-shaped arm 152.
Therefore, the prior art of chicken coop:
a) Can not conveniently hang conventional feeder 154 and conventional water-container 156 thereon;
b) Can not conveniently swing conventional feeder 154 and conventional water-container 156 to different locations
in the direction of arrow 184
(see FIG. 14A and FIG. 14B); and
c) Can not conveniently swing conventional feeder 154 and conventional water-container 156 to the entrance of the chicken run
to conveniently replenish food and water for chickens.

OBJECTS AND ADVANTAGES OF THE INVENTION

The present invention substantially departs from the conventional concepts and designs of the prior art. In doing so, the present invention provides a draw-ramp egg-teeter-totter wild-animal-shield chicken coop (having: 1) Easy-access ventilated roosting system, 2) Automatic-egg-collecting-and-indicating-teeter-totter nesting system, 3) Cable draw-ramp system, 4) Automatic-hook sliding-door system, 5) Easy-access pivotable feeder-and-water system, 6) Extendable chicken-run system, 7) Anti-pushing anti-growing anti-digging anti-rotting shield systems, and 8) Automatic-relatching-twistable-compressable-spring latch systems), having many unique and significant features, functions, and advantages, which overcome all the disadvantages of the prior art, as follows:

1) It is an object of the new invention to provide a draw-ramp egg-teeter-totter wild-animal-shield chicken coop, having
   automatic egg-collecting teeter-totter 129.
   Therefore, the draw-ramp egg-teeter-totter wild-animal-shield chicken coop:
   a) Can collect eggs; and
   b) Can allow eggs to roll down to one end of automatic egg-collecting teeter-totter 129
      in the direction of arrow 180a
      (see FIG. 10C and FIG. 10D)
         to lower automatic egg-laying indicator 130a out of the draw-ramp egg-teeter-totter wild-animal-shield chicken coop
         in the direction of arrow 181b
         (see FIG. 10C and FIG. 10D)
            to indicate that there is at least one egg inside automatic egg-collecting teeter-totter 129
            to conveniently let a user from inside a house comfortably know that there is egg(s) laid, without the needs for getting out of a house, walking to nesting system 119, and lifting nesting roof 126 up to check and see if there is any egg laid.
   c) Can eliminate the needs for getting out of the house, opening nesting roof 126, and looking inside the draw-ramp egg-teeter-totter wild-animal-shield chicken coop to see whether or not there is any egg in automatic egg-collecting teeter-totter 129.

2) It is another object of the new invention to provide a draw-ramp egg-teeter-totter wild-animal-shield chicken coop, having
   automatic egg-laying indicator 130a.
   Therefore, the draw-ramp egg-teeter-totter wild-animal-shield chicken coop:
   Can indicate that there is at least one egg inside automatic egg-collecting teeter-totter 129
      in the direction of arrow 181b
      (see FIG. 10C and FIG. 10D)
         to conveniently let a user from inside a house comfortably know that there is egg(s) laid, without the needs for getting out of a house, walking to nesting system 119, and lifting nesting roof 126 up to check and see if there is any egg laid.

3) It is another object of the new invention to provide a draw-ramp egg-teeter-totter wild-animal-shield chicken coop, having
   teeter-totter-angle adjusting screw 130b.
   Therefore, the draw-ramp egg-teeter-totter wild-animal-shield chicken coop:
   Can adjust the slanted angle of automatic egg-collecting teeter-totter 129
      to allow eggs to roll down to one end of automatic egg-collecting teeter totter 129
      in the direction of arrow 181b
      (see FIG. 10C and FIG. 10D),
         to allow automatic egg-collecting teeter-totter 129 to lower automatic egg-laying indicator 130a out of the draw-ramp egg-teeter-totter wild-animal-shield chicken coop
         to indicate that there is at least one egg inside automatic egg-collecting teeter-totter 129.

4) It is a further object of the new invention to provide a draw-ramp egg-teeter-totter wild-animal-shield chicken coop, having
   automatic-egg-collecting-teeter-totter axle 128.
   Therefore, the draw-ramp egg-teeter-totter wild-animal-shield chicken coop:
   Can allow the two opposite ends of automatic egg-collecting teeter-totter 129 to seesaw
      in the direction of arrow 180a
         when there is at least one egg inside automatic egg-collecting teeter-totter 129
         (see FIG. 10B), and
      in the direction of arrow 180b
         when there is no egg inside automatic egg-collecting teeter-totter 129
         (see FIG. 10B)

5) It is an even further object of the new invention to provide a draw-ramp egg-teeter-totter wild-animal-shield chicken coop, having
   wire-strengthening anti-pushing vertical shield 163.
   Therefore, the draw-ramp egg-teeter-totter wild-animal-shield chicken coop:
   a) Can strengthen wire wall panels 158 and wire door panel 161,
   b) Can prevent the wires of wire wall panels 158 and wire door panel 161
      from being pushed inward by wild animals
      in the direction of arrow 185a
      (see FIG. 15A), and
   c) Can retain the designed shape of the chicken run.

6) It is another object of the new invention to provide a draw-ramp egg-teeter-totter wild-animal-shield chicken coop, having
   panel-strengthening anti-growing anti-digging horizontal shield 164.
   Therefore, the draw-ramp egg-teeter-totter wild-animal-shield chicken coop:
   a) Can raise wire wall panels 158 and wire door panel 161 above the ground
      in the direction of arrow 185b
      (see FIG. 15A)
         to allow water to drain and evaporate
         in the direction of arrow 186a and 186b
         (see FIG. 15B, FIG. 15C, and FIG. 15D)
            to prevent wire wall panels 158 and wire door panel 161 from rotting away;
   b) Can prevent wild animals from digging under wire wall panels 158 and wire door panel 161 into the chicken coop; and
   c) Can prevent grass from growing around and close to the draw-ramp egg-teeter-totter wild-animal-shield chicken coop.
      in the direction of arrow 187
      (see FIG. 15E).

7) It is yet another object of the new invention to provide a draw-ramp egg-teeter-totter wild-animal-shield chicken coop, having
   wire-panel-coupling hooks 165a.
   Therefore, the draw-ramp egg-teeter-totter wild-animal-shield chicken coop:
   Can hook on the wires of wire wall panels 158 and wire door panel 161
      in the direction of arrow 188
      (see FIG. 15F)
         to couple wire-strengthening anti-pushing vertical shield 163 and panel-strengthening anti-growing anti-digging horizontal shield 164 to wire wall panels 158 and wire door panel 161
         to strengthen and stabilize the draw-ramp egg-teeter-totter wild-animal-shield chicken coop.

8) It is still yet another object of the new invention to provide a draw-ramp egg-teeter-totter wild-animal-shield chicken coop, having panel-raising anti-rotting ridges 165*b*.
Therefore, the draw-ramp egg-teeter-totter wild-animal-shield chicken coop:
Can raise wire wall panels 158 and wire door panel 161
above the ground
in the direction of arrow 185*b*
(see FIG. 15A)
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

9) It is still yet an even further object of the new invention to provide a draw-ramp egg-teeter-totter wild-animal-shield chicken coop, having
water-evaporation-inducing alleys 166.
Therefore, the draw-ramp egg-teeter-totter wild-animal-shield chicken coop:
Can create empty space between panel-raising anti-rotting ridges 165*b*
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

10) It is still yet an even further object of the new invention to provide a draw-ramp egg-teeter-totter wild-animal-shield chicken coop, having
water-draining holes 167.
Therefore, the draw-ramp egg-teeter-totter wild-animal-shield chicken coop:
Can allow water to drain
in the direction of arrow 186*a* and 186*b*
(see FIG. 15B, FIG. 15C, and FIG. 15D)
to prevent wire wall panels 158 and wire door panel 161 from rotting away.

11) It is still yet an even further object of the new invention to provide a draw-ramp egg-teeter-totter wild-animal-shield chicken coop, having
automatic-relatching twistable compressable spring 178.
Therefore, the draw-ramp egg-teeter-totter wild-animal-shield chicken coop:
a) Can twist latch lever 176 back into its locking position
in the direction of arrow 191*a*
when latch lever 176 is lifted up out of its locking position
in the direction of arrow 191*b*
(see FIG. 16A); and
b) Can push and twist latch lever 176 back into its locking position.
in the direction of arrow 192*a*
when latch lever 176 is lifted up and slid out of its locking position
in the direction of arrow 192*b*
(see FIG. 16B)
to push and twist latch 175 back into its locking position
to relatch the tip of latch 175 inside latch-tip brace 172.

12) It is still yet an even further object of the new invention to provide a draw-ramp egg-teeter-totter wild-animal-shield chicken coop, having spring housing 177.
Therefore, the draw-ramp egg-teeter-totter wild-animal-shield chicken coop:
Can house automatic-relatching twistable compressable spring 178.

13) It is still yet an even further object of the new invention to provide a draw-ramp egg-teeter-totter wild-animal-shield chicken coop, having
automatic spring-loaded handle hook 148.
Therefore, the draw-ramp egg-teeter-totter wild-animal-shield chicken coop:
Can releasably and automatically hook on handle-hook ring 149
in the direction of arrow 183*d*
(see FIG. 13C and FIG. 13D).

14) It is still yet an even further object of the new invention to provide a draw-ramp egg-teeter-totter wild-animal-shield chicken coop, having
draw ramp 134.
Therefore, the draw-ramp egg-teeter-totter wild-animal-shield chicken coop:
Can close draw-ramp opening 132 in addition to draw-ramp-opening sliding door 141*b*
in the direction of arrow 182*a*
(see FIG. 11A)
to protect the roosting area.

15) It is still yet an even further object of the new invention to provide a draw-ramp egg-teeter-totter wild-animal-shield chicken coop, having
pivotable L-shaped arm 152.
Therefore, the draw-ramp egg-teeter-totter wild-animal-shield chicken coop:
a) Can conveniently hang conventional feeder 154 and conventional water container 156 thereon;
b) Can conveniently swing conventional feeder 154 and conventional water-container 156 to different locations
in the direction of arrow 184
(see FIG. 14A and FIG. 14B); and
c) Can conveniently swing conventional feeder 154 and conventional water-container 156 to the entrance of the chicken run
to conveniently replenish food and water for chickens.

Other objects and advantages of the present invention will become apparent from a consideration of the accompanying drawings and ensuing description.

SUMMARY OF THE INVENTION

A draw-ramp egg-teeter-totter wild-animal-shield chicken coop, comprising: a first and a second and a third and a fourth roosting walls attached to one another, a roosting roof attached to the first and the second and the third and the fourth roosting wall, a passage opening formed in the fourth roosting wall, a first nesting wall attached to the third roosting wall along the opposite passage-opening edges, a second nesting wall attached to the first nesting wall, a third nesting wall attached to the second nesting wall, a slanted nesting floor attached to the first nesting wall and the third nesting wall, a teeter-totter axle attached to the slanted nesting floor, an automatic egg-collecting teeter-totter seesawingly attached to the teeter-totter axle, an automatic egg-laying indicator attached to one of the two opposite teeter-totter ends, a teeter-totter-angle-adjusting screw threadedly attached to another one of the two opposite teeter-totter ends, a draw-ramp opening formed in the first roosting wall, two rails respectively attached to the first roosting wall along the top and the bottom of the draw-ramp opening edges, a sliding door slidably attached to and between the two rails, a door rod attached to the sliding door, a door-rod handle attached to the door rod, an automatic spring-loaded handle hook seesawingly attached to the door-rod handle, a handle-hook ring attached to the second roosting wall, a plurality of wall panels respectively attached to one another or the first roosting wall or the second roosting wall or the third roosting wall or the fourth roosting wall, a door panel hinged to one of the wall panels, a latch-tip brace attached to one of the wall panels, a latch-body brace attached to the door panel, a C-shaped cut-out formed in the latch-body brace, a latch pivotably and slidably attached to the latch-body brace, a latch lever molded to the latch, a spring housing molded to the latch-body brace, an automatic-relatching twistable compressable spring attached to the latch at one of the two opposite spring ends and attached to the spring housing at another one of the two opposite spring ends, a wire-strengthening anti-pushing vertical shield positioned on the inside of the chicken coop against the wall panels and the door panel, a panel-strengthening anti-growing anti-digging horizontal shield molded to the wire-strengthening anti-pushing vertical shield and positioned under the wall panels or the door panel, a plurality of wire-panel-coupling hooks respectively molded on or formed on the wire-strengthening anti-pushing vertical shield, a plurality of panel-raising anti-rotting ridges respectively molded on or formed on the wire-strengthening anti-pushing vertical shield and the panel-strengthening anti-growing anti-digging horizontal shield, a plurality of water-evaporation-inducing alleys respectively formed between the panel-raising anti-rotting ridges, and a plurality of water-draining holes respectively drilled in or formed in the wire-strengthening anti-pushing vertical shield or the panel-strengthening anti-growing anti-digging horizontal shield.

BRIEF DESCRIPTION OF THE DRAWINGS

FIG. 1A, FIG. 1B, FIG. 1C, and FIG. 1D illustrate perspective views of the assembly of the draw-ramp egg-teeter-totter wild-animal-shield chicken coop.

FIG. 2A and FIG. 2B illustrate cross-sectional views of the assembly of automatic-egg-collecting-and-indicating-teeter-totter nesting system.

FIG. 6A and FIG. 6B illustrate perspective views of the assembly of easy-access pivotable feeder-and-water system.

FIG. 8 illustrates a perspective view of one of spiral stakes.

FIG. 9 illustrates a perspective view of one of automatic-relatching-twistable-compressable-spring latch systems.

FIG. 10A, FIG. 10B, FIG. 10C, and FIG. 10D illustrate cross-sectional views of how the automatic-egg-collecting-and-indicating-teeter-totter nesting system works.

FIG. 12A, FIG. 12B, FIG. 13A, FIG. 13B, FIG. 13C, and FIG. 13D illustrate perspective views of how the automatic-hook sliding-door system works.

FIG. 14A and FIG. 14B illustrate top views of how the easy-access pivotable feeder-and-water system works.

FIG. 15A, FIG. 15B, FIG. 15C, FIG. 15D, FIG. 15E, FIG. 15F, FIG. 15G, and FIG. 1511 illustrate perspective and side views of how the anti-pushing anti-growing anti-digging anti-rotting shield systems work.

FIG. 16A and FIG. 16B illustrate cross-sectional views of how the automatic-relatching-twistable-compressable-spring latch systems work.

FIG. 18G, FIG. 1811, FIG. 18I, FIG. 18J, FIG. 18K, and FIG. 18L illustrate perspective and front views of equivalents of the draw-ramp egg-teeter-totter wild-animal-shield chicken coop. The equivalents are made with or without extended chicken run, and are made with or without slanted wire roof panel.

DETAILED DESCRIPTION OF THE INVENTION

Figure 1A:
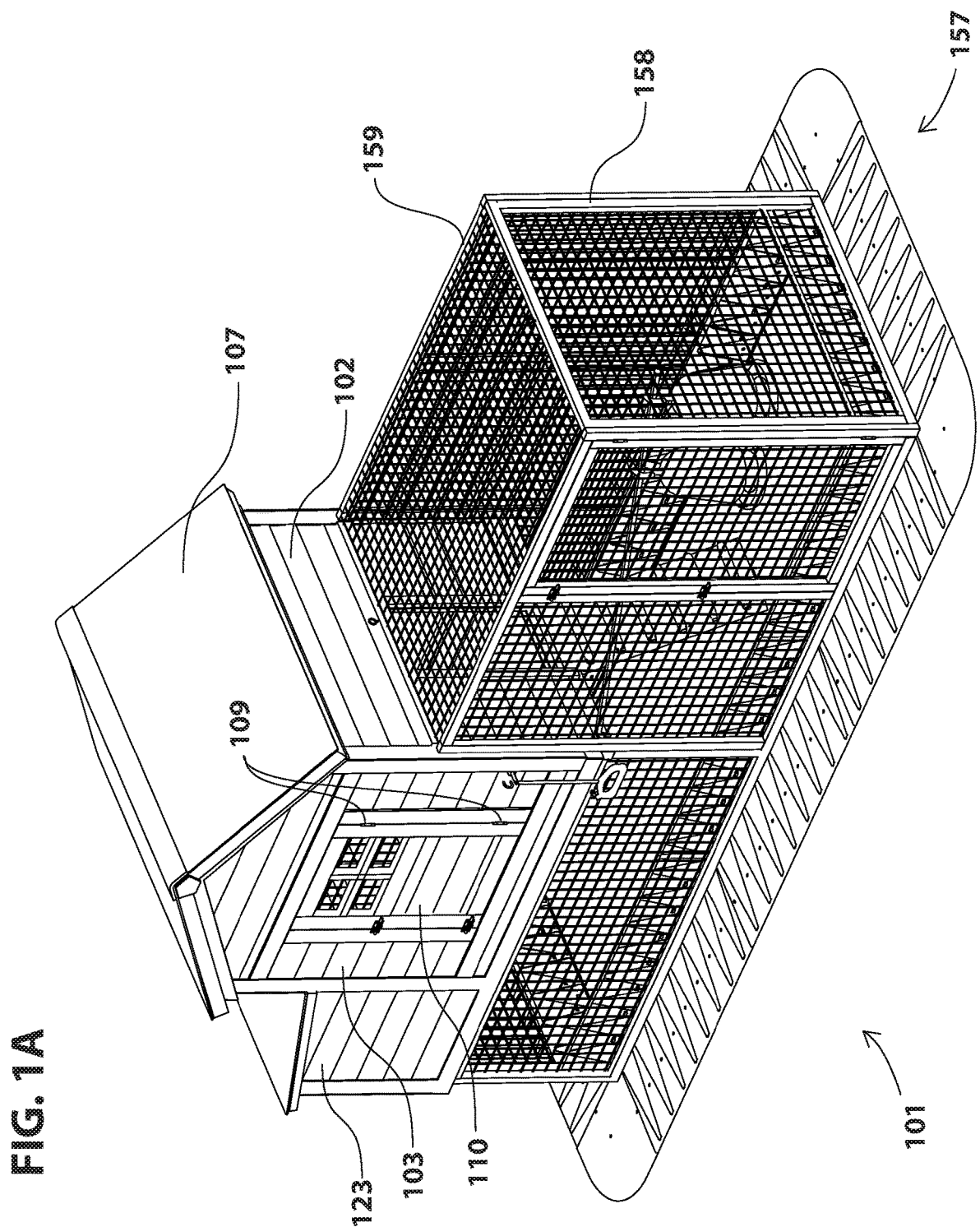
Figure 1B:
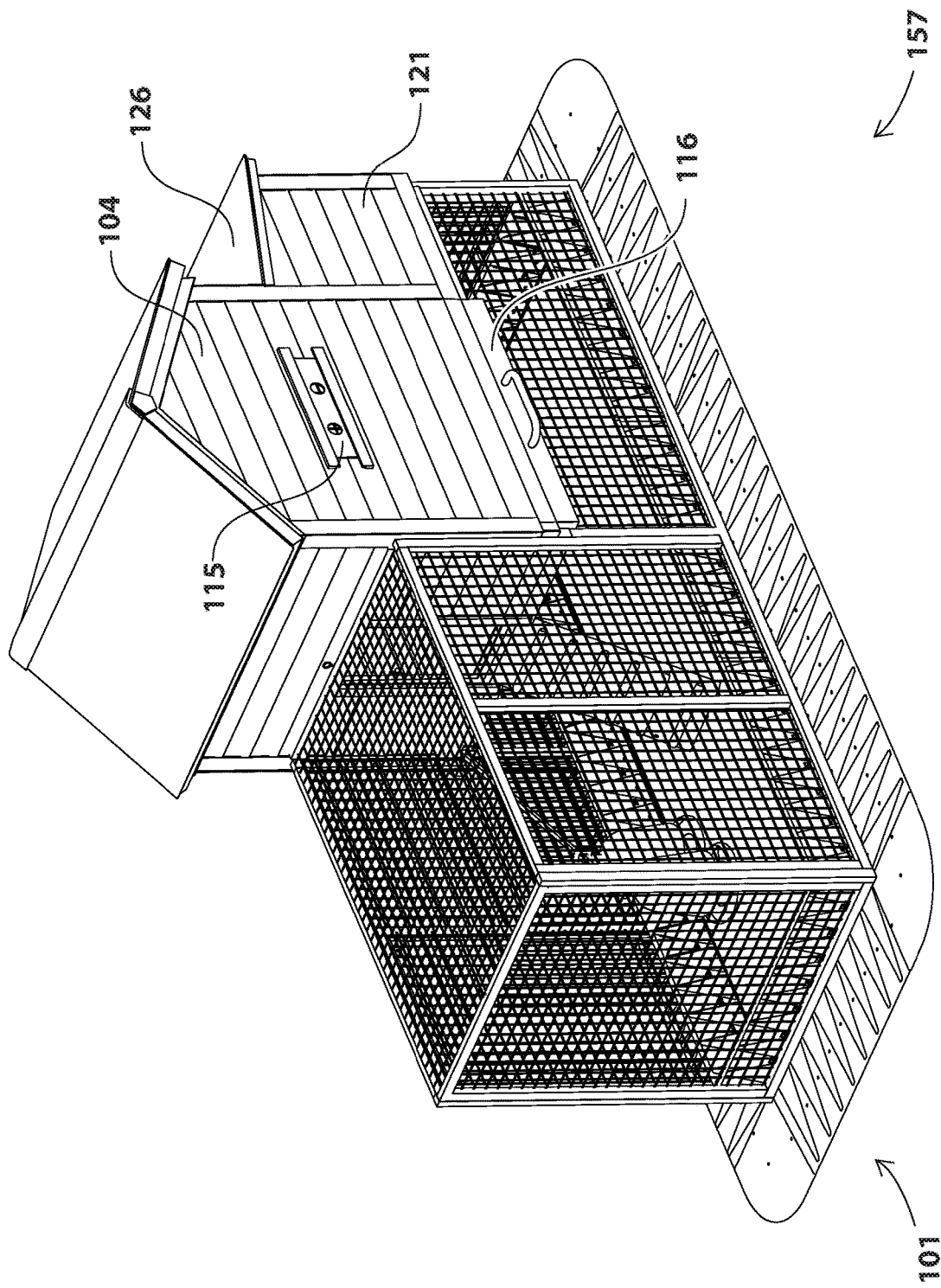
Figure 1D:
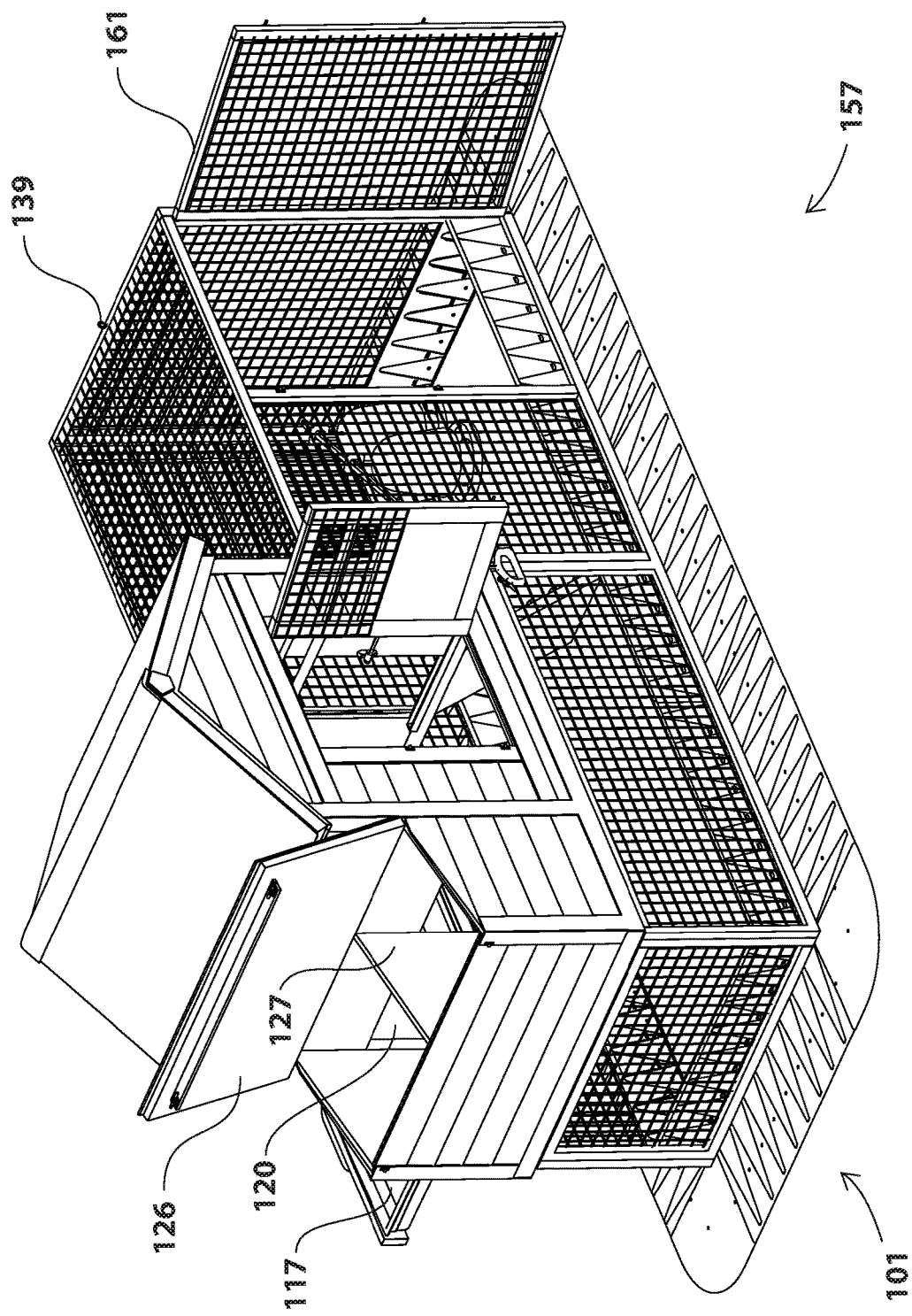
Figure 1F:
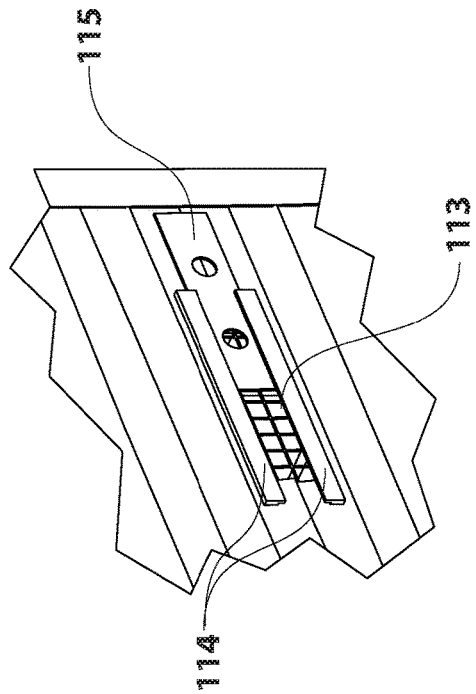
FIG. 1E, FIG. 1F, and FIG. 1G illustrate perspective views of the assembly of easy-access door, ventilation-opening sliding door, and waste tray.
Figure 1G:
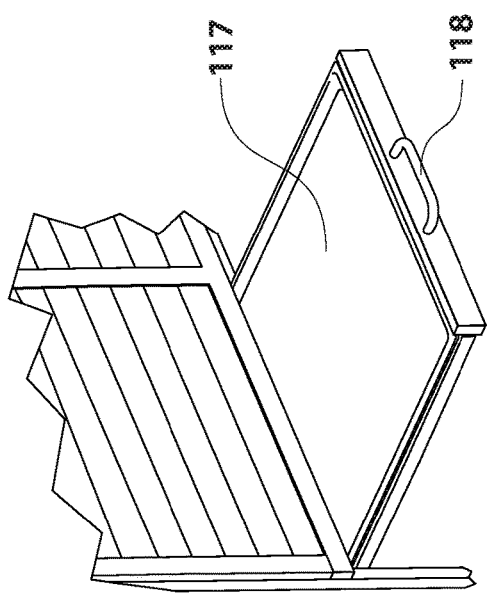
Figure 1E:
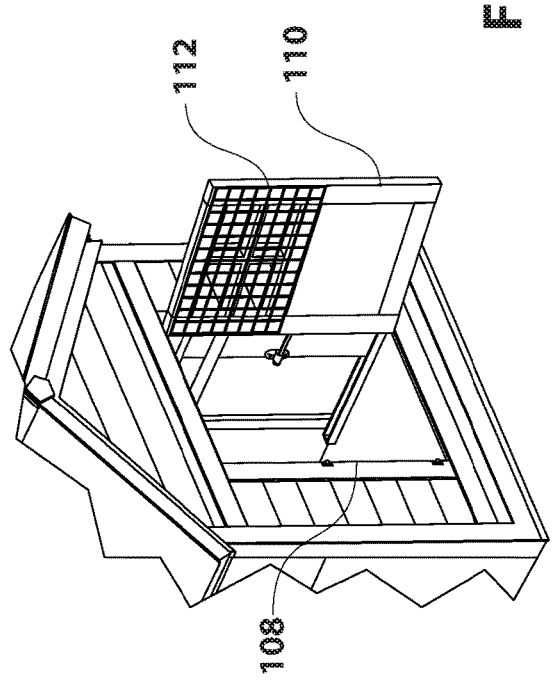
Figure 2B:
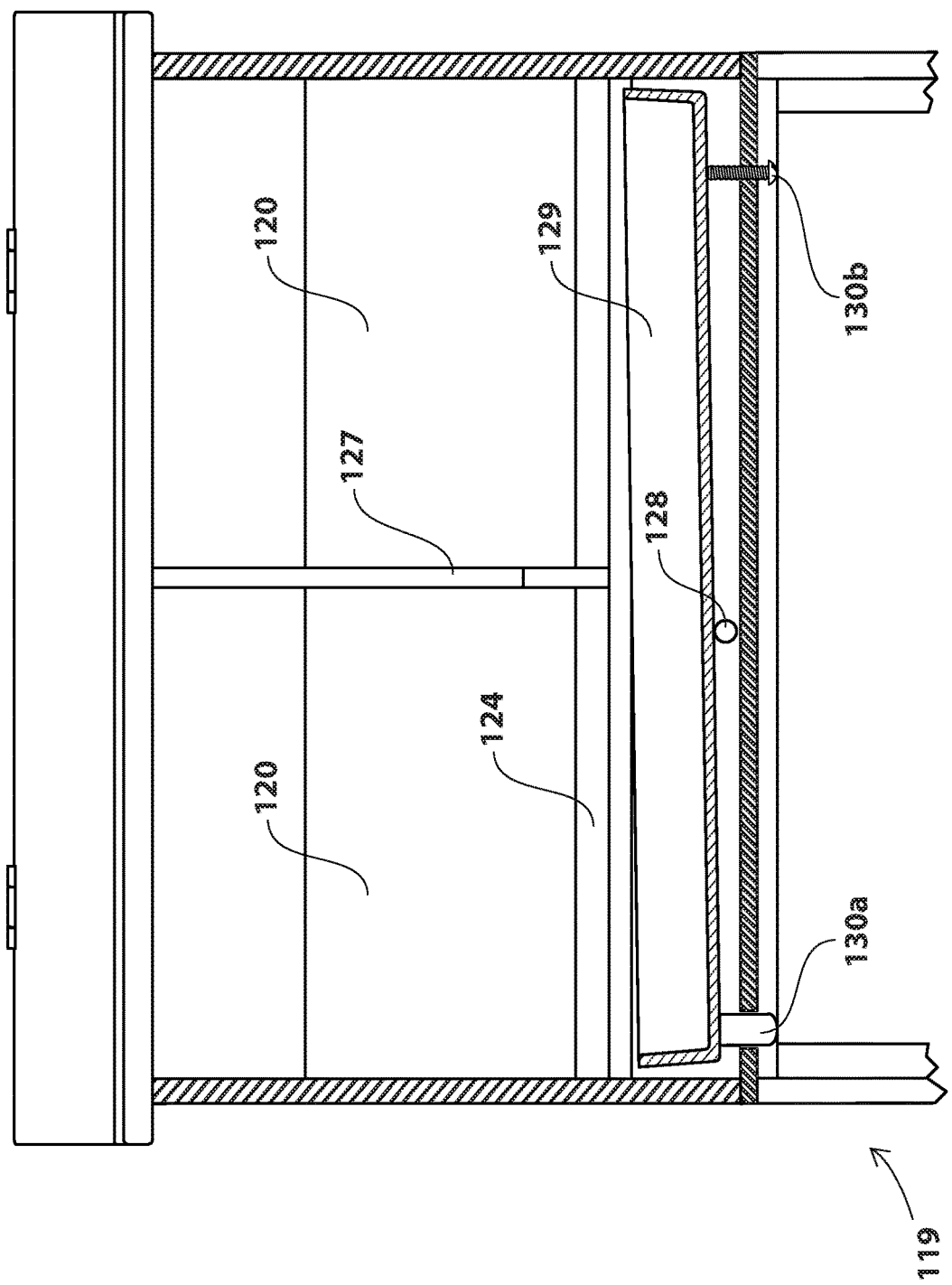
Figure 3:
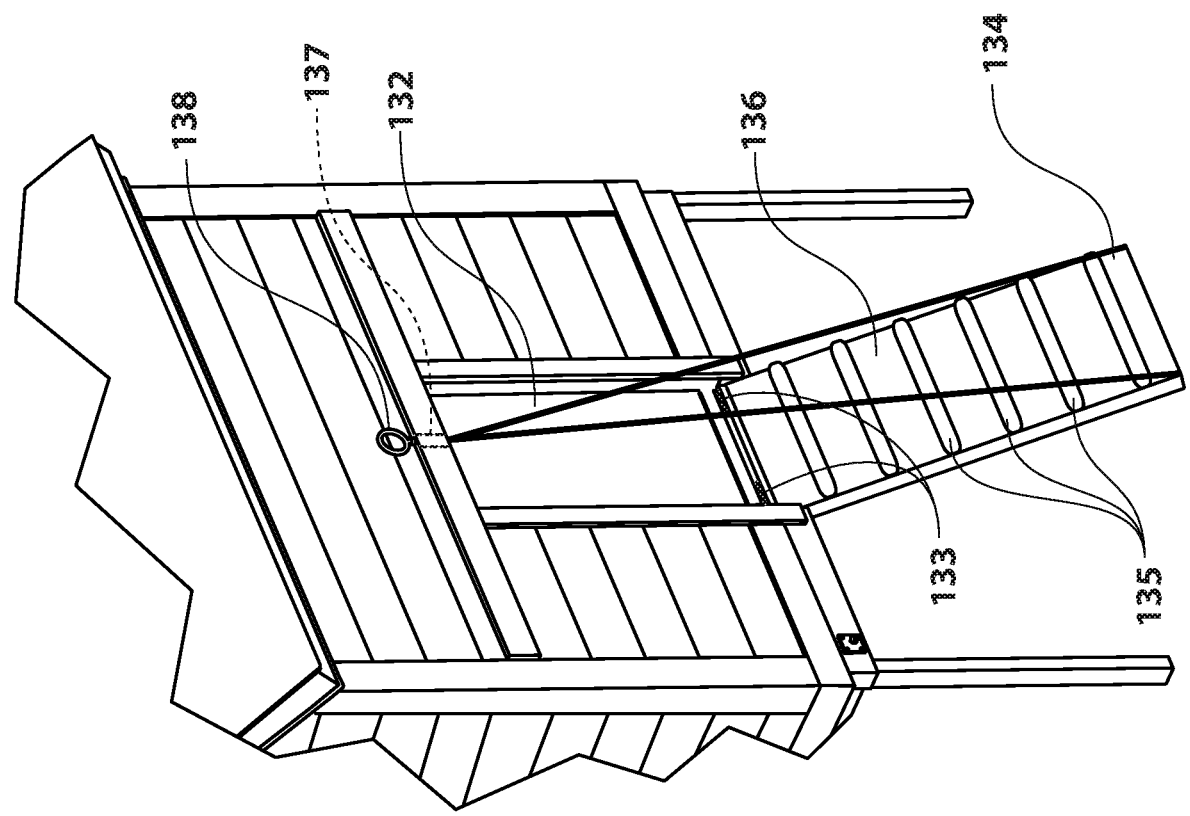
FIG. 3, FIG. 4, and FIG. 5 illustrate perspective views of the assembly of cable draw-ramp system and automatic-hook sliding-door system.
Figure 4:
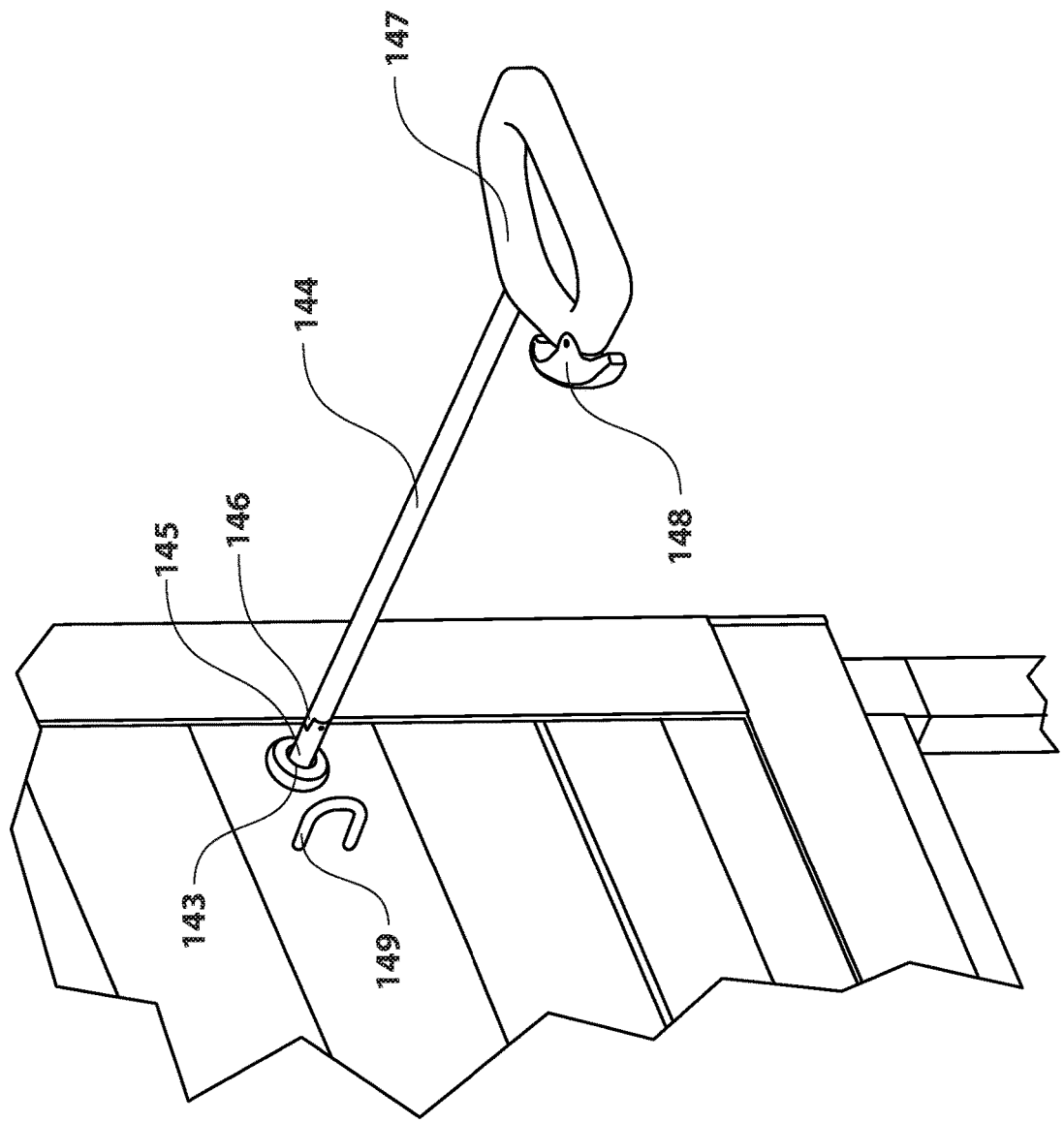
Figure 5:
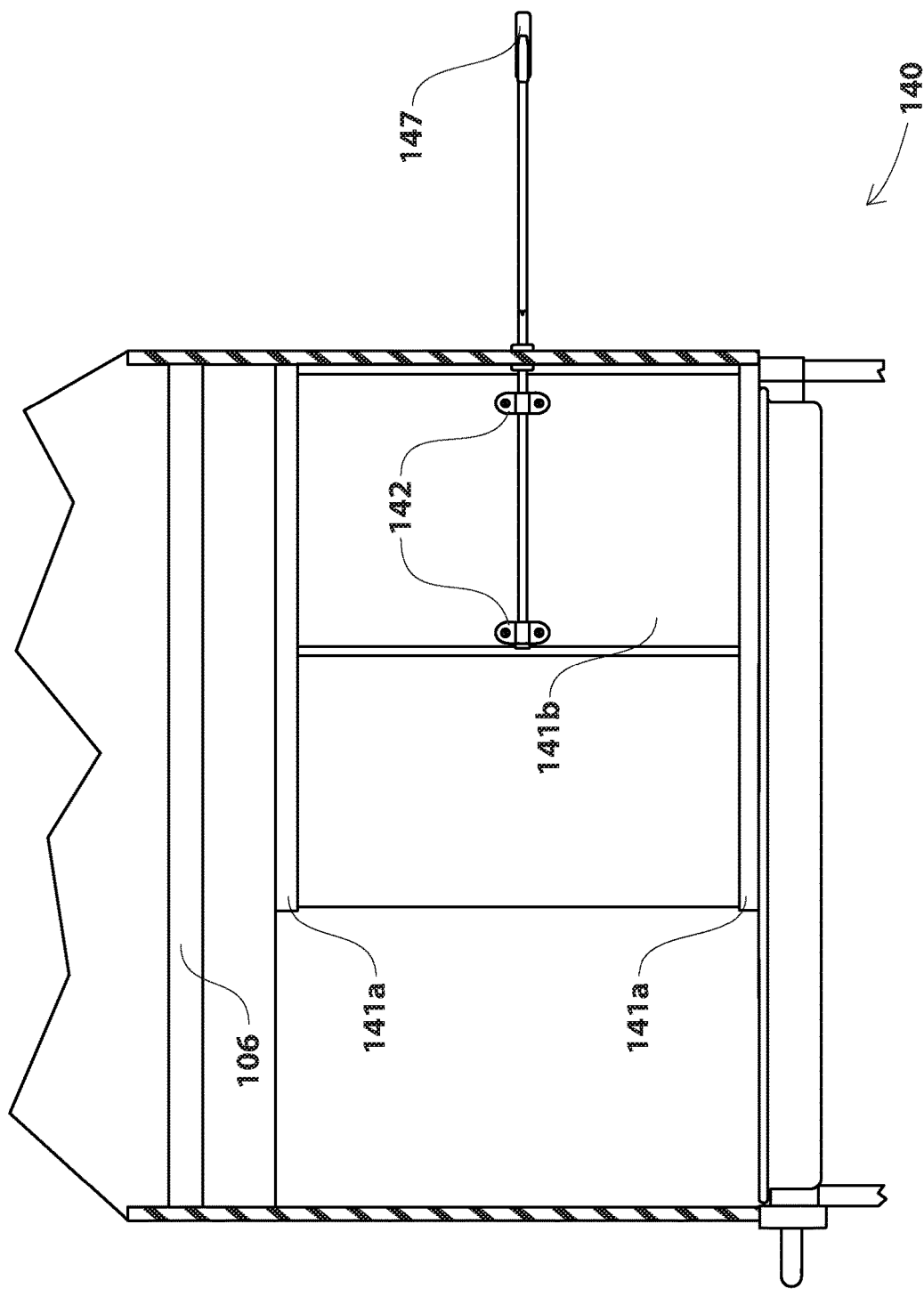
Figure 7A:
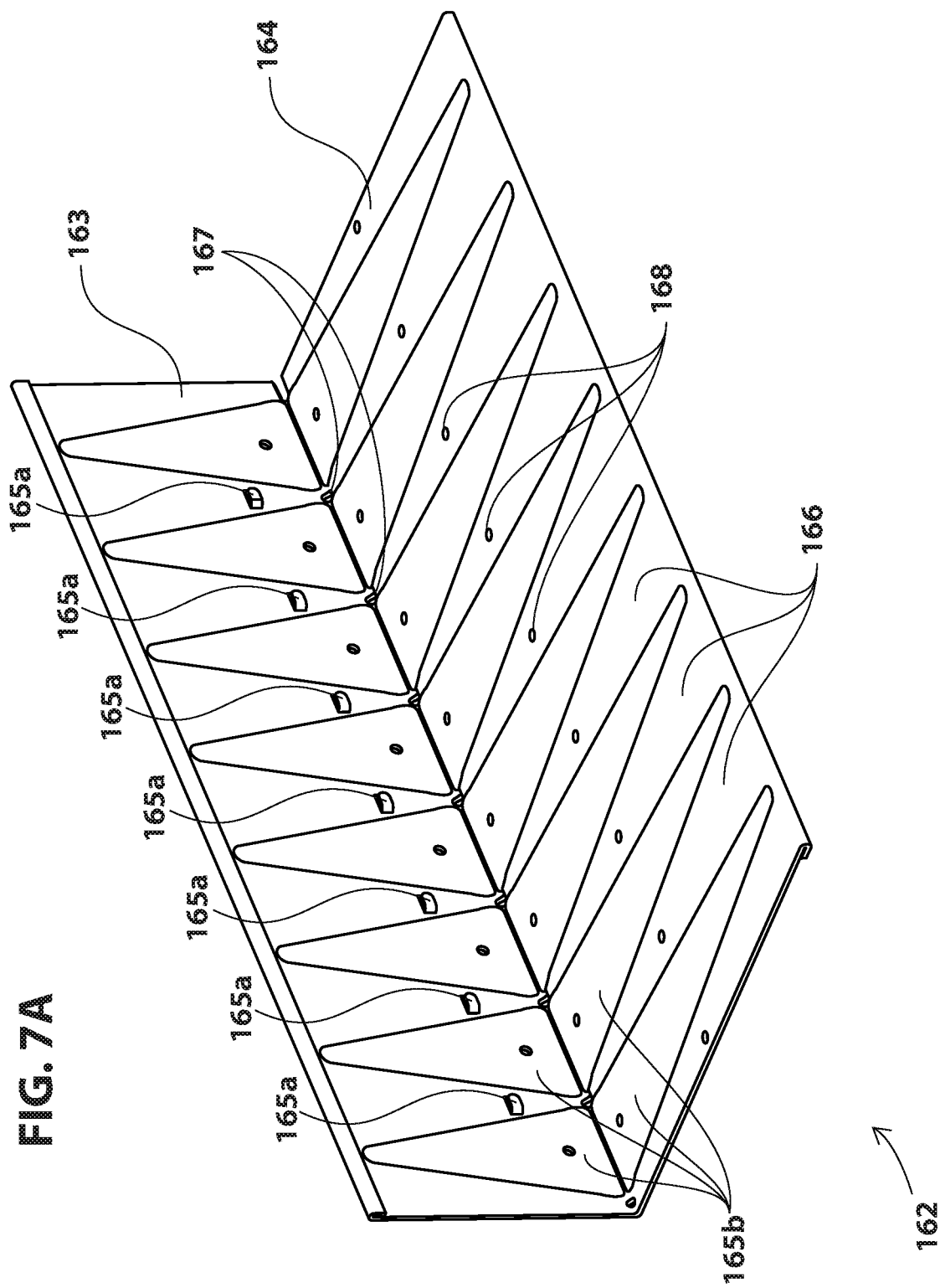
FIG. 7A, FIG. 7B, and FIG. 7C illustrate perspective, top, and front views of wire-strengthening anti-pushing vertical shield and panel-strengthening anti-growing anti-digging horizontal shield.
Figure 7B:
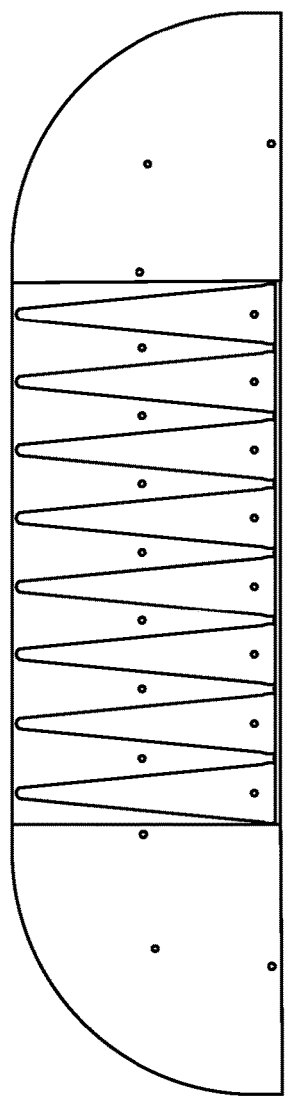
Figure 7C:
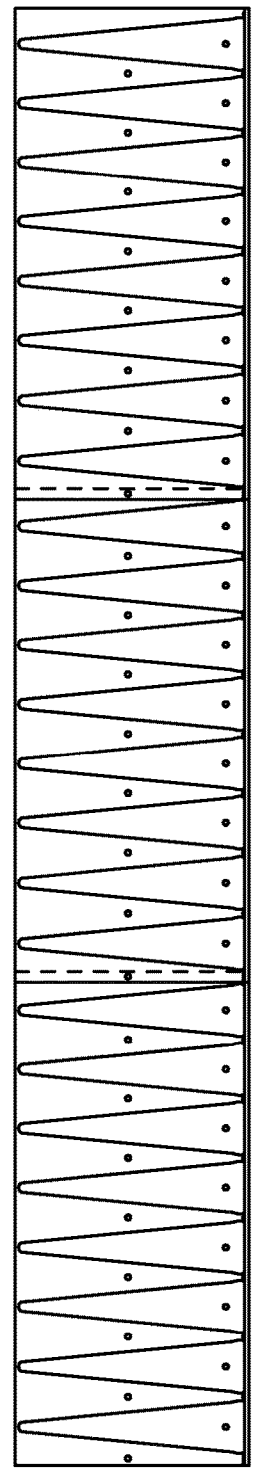

The draw-ramp egg-teeter-totter wild-animal-shield chicken coop comprises:
1) Easy-access ventilated roosting system,
2) Automatic-egg-collecting-and-indicating-teeter-totter nesting system,
3) Cable draw-ramp system,
4) Automatic-hook sliding-door system,
5) Easy-access pivotable feeder-and-water system,
6) Extendable chicken-run system,
7) Anti-pushing anti-growing anti-digging anti-rotting shield systems, and
8) Automatic-relatching-twistable-compressable-spring latch systems.
Component
Referring to FIG. 1A, FIG. 1B, FIG. 1C, FIG. 1D, FIG. 1E, FIG. 1F, FIG. 1G, FIG. 2A, FIG. 2B, FIG. 3, FIG. 4, FIG. 5, FIG. 6A, FIG. 6B, FIG. 7A, FIG. 7B, FIG. 7C, FIG. 8, and FIG. 9, the draw-ramp egg-teeter-totter wild-animal-shield chicken coop (having: 1) Easy-access ventilated roosting system, 2) Automatic-egg-collecting-and-indicating-teeter-totter nesting system, 3) Cable draw-ramp system, 4) Automatic-hook sliding-door system, 5) Easy-access pivotable feeder-and-water system, 6) Extendable chicken-run system, 7) Anti-pushing anti-growing anti-digging anti-rotting shield systems, and 8) Automatic-relatching-twistable-compressable-spring latch systems) comprises:
1) Easy-access ventilated roosting system 101, comprising:
2) First roosting wall 102,
3) Second roosting wall 103,
4) Third roosting wall 104,
5) Fourth roosting wall 105, 6) Roosting rod 106,
7) Roosting roof 107,
8) Easy-access opening 108,
9) Easy-access door hinges 109,
10) Easy-access door 110,
11) Window opening 111,
12) Window wire panel 112,
13) Ventilation opening 113,
14) Ventilation-opening rails 114,
15) Ventilation-opening sliding door 115,
16) Waste-tray opening 116,
17) Waste tray 117,
18) Waste-tray handle 118;
19) Automatic-egg-collecting-and-indicating-teeter-totter nesting system 119, comprising:
  20) Passage opening 120,
  21) First nesting wall 121,
  22) Second nesting wall 122,
  23) Third nesting wall 123,
  24) Slanted nesting floor 124,
  25) Nesting-roof hinges 125,
  26) Nesting roof 126,
  27) Nesting divider 127,
  28) Automatic-egg-collecting-teeter-totter axle 128,
  29) Automatic-egg-collecting teeter-totter 129,
  30) Automatic egg-laying indicator 130*a*,
  Teeter-totter-angle-adjusting screw 130*b*,
31) Cable draw-ramp system 131, comprising:
  32) Draw-ramp opening 132,
  33) Draw-ramp hinges 133,
  34) Draw ramp 134,
  35) Draw-ramp steps 135,
  36) Draw-ramp cable 136,
  37) Cable tunnel 137,
  38) Cable ring 138,
  39) Cable hook 139,
40) Automatic-hook sliding-door system 140, comprising:
  41) Draw-ramp-opening rails 141*a*,
  Draw-ramp-opening sliding door 141*b*,
  42) Door-rod braces 142,
  43) Door-rod hole 143,
  44) First door rod 144,
  45) Second door rod 145,
  46) Door-rod joint 146,
  47) Door-rod handle 147,
  48) Automatic spring-loaded handle hook 148,
  49) Handle-hook ring 149;
50) Easy-access pivotable feeder-and-water system 150, comprising:
  51) Pivotable-arm brace 151,
  52) Pivotable L-shaped arm 152,
  53) Feeder ring 153,
  54) Conventional feeder 154,
  55) Water-container ring 155,
  56) Conventional water-container 156,
57) Extendable chicken-run system 157, comprising:
  58) Wire wall panels 158,
  59) At least one wire roof panel 159,
  60) Wire-door-panel hinges 160,
  61) Wire door panel 161; and
  62) Anti-pushing anti-growing anti-digging anti-rotting shield systems 162, each comprising:
    63) Wire-strengthening anti-pushing vertical shield 163,
    64) Panel-strengthening anti-growing anti-digging horizontal shield 164,
    65) Wire-panel-coupling hooks 165*a*,
    Panel-raising anti-rotting ridges 165*b*,
    66) Water-evaporation-inducing alleys 166,
    67) Water-draining holes 167,
    68) Stake holes 168,
    69) Stake handles 169,
    70) Spiral stakes 170;
71) Automatic-relatching-twistable-compressable-spring latch systems 171, each comprising:
  72) Latch-tip brace 172,
  73) Latch-body brace 173,
  74) C-shaped cut-out 174,
  75) Latch 175,
  76) Latch lever 176,
  77) Spring housing 177,
  78) Automatic-relatching twistable compressable spring 178.

Material

Referring to FIG. 1A, FIG. 1B, FIG. 1C, FIG. 1D, FIG. 1E, FIG. 1F, FIG. 1G, FIG. 2A, FIG. 2B, FIG. 3, FIG. 4, FIG. 5, FIG. 6A, FIG. 6B, FIG. 7A, FIG. 7B, FIG. 7C, FIG. 8, and FIG. 9:

1) Easy-access ventilated roosting system 101
  is made of the combined materials of its components.
2) First roosting wall 102
  is made of metallic, wooden, plastic, and/or composite material.
3) Second roosting wall 103
  is made of metallic, wooden, plastic, and/or composite material.
4) Third roosting wall 104
  is made of metallic, wooden, plastic, and/or composite material.
5) Fourth roosting wall 105
  is made of metallic, wooden, plastic, and/or composite material.
6) Roosting rod 106
  is made of metallic, wooden, plastic, and/or composite material.
7) Roosting roof 107
  is made of asphalt or waterproof material.
8) Easy-access opening 108
  is made of empty space.
9) Easy-access door hinges 109
  each are made of metallic or plastic material.
10) Easy-access door 110
  is made of metallic, wooden, plastic, and/or composite material.
11) Window opening 111
  is made of empty space.
12) Window wire panel 112
  is made of metallic or plastic material.
13) Ventilation opening 113
  is made of empty space.
14) Ventilation-opening rails 114
  each are made of metallic or plastic material.
15) Ventilation-opening sliding door 115
  is made of metallic, wooden, plastic, and/or composite material.
16) Waste-tray opening 116
  is made of empty space.
17) Waste tray 117
  is made of galvanized, wooden, plastic, and/or composite material.
18) Waste-tray handle 118
  is made of galvanized, metallic, wooden, plastic, and/or composite material.

19) Automatic-egg-collecting-and-indicating-teeter-totter nesting system 119
is made of the combined materials of its components.
20) Passage opening 120
is made of empty space.
21) First nesting wall 121
is made of metallic, wooden, plastic, and/or composite material.
22) Second nesting wall 122
is made of metallic, wooden, plastic, and/or composite material.
23) Third nesting wall 123
is made of metallic, wooden, plastic, and/or composite material.
24) Slanted nesting floor 124
is made of metallic, wooden, plastic, and/or composite material.
25) Nesting-roof hinges 125
each are made of metallic or plastic material.
26) Nesting roof 126
is made of asphalt or waterproof material.
27) Nesting divider 127
is made of metallic, wooden, plastic, and/or composite material.
28) Automatic-egg-collecting-teeter-totter axle 128
is made of metallic, wooden, plastic, and/or composite material.
29) Automatic egg-collecting teeter-totter 129
is made of metallic, wooden, plastic, and/or composite material.
30) Automatic egg-laying indicator 130a
is made of metallic, wooden, plastic, and/or composite material. Teeter-totter-angle-adjusting screw 130b
is made of metallic, wooden, plastic, and/or composite material.
31) Cable draw-ramp system 131
is made of the combined materials of its components.
32) Draw-ramp opening 132
is made of empty space.
33) Draw-ramp hinges 133
each are made of metallic or plastic material.
34) Draw ramp 134
is made of metallic, wooden, plastic, and/or composite material.
35) Draw-ramp steps 135
each are made of metallic, wooden, plastic, and/or composite material.
36) Draw-ramp cable 136
is made of nylon, metallic, and/or plastic material.
37) Cable tunnel 137
is made of empty space.
38) Cable ring 138
is made of metallic, wooden, plastic, and/or composite material.
39) Cable hook 139
is made of metallic, wooden, plastic, and/or composite material.
40) Automatic-hook sliding-door system 140
is made of the combined materials of its components.
41) Door-ramp-opening rails 141
each are made of metallic, wooden, plastic, and/or composite material. Door-ramp-opening sliding door 141b
is made of metallic, wooden, plastic, and/or composite material.
42) Door-rod braces 142
each are made of metallic, wooden, plastic, and/or composite material.
43) Door-rod hole 143
is made of empty space.
44) First door rod 144
is made of metallic, wooden, plastic, and/or composite material.
45) Second door rod 145
is made of metallic, wooden, plastic, and/or composite material.
46) Door-rod joint 146
is made of metallic, wooden, plastic, and/or composite material.
47) Door-rod handle 147
is made of metallic, wooden, plastic, and/or composite material.
48) Automatic spring-loaded handle hook 148
is made of metallic, wooden, plastic, and/or composite material.
49) Handle-hook ring 149
is made of metallic, wooden, plastic, and/or composite material.
50) Easy-access pivotable feeder-and-water system 150
is made of the combined materials of its components.
51) Pivotable-arm brace 151
is made of metallic, wooden, plastic, and/or composite material.
52) Pivotable L-shaped arm 152
is made of metallic, wooden, plastic, and/or composite material.
53) Feeder ring 153
is made of metallic, rubber, plastic, and/or composite material.
54) Conventional feeder 154
is made of metallic, plastic, and/or composite material.
55) Water-container ring 155
is made of metallic, rubber, plastic, and/or composite material.
56) Conventional water-container 156
is made of metallic, plastic, and/or composite material.
57) Extendable chicken-run system 157
is made of the combined materials of its components.
58) Wire wall panels 158
each are made of metallic, plastic, and/or wooden material.
59) At least one wire roof panel 159
is made of metallic, plastic, and/or wooden material.
60) Wire-door-panel hinges 160
each are made of metallic or plastic material.
61) Wire door panel 161
is made of metallic, plastic, and/or wooden material.
62) Anti-pushing anti-growing anti-digging anti-rotting shield systems 162
each are made of the combined materials of its components.
63) Wire-strengthening anti-pushing vertical shield 163
is made of metallic or plastic material.
64) Panel-strengthening anti-growing anti-digging horizontal shield 164
is made of metallic or plastic material.
65) Wire-panel-coupling hooks 165a
each are made of metallic or plastic material.
Panel-raising anti-rotting ridges 165b
each are made of metallic or plastic material.
66) Water-evaporation-inducing alleys 166
each are made of empty space.
67) Water-draining holes 167
each are made of empty space.

68) Stake holes 168
each are made of empty space.
69) Stake handles 169
each are made of metallic or plastic material.
70) Spiral stakes 170
each are made of metallic or plastic material.
71) Automatic-relatching-twistable-compressable-spring latch systems 171
each are made of the combined materials of its components.
72) Latch-tip brace 172
is made of metallic or plastic material.
73) Latch-body brace 173
is made of metallic or plastic material.
74) C-shaped cut-out 174
is made of empty space.
75) Latch 175
is made of metallic or plastic material.
76) Latch lever 176
is made of metallic or plastic material.
77) Spring housing 177
is made of metallic or plastic material.
78) Automatic-relatching twistable compressable spring 178
is made of metallic or plastic material.

Shape

Referring to FIG. 1A, FIG. 1B, FIG. 1C, FIG. 1D, FIG. 1E, FIG. 1F, FIG. 1G, FIG. 2A, FIG. 2B, FIG. 3, FIG. 4, FIG. 5, FIG. 6A, FIG. 6B, FIG. 7A, FIG. 7B, FIG. 7C, FIG. 8, and FIG. 9:

1) Easy-access ventilated roosting system 101
has the combined shapes of its components.
2) First roosting wall 102
has a square or rectangular shape with a gable top section.
3) Second roosting wall 103
has a square or rectangular shape.
4) Third roosting wall 104
has a square or rectangular shape.
5) Fourth roosting wall 105
has a square or rectangular shape with a gable top section.
6) Roosting rod 106
has a round-cylinder shape.
7) Roosting roof 107
has a double-rectangle shape.
8) Easy-access opening 108
has a square or rectangular shape.
9) Easy-access door hinges 109
each have a square-or-rectangular-hinge shape.
10) Easy-access door 110
has a rectangular shape.
11) Window opening 111
has a square or rectangular shape.
12) Window wire panel 112
has a square or rectangular shape.
13) Ventilation opening 113
has a square or rectangular shape.
14) Ventilation-opening rails 114
each have a rectangular shape with an L-or-U-shaped cross-section.
15) Ventilation-opening sliding door 115
has a rectangular shape.
16) Waste-tray opening 116
has a square or rectangular shape.
17) Waste tray 117
has a rectangular shape.
18) Waste-tray handle 118
has a C shape.
19) Automatic-egg-collecting-and-indicating-teeter-totter nesting system 119
has the combined shapes of its components.
20) Passage opening 120
has a square or rectangular shape.
21) First nesting wall 121
has a square or rectangular shape.
22) Second nesting wall 122
has a square or rectangular shape.
23) Third nesting wall 123
has a square or rectangular shape.
24) Slanted nesting floor 124
has a square or rectangular shape.
25) Nesting-roof hinges 125
each have a square or rectangular-hinge shape.
26) Nesting roof 126
has a rectangular shape.
27) Nesting divider 127
has a parallelogram, square, or rectangular shape.
28) Automatic-egg-collecting-teeter-totter axle 128
has a shape.
29) Automatic egg-collecting teeter-totter 129
has a rectangular-trough shape with a U-shaped cross-section.
30) Automatic egg-laying indicator 130*a*
has a rod-like shape with a square, rectangular, or round cross-section. Teeter-totter-angle-adjusting screw 130*b*
has a threaded screw shape.
31) Cable draw-ramp system 131
has the combined shapes of its components.
32) Draw-ramp opening 132
has a square or rectangular shape.
33) Draw-ramp hinges 133
each have a square-or-rectangular-hinge shape.
34) Draw ramp 134
has a square or rectangular shape.
35) Draw-ramp steps 135
each have a square or rectangular shape.
36) Draw-ramp cable 136
has a cable shape with a round cross-section.
37) Cable tunnel 137
has a round shape.
38) Cable ring 138
has a ring shape.
39) Cable hook 139
has a C shape with a threaded I-shaped tail.
40) Automatic-hook sliding-door system 140
has the combined shapes of its components.
41) Draw-ramp-opening rails 141
each have a rectangular shape with an L-or-U-shaped cross-section.
Draw-ramp-opening sliding door 141*b*
has a square or rectangular shape.
42) Door-rod braces 142
each have a C shape.
43) Door-rod hole 143
has a round shape.
44) First door rod 144
has a rod shape with a round cross-section.
45) Second door rod 145
has a rod shape with a round cross-section.
46) Door-rod joint 146
has a double-half-moon shape with a round door-rod-joint axle.
47) Door-rod handle 147
has a D shape.

48) Automatic spring-loaded handle hook 148
has a C shape.
49) Handle-hook ring 149
has a C or O shape.
50) Easy-access pivotable feeder-and-water system 150
has the combined shapes of its components.
51) Pivotable-arm brace 151
has a C shape.
52) Pivotable L-shaped arm 152
has an L shape with a square or round cross-section.
53) Feeder ring 153
has a ring shape.
54) Conventional feeder 154
has a conventional-chicken-feeder shape.
55) Water-container ring 155
has a ring shape.
56) Conventional water-container 156
has a conventional-chicken-water-container shape.
57) Extendable chicken-run system 157
has the combined shapes of its components.
58) Wire wall panels 158
each have a square or rectangular shape.
59) At least one wire roof panel 159
has a square or rectangular shape.
60) Wire-door-panel hinges 160
each have a square-or-rectangular-hinge shape.
61) Wire door panel 161
has a square or rectangular shape.
62) Anti-pushing anti-growing anti-digging anti-rotting shield systems 162
each have the combined shapes of its components.
63) Wire-strengthening anti-pushing vertical shield 163
has a square or rectangular shape.
64) Panel-strengthening anti-growing anti-digging horizontal shield 164
has a square or rectangular shape.
65) Wire-panel-coupling hooks 165*a*
each have a square, rectangular, or triangular shape.
Panel-raising anti-rotting ridges 165*b*
each have a square, rectangular, or triangular shape.
66) Water-evaporation-inducing alleys 166
each have a square, rectangular, or triangular shape.
67) Water-draining holes 167
each have a round or square shape.
68) Stake holes 168
each have a round or square shape.
69) Stake handles 169
each have a round, square, rectangular, or triangular shape.
70) Spiral stakes 170
each have a round-or-square-rod shape with a surrounding spiral blade.
71) Automatic-relatching-twistable-compressable-spring latch systems 171
each have the combined shapes of its components.
72) Latch-tip brace 172
has a C shape.
73) Latch-body brace 173
has an elongated C shape.
74) C-shaped cut-out 174
has a C shape.
75) Latch 175
has a I shape.
76) Latch lever 176
has a pendulum shape.
77) Spring housing 177
has a cup shape with a round cross-section.
78) Automatic-relatching twistable compressable spring 178
has a coil shape.

Connection

Referring to FIG. 1A, FIG. 1B, FIG. 1C, FIG. 1D, FIG. 1E, FIG. 1F, FIG. 1G, FIG. 2A, FIG. 2B, FIG. 3, FIG. 4, FIG. 5, FIG. 6A, FIG. 6B, FIG. 7A, FIG. 7B, FIG. 7C, FIG. 8, and FIG. 9:

1) Easy-access ventilated roosting system 101
has the combined connections of its components.
2) First roosting wall 102
is attached to and between second roosting wall 103 and third roosting wall 104 along its two opposite edges.
3) Second roosting wall 103
is attached to fourth roosting wall 105 along one of its edges.
4) Third roosting wall 104
is attached to fourth roosting wall 105 along one of its edges.
5) Fourth roosting wall 105
is attached to and between second roosting wall 103 and third roosting wall 104.
6) Roosting rod 106
is attached to and between second roosting wall 103 and third roosting wall 104.
7) Roosting roof 107
is attached to first roosting wall 102, second roosting wall 103, third roosting wall 104, and fourth roosting wall 105.
8) Easy-access opening 108
is formed in second roosting wall 103.
9) Easy-access door hinges 109
respectively are attached to second roosting wall 103 along one of the edges of easy-access opening 108.
10) Easy-access door 110
is pivotably attached to easy-access door hinges 109.
11) Window opening 111
is formed in easy-access door 110.
12) Window wire panel 112
is attached to easy-access door 110 along the edges of window opening 111.
13) Ventilation opening 113
is formed in third roosting wall 104.
14) Ventilation-opening rails 114
respectively are attached to third roosting wall 104 along the top and bottom edges of ventilation opening 113.
15) Ventilation-opening sliding door 115
is slidably attached to and between ventilation-opening rails 114.
16) Waste-tray opening 116
is formed in third roosting wall 104 under passage opening 120.
17) Waste tray 117
is inserted through waste-tray opening 116.
18) Waste-tray handle 118
is attached to waste tray 117.
19) Automatic-egg-collecting-and-indicating-teeter-totter nesting system 119
has the combined connections of its components.
20) Passage opening 120
is formed in third roosting wall 104 above waste-tray opening 116.
21) First nesting wall 121
is attached to third roosting wall 104 along one side edge of passage opening 120.

22) Second nesting wall 122
is attached to third roosting wall 104 along another side edge of passage opening 120.
23) Third nesting wall 123
is attached to and between first nesting wall 121 and second nesting wall 122.
24) Slanted nesting floor 124
is attached to first nesting wall 121 and second nesting wall 122 along their bottom edges.
25) Nesting-roof hinges 125
respectively are attached to fourth roosting wall 105 along the top edge of passage opening 120.
26) Nesting roof 126
is pivotably attached to nesting-roof hinges 125.
27) Nesting divider 127
is attached to slanted nesting floor 124 and/or third roosting wall 104.
28) Automatic-egg-collecting-teeter-totter axle 128
is attached to slanted nesting floor 124 and/or second nesting wall 122.
29) Automatic egg-collecting teeter-totter 129
is seesawingly attached to automatic-egg-collecting-teeter-totter axle 128 through its first half on one side of its invisible vertical central axis.
30) Automatic egg-laying indicator 130*a*
is attached to one of two opposite ends of automatic egg-collecting teeter-totter 129.
Teeter-totter-angle-adjusting screw 130*b*
is threadedly attached to another one of two opposite ends of automatic egg-collecting teeter-totter 129.
31) Cable draw-ramp system 131
has the combined connections of its components.
32) Draw-ramp opening 132
is formed in first roosting wall 102.
33) Draw-ramp hinges 133
respectively are attached to first roosting wall 102 along the bottom edge of door-ramp opening 132.
34) Draw ramp 134
is pivotably attached to draw-ramp hinges 133 along the first end of door ramp 134.
35) Draw-ramp steps 135
respectively are attached to the surface of door ramp 134.
36) Draw-ramp cable 136
is attached to the second end of door ramp 134 via the first end of draw-ramp cable 136 and
is threaded through cable tunnel 137.
37) Cable tunnel 137
is formed through first roosting wall 102.
38) Cable ring 138
is attached to the second end of door-ramp cable 136.
39) Cable hook 139
is attached to one of wire wall panels 158 or wire roof panel 159.
40) Automatic-hook sliding-door system 140
has the combined shapes of its components.
41) Draw-ramp-opening rails 141*a*
respectively are attached to first roosting wall 102 along the top and bottom edges of door-ramp opening 132.
Draw-ramp-opening sliding door 141*b*
is slidably attached to and between draw-ramp-opening rails 141*a*.
42) Door-rod braces 142
respectively are attached to draw-ramp-opening sliding door 141*b*.
43) Door-rod hole 143
is formed through second roosting wall 103.
44) First door rod 144
is attached to door-rod braces 142,
is inserted through door-rod hole 143, and
is pivotably attached to door-rod joint 146.
45) Second door rod 145
is pivotably attached to door-rod joint 146.
46) Door-rod joint 146
is pivotably coupled to first door rod 144 and second door rod 145.
47) Door-rod handle 147
is attached to second door rod 145.
48) Automatic spring-loaded handle hook 148
is seesawingly attached to door-rod handle 147.
49) Handle-hook ring 149
is attached to second roosting wall 103.
50) Easy-access pivotable feeder-and-water system 150
has the combined connections of its components.
51) Pivotable-arm brace 151
is attached to third roosting wall 104.
52) Pivotable L-shaped arm 152
is pivotably attached to pivotable-arm brace 151.
53) Feeder ring 153
is slid on swingable-arm brace 151.
54) Conventional feeder 154
is attached to feeder ring 153.
55) Water-container ring 155
is slid on swingable-arm brace 151.
56) Conventional water-container 156
is attached to water-container ring 155.
57) Extendable chicken-run system 157
has the combined connections of its components.
58) Wire wall panels 158
respectively are attached to one another, and/or
respectively are attached to first roosting wall 102, second roosting wall 103, third roosting wall 104, and/or fourth roosting wall 105.
59) At least one wire roof panel 159
is attached to at least one of wire wall panels 158.
60) Wire-door-panel hinges 160
respectively are attached to one of wire wall panels 158.
61) Wire door panel 161
is pivotably attached to wire-door-panel hinges 160.
62) Anti-pushing anti-growing anti-digging anti-rotting shield systems 162
respectively have the combined connections of its components.
63) Wire-strengthening anti-pushing vertical shield 163
is positioned on the inside of the chicken coop against wire wall panels 158 and wire door panel 161.
64) Panel-strengthening anti-growing anti-digging horizontal shield 164
is molded to wire-strengthening anti-pushing vertical shield 163, and
is positioned under wire wall panels 158 and/or wire door panel 161.
65) Wire-panel-coupling hooks 165*a*
respectively are molded on or formed on wire-strengthening anti-pushing vertical shield 163.
Panel-raising anti-rotting ridges 165*b*
respectively are molded on or formed on wire-strengthening anti-pushing vertical shield 163 and panel-strengthening anti-growing anti-digging horizontal shield 164.
66) Water-evaporation-inducing alleys 166
respectively are formed between panel-raising anti-rotting ridges 165*b*.

67) Water-draining holes 167
respectively are drilled in or formed in wire-strengthening anti-pushing vertical shield 163 and/or panel-strengthening anti-growing anti-digging horizontal shield 164.

68) Stake holes 168
respectively are drilled in or formed in panel-strengthening anti-growing anti-digging horizontal shield 164.

69) Stake handles 169
respectively are molded to one end of spiral stakes 170.

70) Spiral stakes 170
respectively are screwed or driven through stake holes 168 into the ground.

71) Automatic-relatching-twistable-compressable-spring latch systems 171
respectively have the combined connections of its components.

72) Latch-tip brace 172
is attached to second roosting wall 103, second nesting wall 122, or one of wire wall panels 158.

73) Latch-body brace 173
is attached to easy-access door 110, nesting roof 126, or wire door panel 161.

74) C-shaped cut-out 174
is formed in latch-body brace 173.

75) Latch 175
is pivotably and slidably attached to latch-body brace 173.

76) Latch lever 176
is molded to latch 175.

77) Spring housing 177
is molded to latch-body brace 173.

78) Automatic-relatching twistable compressable spring 178
is attached to latch 175 at one of its ends and
is attached to spring housing 177 at another one of its ends.

Function
1) Easy-access ventilated roosting system 101
is for performing the combined functions of its components.
2) First roosting wall 102
is for creating a protected roosting area for chickens.
3) Second roosting wall 103
is for creating a protected roosting area for chickens.
4) Third roosting wall 104
is for creating a protected roosting area for chickens.
5) Fourth roosting wall 105
is for creating a protected roosting area for chickens.
6) Roosting rod 106
is for chickens to perch on to rest and sleep.
7) Roosting roof 107
is for covering and protecting the roosting area from weather elements and wild animals.
8) Easy-access opening 108
is for accessing the roosting area to clean and maintain it.
9) Easy-access door hinges 109
respectively are for attaching easy-access door 110 to second roosting wall 103.
10) Easy-access door 110
is for closing easy-access opening 108.
11) Window opening 111
is for providing a view into the roosting area.
12) Window wire panel 112
is for covering window opening 111.
13) Ventilation opening 113
is for allowing air to enter and odor to exit the roosting area.
14) Ventilation-opening rails 114
respectively are for attaching ventilation-opening sliding door 115 to third roosting wall 104.
15) Ventilation-opening sliding door 115
is for covering ventilation opening 113.
16) Waste-tray opening 116
is for installing and removing waste tray 117.
17) Waste tray 117
is for containing hay, the like, or the equivalent, and/or
is for chickens to rest and sleep thereon.
18) Waste-tray handle 118
is for holding on to install and to remove waste tray 117.
19) Automatic-egg-collecting-and-indicating-teeter-totter nesting system 119
is for performing the combined functions of its components.
20) Passage opening 120
is for allowing chickens to enter the nesting area.
21) First nesting wall 121
is for creating and protecting a nesting area for chickens.
22) Second nesting wall 122
is for creating and protecting a nesting area for chickens.
23) Third nesting wall 123
is for creating and protecting a nesting area for chickens.
24) Slanted nesting floor 124
is for allowing chickens to lay eggs thereon, and
is for allowing eggs to roll down into automatic egg-collecting teeter-totter 129
in the direction of arrows 179
(see FIG. 10A).
25) Nesting-roof hinges 125
respectively are for attaching nesting roof 126 to fourth roosting wall 105.
26) Nesting roof 126
is for covering and protecting the nesting area from weather elements and wild animals.
27) Nesting divider 127
is for dividing the nesting area into two for two chickens.
28) Automatic-egg-collecting-teeter-totter axle 128
is for allowing the two opposite ends of automatic egg-collecting teeter-totter 129
to seesaw
in the direction of arrow 180*a*
when there is at least one egg inside automatic egg-collecting teeter-totter 129
(see FIG. 10B), and
in the direction of arrow 180*b*
when there is no egg inside automatic egg-collecting teeter-totter 129
(see FIG. 10B).
29) Automatic egg-collecting teeter-totter 129
is for:
a) Collecting eggs; and
b) Allowing eggs to roll down to one end of automatic egg-collecting teeter totter 129
in the direction of arrow 180*a*
(see FIG. 10C and FIG. 10D)
to lower automatic egg-laying indicator 130*a* out of the draw-ramp egg-teeter-totter wild-animal-shield chicken coop in the direction of arrow 181*b*
(see FIG. 10C and FIG. 10D)
to indicate that there is at least one egg inside automatic egg-collecting teeter-totter 129
to conveniently let a user from inside a house comfortably know that there is egg(s) laid, without the needs for getting out of a house, walking to nesting system 119, and lifting nesting roof 126 up to check and see if there is any egg laid.

c) Eliminate the needs for getting out of the house, opening nesting roof 126, and looking inside the draw-ramp egg-teeter-totter wild-animal-shield chicken coop to see whether or not there is any egg in automatic egg-collecting teeter-totter 129.

30) Automatic egg-laying indicator 130*a*
is for indicating that there is at least one egg inside automatic egg-collecting teeter-totter 129
in the direction of arrow 181*b*
(see FIG. 10C and FIG. 10D)
to conveniently let a user from inside a house comfortably know that there is egg(s) laid, without the needs for getting out of a house, walking to nesting system 119, and lifting nesting roof 126 up to check and see if there is any egg laid.

Teeter-totter-angle-adjusting screw 130*b*
is for adjusting the slanted angle of automatic egg-collecting teeter-totter 129 to allow eggs to roll down to one end of automatic egg-collecting teeter totter 129
in the direction of arrow 181*b*
(see FIG. 10C and FIG. 10D),
to allow automatic egg-collecting teeter-totter 129 to lower automatic egg-laying indicator 130*a* out of the draw-ramp egg-teeter-totter wild-animal-shield chicken coop
to indicate that there is at least one egg inside automatic egg-collecting teeter-totter 129.

31) Cable draw-ramp system 131
is for performing the combined functions of its components.

32) Draw-ramp opening 132
is for allowing chickens to enter and exit the draw-ramp egg-teeter-totter wild-animal-shield chicken coop.

33) Draw-ramp hinges 133
respectively are for attaching draw ramp 134 to first roosting wall 102.

34) Draw ramp 134
is for closing draw-ramp opening 132 in addition to draw-ramp-opening sliding door 141*b*
in the direction of arrow 182*a*
(see FIG. 11A)
to protect the roosting area.

35) Draw-ramp steps 135
respectively are for providing convex surfaces for chickens to grasp thereon to walk on draw ramp 134.

Figure 11A:
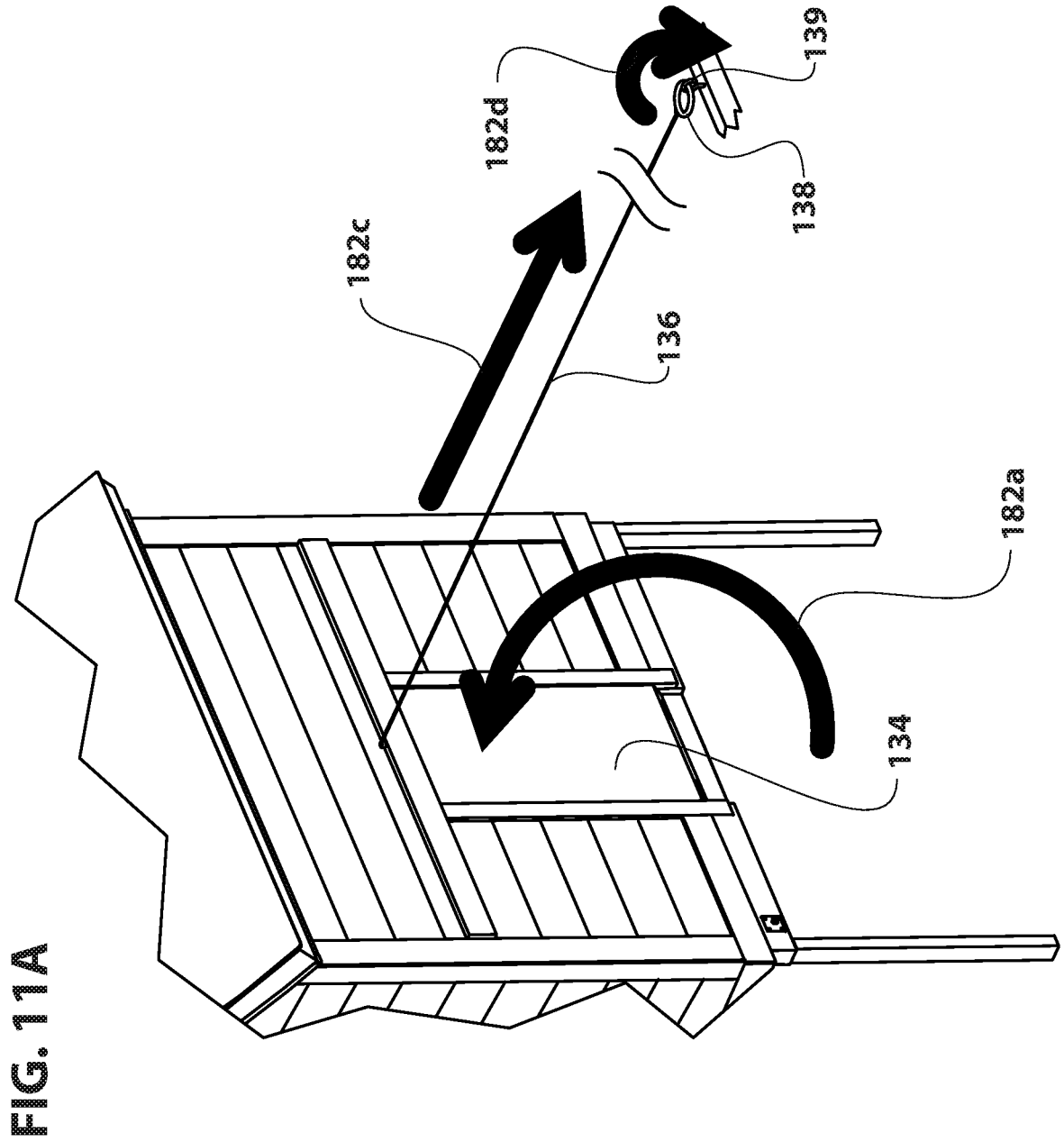
FIG. 11A and FIG. 11B illustrate cross-sectional views of how cable draw-ramp system works.
Figure 11B:
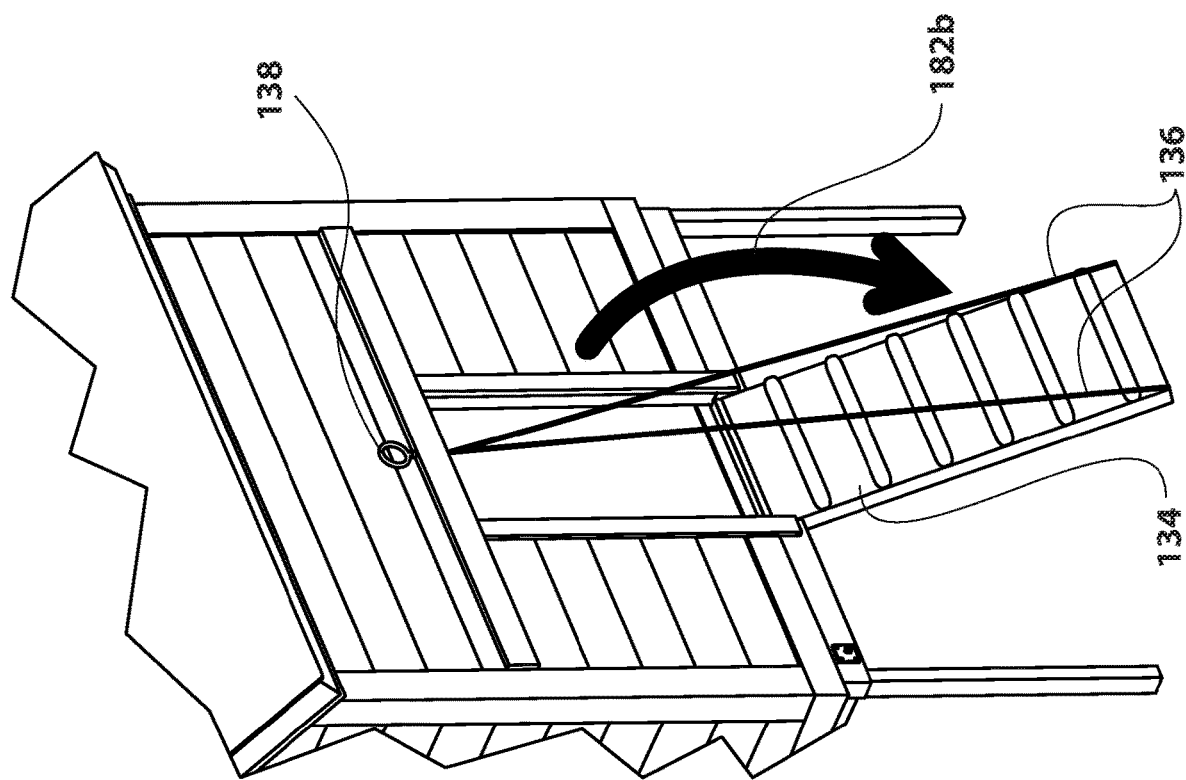

36) Draw-ramp cable 136
is for raising door ramp 134 to close draw-ramp opening 132
in the direction of arrow 182*a*
(see FIG. 11A), and
is for lowering door ramp 134 to open draw-ramp opening 132
in the direction of arrow 182*b*
(see FIG. 11B).

37) Cable tunnel 137
is for threading draw-ramp cable 136 therethrough.

38) Cable ring 138
is for pulling on door-ramp cable 136
in the direction of arrow 182*c*, and
is for hooking on cable hook 139
in the direction of arrow 182*d*
(see FIG. 11A).

39) Cable hook 139
is for hooking cable ring 138 thereon
to keep draw ramp 134 raised and draw-ramp opening 132 closed.

40) Automatic-hook sliding-door system 140
has the combined shapes of its components.

41) Draw-ramp-opening rails 141*a*
respectively are for attaching draw-ramp-opening sliding door 141*b* to first roosting wall 102.

Draw-ramp-opening sliding door 141*b*
is for closing and opening draw-ramp opening 132 in addition to draw ramp 134
in the direction of arrow 183*a*
(see FIG. 12A and FIG. 12B)
to protect the roosting area.

42) Door-rod braces 142
respectively are for attaching first door rod 144 to draw-ramp-opening sliding door 141*b*.

43) Door-rod hole 143
is for inserting first door rod 144 and second door rod 145 therethrough.

44) First door rod 144
is for pulling and pushing on draw-ramp-opening sliding door 141*b*
in the direction of arrow 183*b*
(see FIG. 12A and FIG. 12B).

45) Second door rod 145
is for pulling and pushing on first door rod 144.

Figure 13A:
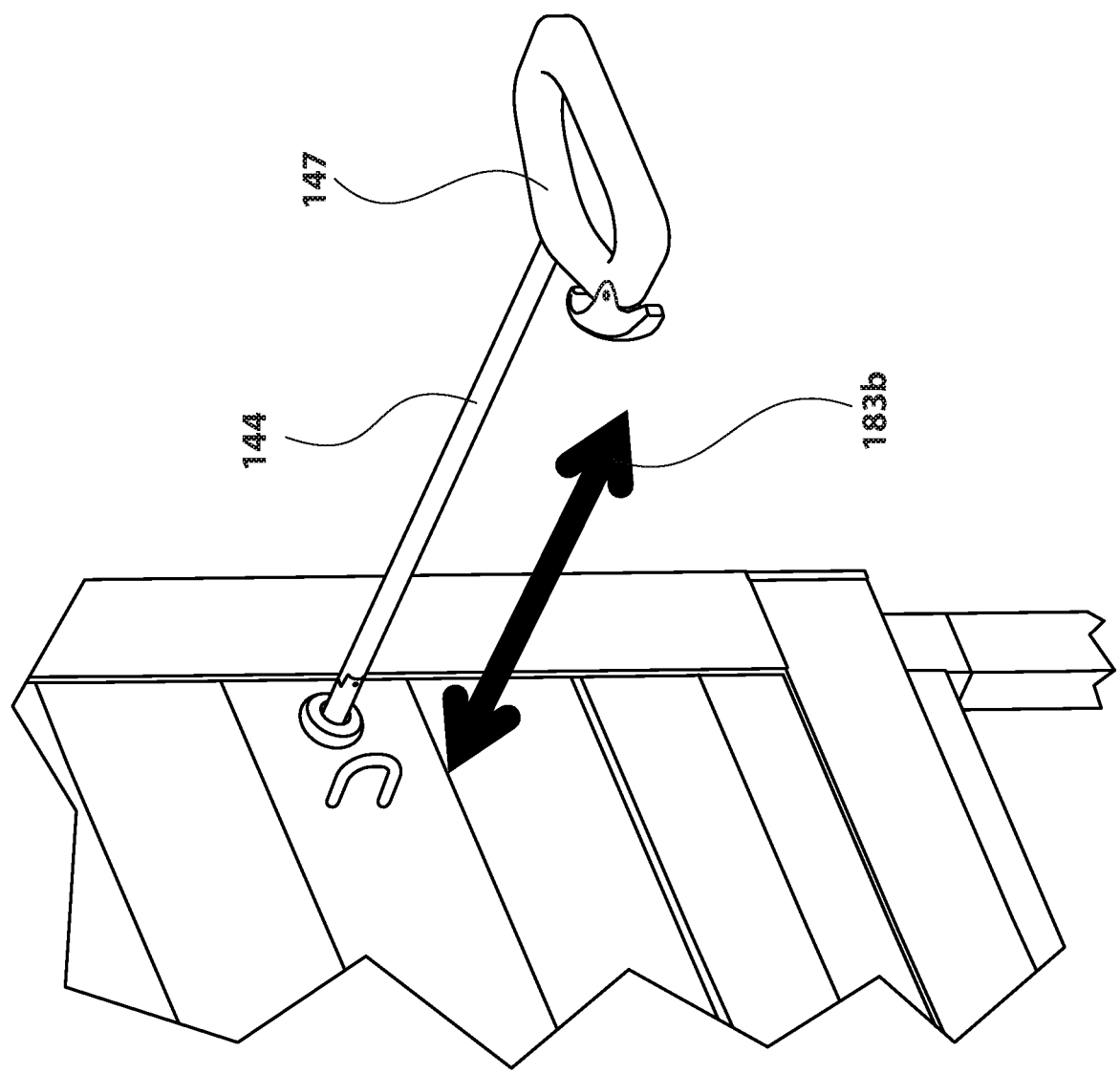

46) Door-rod joint 146
is for pivotably coupling first door rod 144 and second door rod 145
in the direction of arrow 183*c*
(see FIG. 13A and FIG. 13B).

47) Door-rod handle 147
is for pulling and pushing on second door rod 145.

Figure 13C:
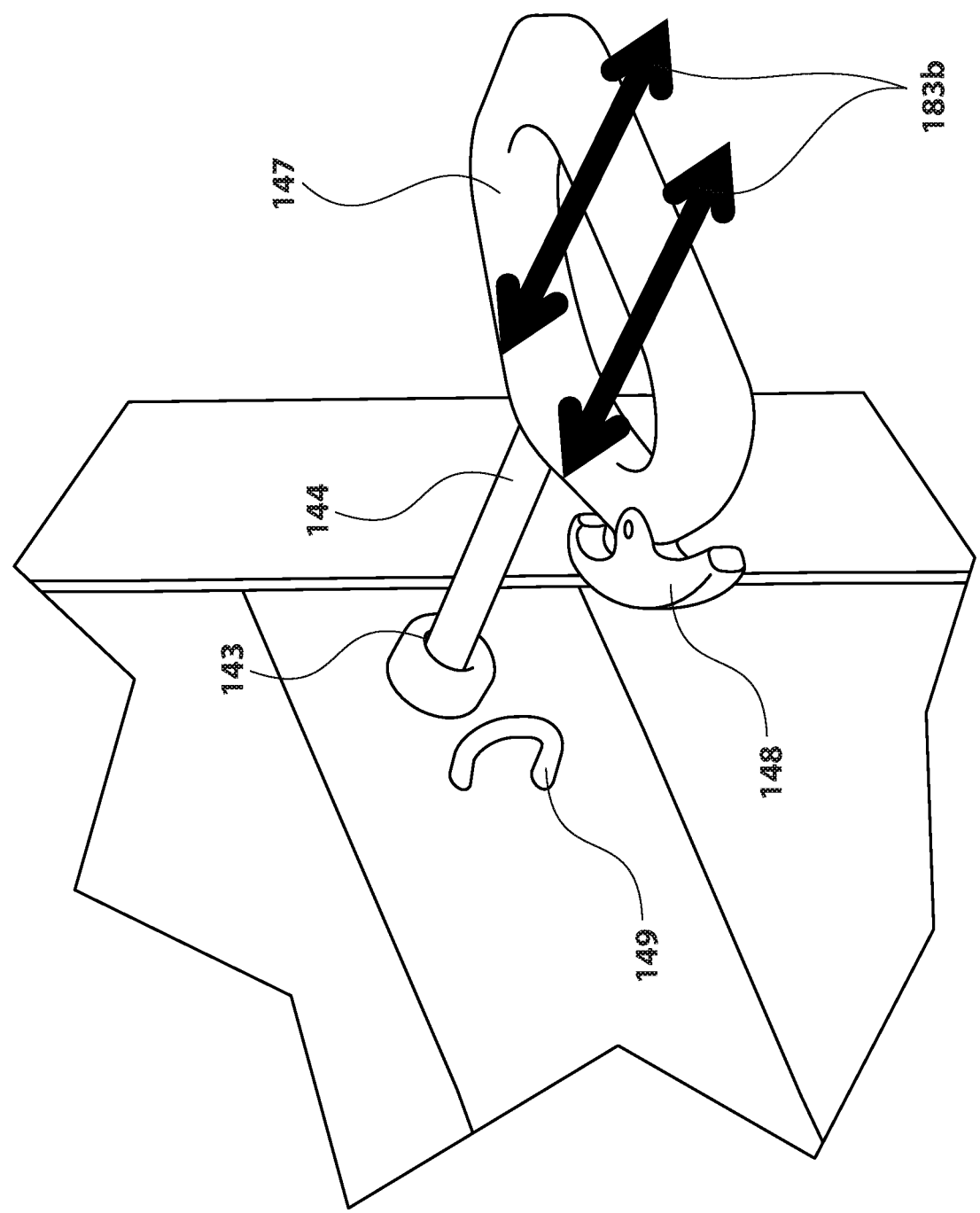
Figure 13D:
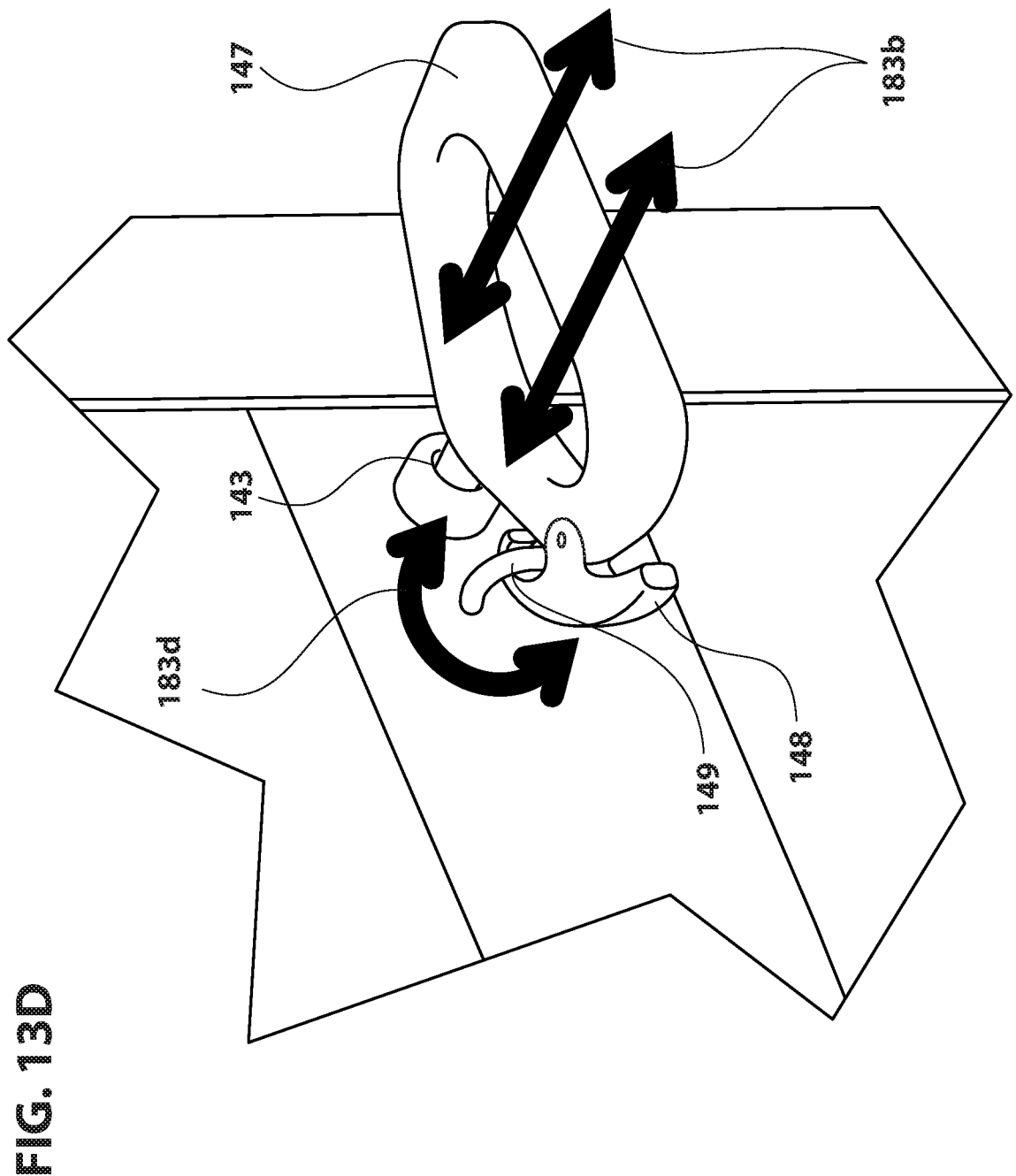

48) Automatic spring-loaded handle hook 148
is for releasably and automatically hooking on handle-hook ring 149
in the direction of arrow 183*d*
(see FIG. 13C and FIG. 13D).

49) Handle-hook ring 149
is for allowing automatic spring-loaded handle hook 148 to automatically hook
thereon when door-rod handle 147 is pushed toward handle-hook ring 149
to push draw-ramp-opening sliding door 141*b* to close draw-ramp opening 132.

50) Easy-access pivotable feeder-and-water system 150
is for performing the combined functions of its components.

Figure 14B:
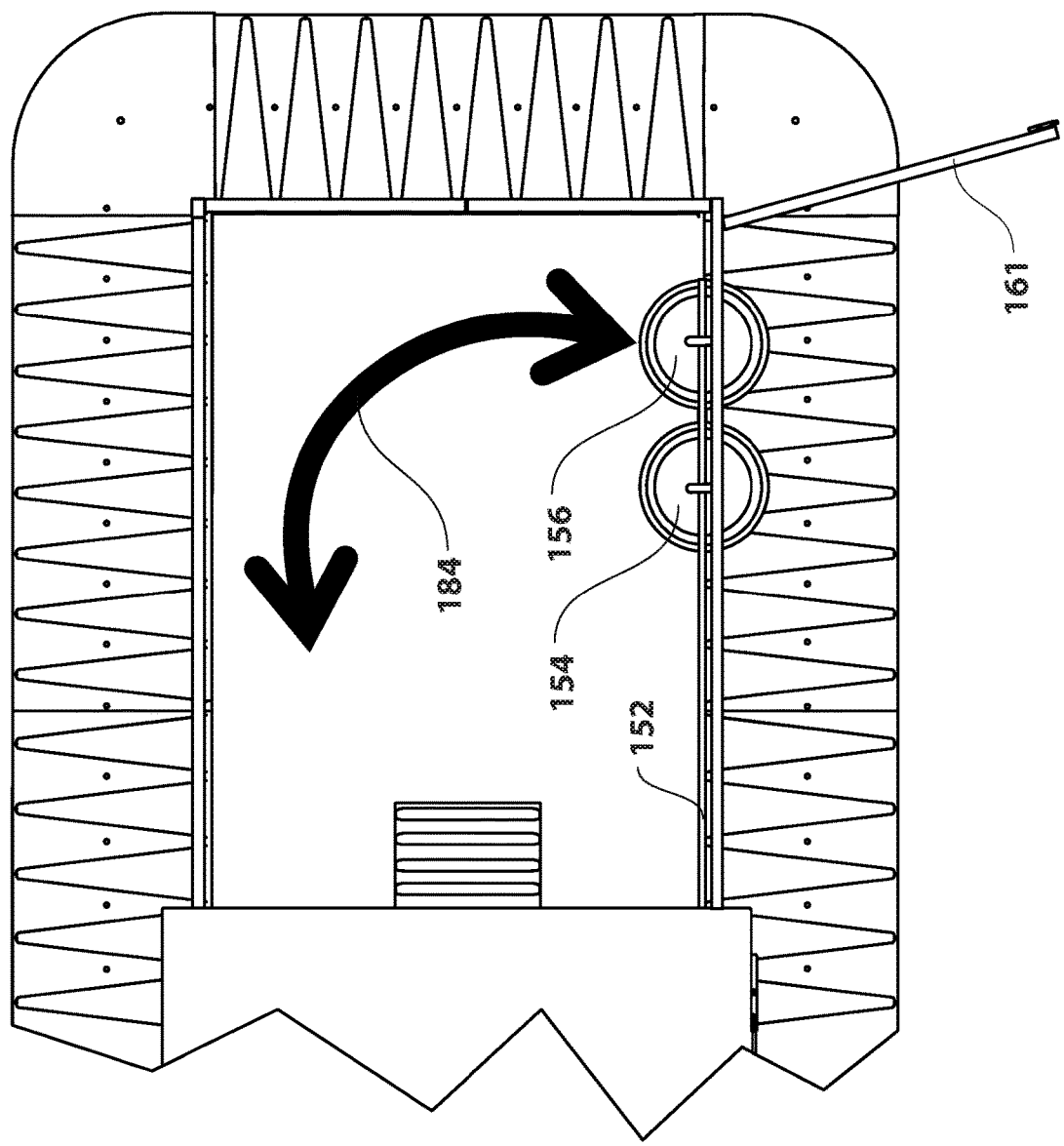

51) Pivotable-arm brace 151
is for pivotably attaching pivotable L-shaped arm 152 to third roosting wall 104
in the direction of arrow 184
(see FIG. 6A, FIG. 14A, and FIG. 14B).

52) Pivotable L-shaped arm 152
is for:
a) Conveniently hanging conventional feeder 154 and conventional water container 156 thereon;
b) Conveniently swinging conventional feeder 154 and conventional water-container 156 to different locations
in the direction of arrow 184
(see FIG. 14A and FIG. 14B); and
c) Conveniently swinging conventional feeder 154 and conventional water-container 156 to the entrance of the chicken run
to conveniently replenish food and water for chickens.

Figure 15A:
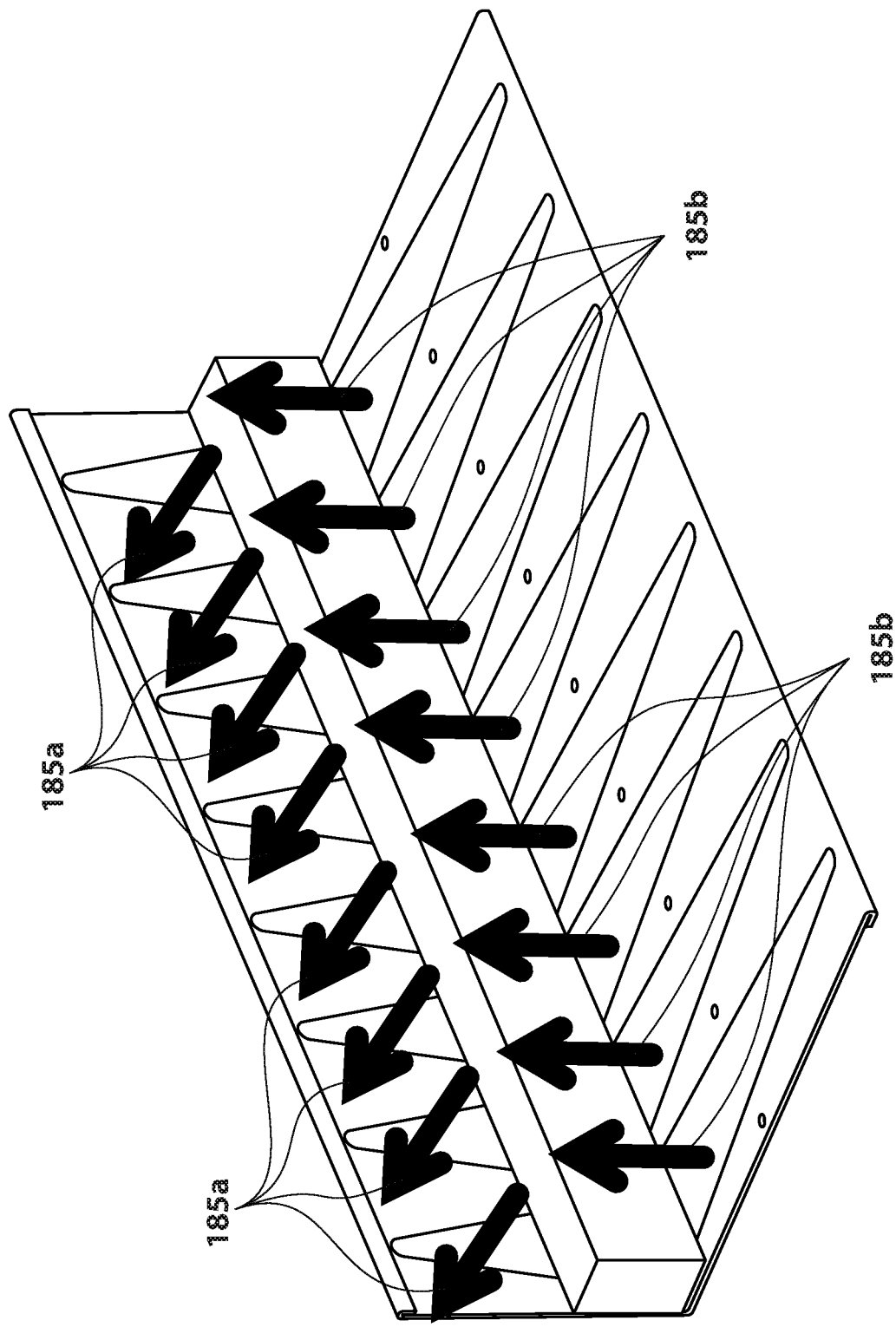
Figure 15F:
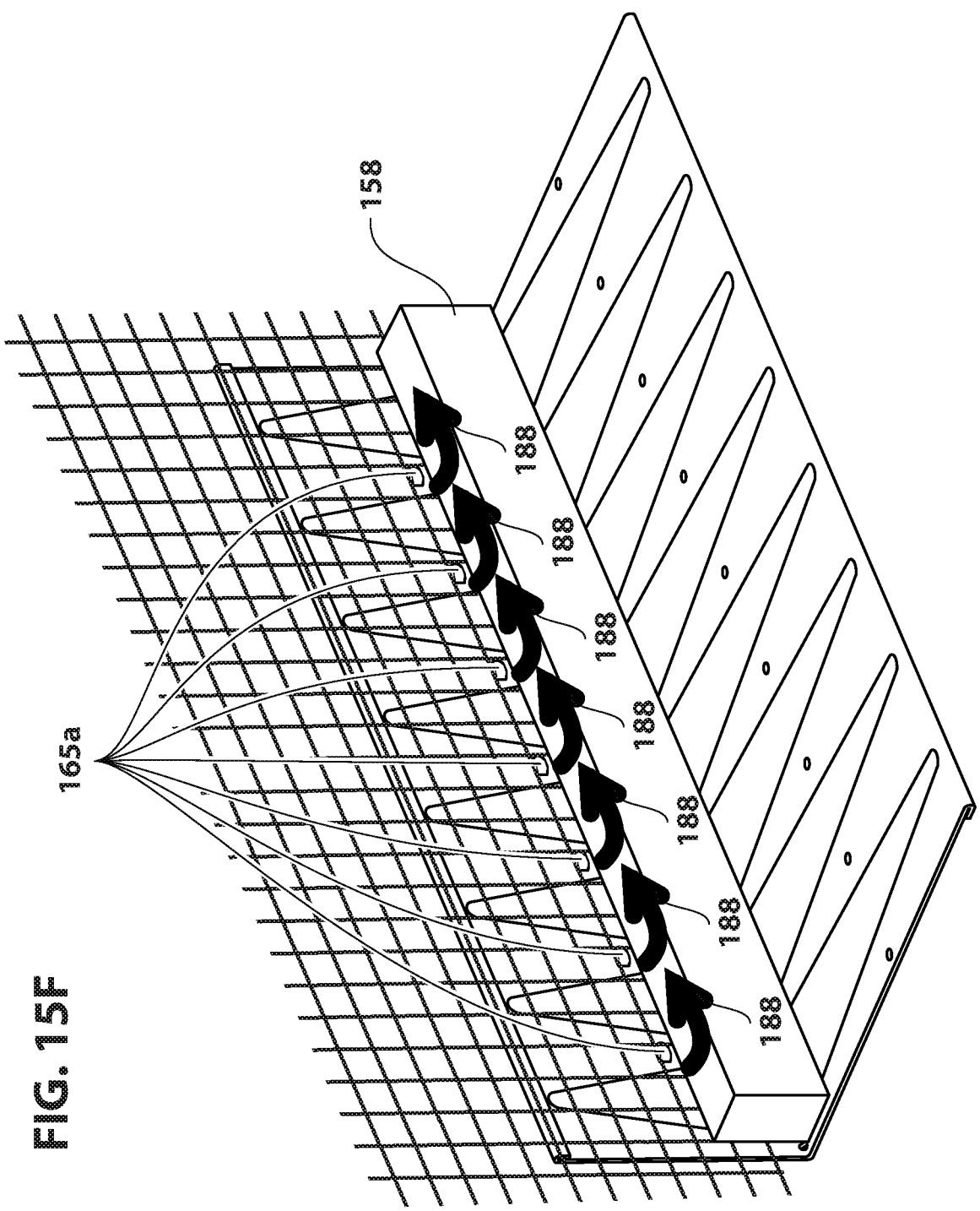

53) Feeder ring 153
is for hanging conventional feeder 154.
54) Conventional feeder 154
is for containing food for chickens.
55) Water-container ring 155
is for hanging conventional water-container 156.
56) Conventional water-container 156
is for containing water for chickens.
57) Extendable chicken-run system 157
is for performing the combined functions of its components.
58) Wire wall panels 158
respectively are for creating and protecting a chicken run.
59) At least one wire roof panel 159
is for creating and protecting the chicken run.
60) Wire-door-panel hinges 160
respectively are for attaching wire door panel 161 to one of wire wall panels 158.
61) Wire door panel 161
is for closing the entrance of the chicken run.
62) Anti-pushing anti-growing anti-digging anti-rotting shield systems 162
respectively are for performing the combined functions of its components.
63) Wire-strengthening anti-pushing vertical shield 163
is for:
   a) Strengthening wire wall panels 158 and wire door panel 161,
   b) Preventing the wires of wire wall panels 158 and wire door panel 161
     from being pushed inward by wild animals
     in the direction of arrow 185*a*
     (see FIG. 15A), and
   c) Retaining the designed shape of the chicken run.
64) Panel-strengthening anti-growing anti-digging horizontal shield 164
is for:
   a) Raising wire wall panels 158 and wire door panel 161 above the ground
     in the direction of arrow 185*b*
     (see FIG. 15A)
     to allow water to drain and evaporate
     in the direction of arrow 186*a* and 186*b*
     (see FIG. 15B, FIG. 15C, and FIG. 15D)
     to prevent wire wall panels 158 and wire door panel 161 from rotting away;
   b) Preventing wild animals from digging under wire wall panels 158 and wire door panel 161 into the chicken coop; and
   c) Preventing grass from growing around and close to the draw-ramp egg-teeter-totter wild-animal-shield chicken coop.
     in the direction of arrow 187
     (see FIG. 15E).
65) Wire-panel-coupling hooks 165*a*
respectively are for hooking on the wires of wire wall panels 158 and wire door panel 161
   in the direction of arrow 188
   (see FIG. 15F)
   to couple wire-strengthening anti-pushing vertical shield 163 and panel-strengthening anti-growing anti-digging horizontal shield 164 to wire wall panels 158 and wire door panel 161
   to strengthen and stabilize the draw-ramp egg-teeter-totter wild-animal-shield chicken coop.

Panel-raising anti-rotting ridges 165*b*
   respectively are for raising wire wall panels 158 and wire door panel 161 above the ground
   in the direction of arrow 185*b*
   (see FIG. 15A)
   to allow water to drain and evaporate
   in the direction of arrow 186*a* and 186*b*
   (see FIG. 15B, FIG. 15C, and FIG. 15D)
   to prevent wire wall panels 158 and wire door panel 161 from rotting away.
66) Water-evaporation-inducing alleys 166
respectively are for creating empty space between panel-raising anti-rotting ridges 165*b*
   to allow water to drain and evaporate
   in the direction of arrow 186*a* and 186*b*
   (see FIG. 15B, FIG. 15C, and FIG. 15D)
   to prevent wire wall panels 158 and wire door panel 161 from rotting away.
67) Water-draining holes 167
respectively are for allowing water to drain
   in the direction of arrow 186*a* and 186*b*
   (see FIG. 15B, FIG. 15C, and FIG. 15D)
   to prevent wire wall panels 158 and wire door panel 161 from rotting away.
68) Stake holes 168
respectively are for driving or hammering a stake therethrough
   to secure the draw-ramp egg-teeter-totter wild-animal-shield chicken coop to the ground.
69) Stake handles 169
respectively are for driving a stake into the ground
   in the direction of arrow 189
   (see FIG. 15G).
70) Spiral stakes 170
respectively are for:
   a) Securing the draw-ramp egg-teeter-totter wild-animal-shield chicken coop to the ground; and
   b) Securing wire-strengthening anti-pushing vertical shield 163 right side up and
   Securing panel-strengthening anti-growing anti-digging horizontal shield 164 upside down
     to prevent wild animals from digging under wire wall panels 158
     and wire door panel 161 into the chicken coop;
     in the direction of arrow 190
     (see FIG. 1511).
71) Automatic-relatching-twistable-compressable-spring latch systems 171
respectively are for performing the combined functions of its components.
72) Latch-tip brace 172
is for releasably latching the tip of latch 175 to second roosting wall 103, second nesting wall 122, or one of wire wall panels 158.
73) Latch-body brace 173
is for latching latch 175 to easy-access door 110, nesting roof 126, or wire door panel 161.
74) C-shaped cut-out 174
is for allowing latch lever 176 to move between latching and unlatching positions.
75) Latch 175
is for releasably latching easy-access door 110, nesting roof 126, or wire door panel 161.
76) Latch lever 176
is for moving latch 175 between latching and unlatching positions.

Figure 16A:
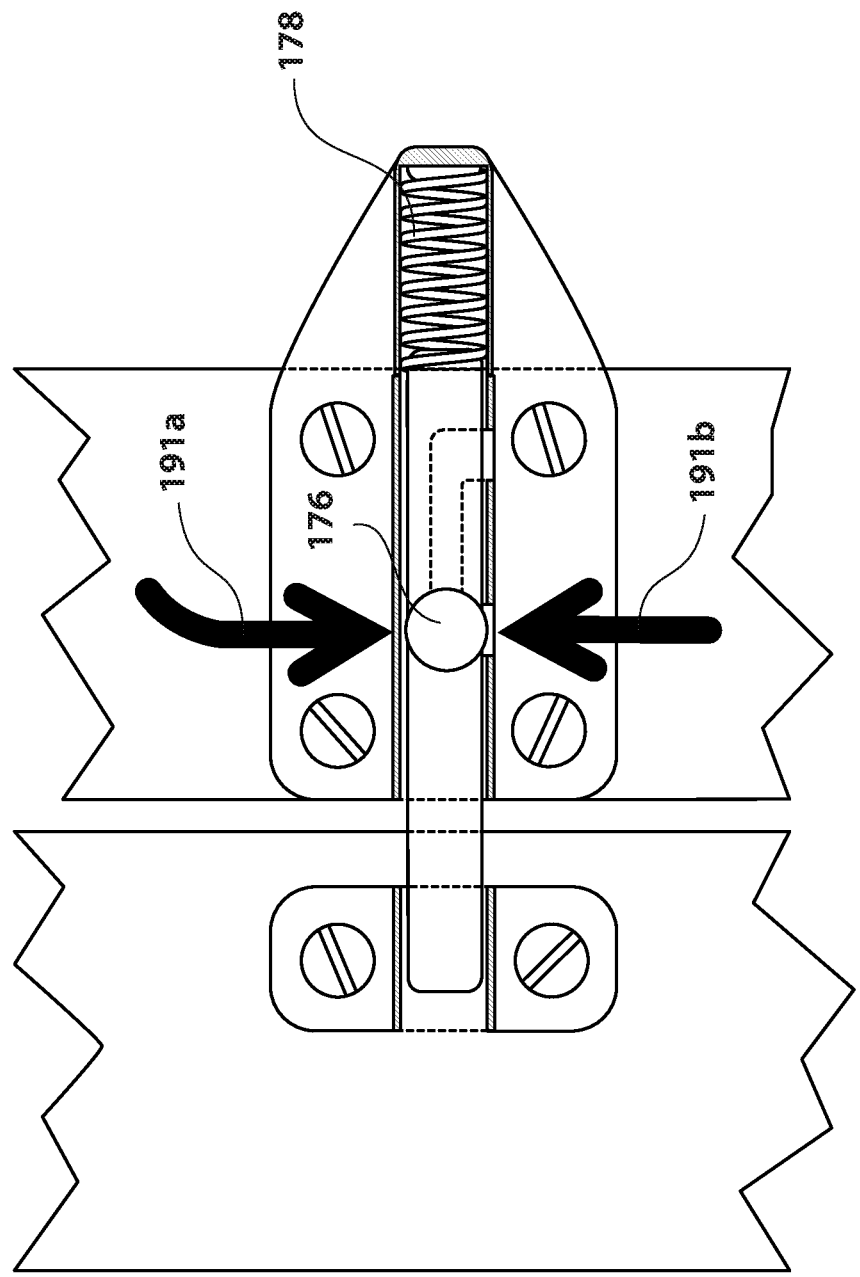

77) Spring housing 177
is for housing automatic-relatching twistable compressable spring 178.
78) Automatic-relatching twistable compressable spring 178
is for:
a) Twisting latch lever 176 back into its locking position
in the direction of arrow 191*a*
when latch lever 176 is lifted up out of its locking position
in the direction of arrow 191*b*
(see FIG. 16A); and
b) Pushing and twisting latch lever 176 back into its locking position.
in the direction of arrow 192*a*
when latch lever 176 is lifted up and slid out of its locking position
in the direction of arrow 192*b*
(see FIG. 16B)
to push and twist latch 175 back into its locking position
to relatch the tip of latch 175 inside latch-tip brace 172.

Variation

Figure 17C:
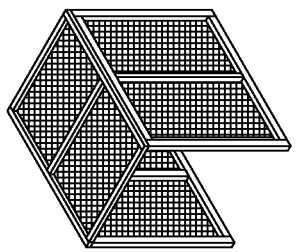
FIG. 17A, FIG. 17B, and FIG. 17C illustrate front and perspective views of equivalents of wire wall panels, wire roof panel, and/or wire door panel.
Figure 17B:
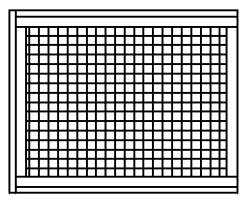
Figure 17A:
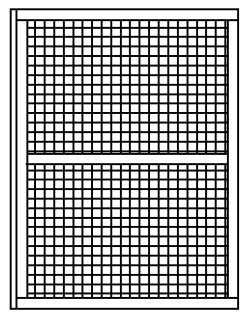
Figure 18A:
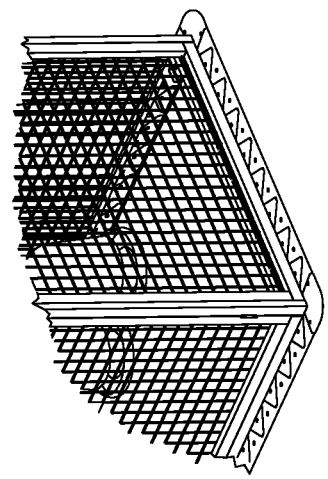
FIG. 18A, FIG. 18B, FIG. 18C, FIG. 18D, FIG. 18E, and FIG. 18F illustrate perspective views of equivalents of anti-pushing anti-growing anti-digging anti-rotting shield systems.
Figure 17D:
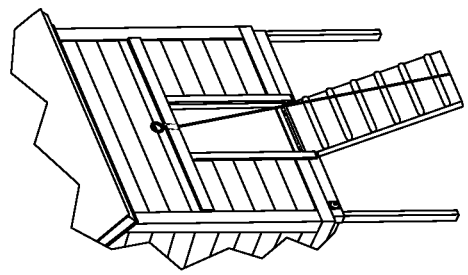
FIG. 17D illustrates a perspective view of an equivalent of draw-ramp cable 136.
Figure 18C:
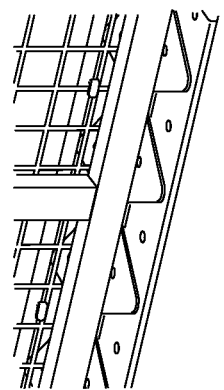
Figure 18E:
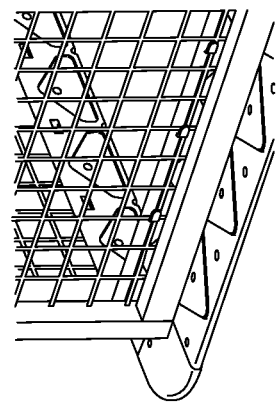
Figure 18B:
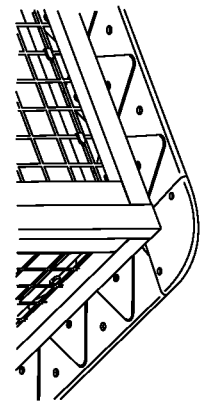
Figure 18D:
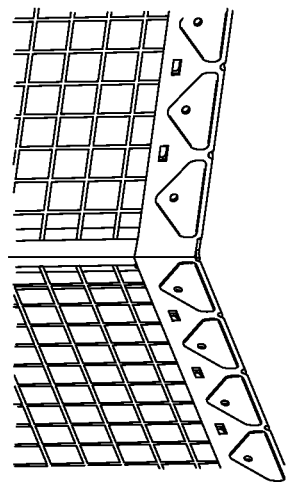
Figure 18F:
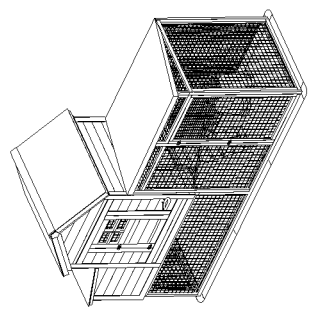
Figure 18G:
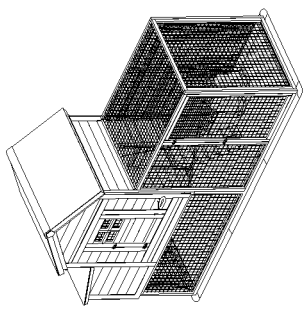
Figure 18H:
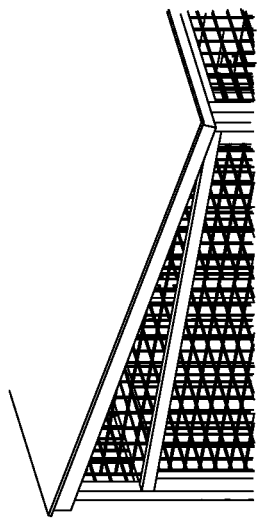
Figure 18I:
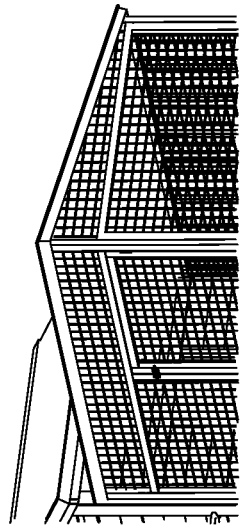
Figure 18N:
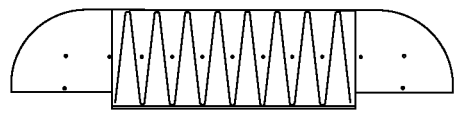
FIG. 18M, FIG. 18N, FIG. 18O, and FIG. 18P illustrate top views of equivalents of wire-strengthening anti-pushing vertical shield and/or panel-strengthening anti-growing anti-digging horizontal shield.
Figure 18P:
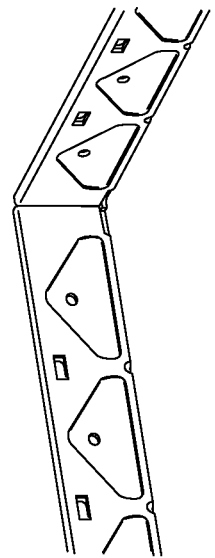
Figure 18M:
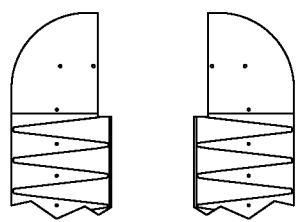
Figure 18O:
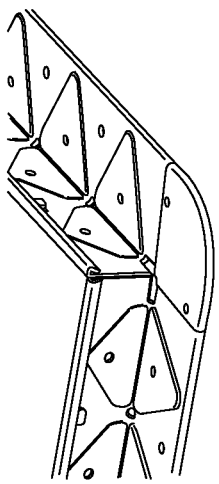

Any component of the draw-ramp egg-teeter-totter wild-animal-shield chicken coop can have any shape and size. Any component of the draw-ramp egg-teeter-totter wild-animal-shield chicken coop can be replaced with an equivalent component. Any component of the draw-ramp egg-teeter-totter wild-animal-shield chicken coop can be made of any material or any combination of any materials. Any component of the draw-ramp egg-teeter-totter wild-animal-shield chicken coop can be made of any flexible, semi-flexible, bendable, semi-bendable, stretchable, semi-stretchable, rigid, or semi-rigid material(s). Any component-attaching method of the draw-ramp egg-teeter-totter wild-animal-shield chicken coop can be replaced with any equivalent method. For example, FIG. 17A, FIG. 17B, and FIG. 17C illustrate front and perspective views of equivalents of wire wall panels 158, wire roof panel 159, and/or wire door panel 161. For example, FIG. 17D illustrates a perspective view of an equivalent of draw-ramp cable 136. For example, FIG. 18A, FIG. 18B, FIG. 18C, FIG. 18D, FIG. 18E, and FIG. 18F illustrate perspective views of equivalents of anti-pushing anti-growing anti-digging anti-rotting shield systems 162. Each of the equivalents can be made with or without wire-strengthening anti pushing vertical shield 163, panel-strengthening anti growing anti-digging horizontal shield 164, wire-panel-coupling hooks 165*a*, panel-raising anti rotting ridges 165*b*, water-evaporation inducing alleys 166, water-draining holes 167, and/or stake holes 168. For example, FIG. 18G, FIG. 1811, FIG. 18I, FIG. 18J, FIG. 18K, and FIG. 18L illustrate perspective and front views of equivalents of the draw-ramp egg-teeter-totter wild-animal-shield chicken coop. The equivalents are made with or without extended chicken run, and are made with or without slanted wire roof panel (which is equivalent to wire roof panel 159). For example, FIG. 18M, FIG. 18N, FIG. 18O, and FIG. 18P illustrate top views of equivalents of wire-strengthening anti-pushing vertical shield and/or panel-strengthening anti-growing anti-digging horizontal shield.

Major Advantages of the Invention

The present invention substantially departs from the conventional concepts and designs of the prior art. In doing so, the present invention provides a draw-ramp egg-teeter-totter wild-animal-shield chicken coop (having: 1) Easy-access ventilated roosting system, 2) Automatic-egg-collecting-and-indicating-teeter-totter nesting system, 3) Cable draw-ramp system, 4) Automatic-hook sliding-door system, 5) Easy-access pivotable feeder-and-water system, 6) Extendable chicken-run system, 7) Anti-pushing anti-growing anti-digging anti-rotting shield systems, and 8) Automatic-relatching-twistable-compressable-spring latch systems), having many unique and significant features, functions, and advantages, which overcome all the disadvantages of the prior art, as follows:

1) It is an object of the new invention to provide a draw-ramp egg-teeter-totter wild-animal-shield chicken coop, having
automatic egg-collecting teeter-totter 129.
Therefore, the draw-ramp egg-teeter-totter wild-animal-shield chicken coop:
a) Can collect eggs; and
b) Can allow eggs to roll down to one end of automatic egg-collecting teeter-totter 129
in the direction of arrow 180*a*
(see FIG. 10C and FIG. 10D)
to lower automatic egg-laying indicator 130*a* out of the draw-ramp egg-teeter-totter wild-animal-shield chicken coop
in the direction of arrow 181*b*
(see FIG. 10C and FIG. 10D)
to indicate that there is at least one egg inside automatic egg-collecting teeter-totter 129
to conveniently let a user from inside a house comfortably know that there is egg(s) laid, without the needs for getting out of a house, walking to nesting system 119, and lifting nesting roof 126 up to check and see if there is any egg laid.
c) Can eliminate the needs for getting out of the house, opening nesting roof 126, and looking inside the draw-ramp egg-teeter-totter wild-animal-shield chicken coop to see whether or not there is any egg in automatic egg-collecting teeter-totter 129.

2) It is another object of the new invention to provide a draw-ramp egg-teeter-totter wild-animal-shield chicken coop, having
automatic egg-laying indicator 130*a*.
Therefore, the draw-ramp egg-teeter-totter wild-animal-shield chicken coop:
Can indicate that there is at least one egg inside automatic egg-collecting teeter-totter 129
in the direction of arrow 181*b*
(see FIG. 10C and FIG. 10D)
to conveniently let a user from inside a house comfortably know that there is egg(s) laid, without the needs for getting out of a house, walking to nesting system 119, and lifting nesting roof 126 up to check and see if there is any egg laid.

3) It is another object of the new invention to provide a draw-ramp egg-teeter-totter wild-animal-shield chicken coop, having
teeter-totter-angle adjusting screw 130*b*.
Therefore, the draw-ramp egg-teeter-totter wild-animal-shield chicken coop:
Can adjust the slanted angle of automatic egg-collecting teeter-totter 129
to allow eggs to roll down to one end of automatic egg-collecting teeter totter 129
in the direction of arrow 181*b*
(see FIG. 10C and FIG. 10D), to allow automatic egg-collecting teeter-totter 129 to lower automatic egg-laying indicator 130*a* out of the draw-ramp egg-teeter-totter wild-animal-shield chicken coop
to indicate that there is at least one egg inside automatic egg-collecting teeter-totter 129.

4) It is a further object of the new invention to provide a draw-ramp egg-teeter-totter wild-animal-shield chicken coop, having
automatic-egg-collecting-teeter-totter axle 128.
Therefore, the draw-ramp egg-teeter-totter wild-animal-shield chicken coop:
Can allow the two opposite ends of automatic egg-collecting teeter-totter 129 to seesaw
in the direction of arrow 180*a*
when there is at least one egg inside automatic egg-collecting teeter-totter 129
(see FIG. 10B), and
in the direction of arrow 180*b*
when there is no egg inside automatic egg-collecting teeter-totter 129
(see FIG. 10B).

5) It is an even further object of the new invention to provide a draw-ramp egg-teeter-totter wild-animal-shield chicken coop, having
wire-strengthening anti-pushing vertical shield 163.
Therefore, the draw-ramp egg-teeter-totter wild-animal-shield chicken coop:
a) Can strengthen wire wall panels 158 and wire door panel 161,
b) Can prevent the wires of wire wall panels 158 and wire door panel 161
from being pushed inward by wild animals
in the direction of arrow 185*a*
(see FIG. 15A), and
c) Can retain the designed shape of the chicken run.

6) It is another object of the new invention to provide a draw-ramp egg-teeter-totter wild-animal-shield chicken coop, having
panel-strengthening anti-growing anti-digging horizontal shield 164.
Therefore, the draw-ramp egg-teeter-totter wild-animal-shield chicken coop:
a) Can raise wire wall panels 158 and wire door panel 161 above the ground
in the direction of arrow 185*b*
(see FIG. 15A)
to allow water to drain and evaporate
in the direction of arrow 186*a* and 186*b*
(see FIG. 15B, FIG. 15C, and FIG. 15D)
to prevent wire wall panels 158 and wire door panel 161 from rotting away;
b) Can prevent wild animals from digging under wire wall panels 158 and wire door panel 161 into the chicken coop; and
c) Can prevent grass from growing around and close to the draw-ramp egg-teeter-totter wild-animal-shield chicken coop.
in the direction of arrow 187
(see FIG. 15E).

7) It is yet another object of the new invention to provide a draw-ramp egg-teeter-totter wild-animal-shield chicken coop, having
wire-panel-coupling hooks 165*a*.
Therefore, the draw-ramp egg-teeter-totter wild-animal-shield chicken coop:
Can hook on the wires of wire wall panels 158 and wire door panel 161 in the direction of arrow 188
(see FIG. 15F)
to couple wire-strengthening anti-pushing vertical shield 163 and panel-strengthening anti-growing anti-digging horizontal shield 164 to wire wall panels 158 and wire door panel 161
to strengthen and stabilize the draw-ramp egg-teeter-totter wild-animal-shield chicken coop.

8) It is still yet another object of the new invention to provide a draw-ramp egg-teeter-totter wild-animal-shield chicken coop, having
panel-raising anti-rotting ridges 165*b*.
Therefore, the draw-ramp egg-teeter-totter wild-animal-shield chicken coop:
Can raise wire wall panels 158 and wire door panel 161 above the ground
in the direction of arrow 185*b*
(see FIG. 15A)
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

9) It is still yet an even further object of the new invention to provide a draw-ramp egg-teeter-totter wild-animal-shield chicken coop, having
water-evaporation-inducing alleys 166.
Therefore, the draw-ramp egg-teeter-totter wild-animal-shield chicken coop:
Can create empty space between panel-raising anti-rotting ridges 165*b*
to allow water to drain and evaporate
in the direction of arrow 186*a* and 186*b*
(see FIG. 15B, FIG. 15C, and FIG. 15D)
to prevent wire wall panels 158 and wire door panel 161 from rotting away.

10) It is still yet an even further object of the new invention to provide a draw-ramp egg-teeter-totter wild-animal-shield chicken coop, having
water-draining holes 167.
Therefore, the draw-ramp egg-teeter-totter wild-animal-shield chicken coop:
Can allow water to drain
in the direction of arrow 186*a* and 186*b*
(see FIG. 15B, FIG. 15C, and FIG. 15D)
to prevent wire wall panels 158 and wire door panel 161 from rotting away.

11) It is still yet an even further object of the new invention to provide a draw-ramp egg-teeter-totter wild-animal-shield chicken coop, having
automatic-relatching twistable compressable spring 178.
Therefore, the draw-ramp egg-teeter-totter wild-animal-shield chicken coop:
a) Can twist latch lever 176 back into its locking position
in the direction of arrow 191*a*
when latch lever 176 is lifted up out of its locking position
in the direction of arrow 191*b*
(see FIG. 16A); and
b) Can push and twist latch lever 176 back into its locking position.
in the direction of arrow 192*a*
when latch lever 176 is lifted up and slid out of its locking position
in the direction of arrow 192*b*

(see FIG. 16B)
to push and twist latch 175 back into its locking position
to relatch the tip of latch 175 inside latch-tip brace 172.

12) It is still yet an even further object of the new invention to provide a draw-ramp egg-teeter-totter wild-animal-shield chicken coop, having
spring housing 177.
Therefore, the draw-ramp egg-teeter-totter wild-animal-shield chicken coop:
Can house automatic-relatching twistable compressable spring 178.

13) It is still yet an even further object of the new invention to provide a draw-ramp egg-teeter-totter wild-animal-shield chicken coop, having
automatic spring-loaded handle hook 148.
Therefore, the draw-ramp egg-teeter-totter wild-animal-shield chicken coop:
Can releasably and automatically hook on handle-hook ring 149
in the direction of arrow 183d
(see FIG. 13C and FIG. 13D).

14) It is still yet an even further object of the new invention to provide a draw-ramp egg-teeter-totter wild-animal-shield chicken coop, having
draw ramp 134.
Therefore, the draw-ramp egg-teeter-totter wild-animal-shield chicken coop:
Can close draw-ramp opening 132 in addition to draw-ramp-opening sliding door 141b
in the direction of arrow 182a
(see FIG. 11A)
to protect the roosting area.

15) It is still yet an even further object of the new invention to provide a draw-ramp egg-teeter-totter wild-animal-shield chicken coop, having
pivotable L-shaped arm 152.
Therefore, the draw-ramp egg-teeter-totter wild-animal-shield chicken coop:
a) Can conveniently hang conventional feeder 154 and conventional water container 156 thereon;
b) Can conveniently swing conventional feeder 154 and conventional water container 156 to different locations
in the direction of arrow 184
(see FIG. 14A and FIG. 14B); and
c) Can conveniently swing conventional feeder 154 and conventional water-container 156 to the entrance of the chicken run
to conveniently replenish food and water for chickens.

What is claimed is:
1. A draw-ramp egg-teeter-totter wild-animal-shield chicken coop, comprising:
a first roosting wall
having
two opposite first-roosting-wall edges;
a second roosting wall
having
a second-roosting-wall edge;
a third roosting wall
having
a third-roosting-wall edge,
said first roosting wall attached to and between said second roosting wall and third roosting wall along said two first-roosting-wall opposite edges;
a fourth roosting wall,
said second roosting wall attached to said fourth roosting wall along said second-roosting-wall edge,
said third roosting wall attached to said fourth roosting wall along said third-roosting-wall edge;
a roosting rod
attached to and between said second roosting wall and said third roosting wall;
a roosting roof
attached to said first roosting wall, said second roosting wall, said third roosting wall, and said fourth roosting wall;
an easy-access opening
having
an easy-access-opening edge,
said easy-access opening formed in said second roosting wall;
a plurality of easy-access door hinges
respectively attached to said second roosting wall along said easy-access-opening edge;
an easy-access door
pivotably attached to said easy-access door hinges;
a window opening
having
four window-opening edges,
said window opening formed in said easy-access door;
a window wire panel
attached to said easy-access door along said four window-opening edges;
a ventilation opening
having
a top ventilation-opening edge and
a bottom ventilation-opening edge,
said ventilation opening formed in said third roosting wall 104;
two ventilation-opening rails
respectively attached to said third roosting wall 104 along said top and said bottom ventilation-opening edges;
a ventilation-opening sliding door
slidably attached to and between said two ventilation-opening rails;
a waste-tray opening
formed in said third roosting wall;
a waste tray
inserted through said waste-tray opening;
a waste-tray handle
attached to said waste tray;
a passage opening
having
a left passage-opening edge,
a right passage-opening edge, and
a top passage-opening edge
said passage opening formed in said fourth roosting wall above said waste-tray opening;
a first nesting wall
having
a bottom first-nesting-wall edge,
said first nesting wall attached to said fourth roosting wall 105 along said left passage-opening edge;
a second nesting wall
having
a bottom second-nesting-wall edge,
said second nesting wall attached to said fourth roosting wall along said right passage-opening edge;

a third nesting wall
    attached to and between said first nesting wall and said second nesting wall;
a slanted nesting floor
    attached to said first nesting wall and said second nesting wall along said bottom first-nesting-wall edge and said bottom second-nesting-wall edge;
a plurality of nesting-roof hinges
    respectively attached to said fourth roosting wall along said top passage-opening edge;
a nesting roof
    pivotably attached to said nesting-roof hinges;
a nesting divider
    attached to said slanted nesting floor and said fourth roosting wall 105;
an automatic-egg-collecting-teeter-totter axle
    attached to said slanted nesting floor and said third nesting wall;
an automatic egg-collecting teeter-totter
    having
        two opposite teeter-totter ends and a slanted teeter-totter angle,
        said automatic egg-collecting teeter-totter seesawingly attached to said automatic-egg-collecting-teeter-totter axle
            for collecting eggs, and
            for allowing eggs to roll down to one of said two opposite teeter-totter ends;
an automatic egg-laying indicator
    attached to one of said two opposite teeter-totter ends
        for being lowered out of said chicken coop by said automatic egg-collecting teeter-totter when there is at least one egg inside said automatic egg-collecting teeter-totter
            to indicate and to let a user from inside a house know that there is at least one egg laid inside said automatic egg-collecting teeter-totter, without the needs for getting out of a house, walking to said chicken coop to check and see whether or not there is any egg laid, and
        for eliminating the needs for a user to get out of a house to walk to said said chicken coop to check and see whether or not there is any egg laid inside said automatic egg-collecting teeter-totter;
a teeter-totter-angle-adjusting screw
    threadedly attached to another one of said two opposite teeter-totter ends,
        for adjusting said slanted teeter-totter angle
            to allow eggs to roll down to one of said two opposite teeter-totter ends,
            to allow said automatic egg-collecting teeter-totter to lower said automatic egg-laying indicator out of said chicken coop
            to indicate that there is at least one egg inside said automatic egg-collecting teeter-totter;
a draw-ramp opening
    having
        a top draw-ramp-opening edge and
        a bottom draw-ramp-opening edge,
        said draw-ramp opening formed in said first roosting wall;
a plurality of draw-ramp hinges
    respectively attached to said first roosting wall along said bottom draw-ramp-opening edge;
a draw ramp
    having
        a first draw-ramp end,
        a second draw-ramp end, and
        a draw-ramp surface,
        said draw ramp pivotably attached to said draw-ramp hinges along said first draw-ramp end;
a plurality of draw-ramp steps
    respectively attached to said draw-ramp surface;
a draw-ramp cable
    having
        a first cable end and
        a second cable end,
        said draw-ramp cable attached to said second draw-ramp end via said first cable end;
a cable tunnel
    formed through said first roosting wall,
    said draw-ramp cable threaded through said cable tunnel;
a cable ring
    attached to said second cable end;
a cable hook;
two draw-ramp-opening rails
    respectively attached to said first roosting wall along said top draw-ramp-opening edge and said bottom draw-ramp-opening edge;
a draw-ramp-opening sliding door
    slidably attached to and between said two draw-ramp-opening rails;
a plurality of door-rod braces
    respectively attached to said draw-ramp-opening sliding door;
a door-rod hole
    formed through said second roosting wall;
a first door rod
    attached to said door-rod braces and
    inserted through said door-rod hole;
a second door rod;
a door-rod joint
    pivotably coupled to said first door rod and said second door rod;
a door-rod handle
    attached to said second door rod;
a handle-hook ring
    attached to said second roosting wall;
an automatic spring-loaded handle hook
    seesawingly attached to said door-rod handle
        for releasably and automatically hooking on said handle-hook ring
            when said door-rod handle is pushed toward said handle-hook ring;
a plurality of wire wall panels
    respectively attached to one another, or
    said first roosting wall, or
    said second roosting wall, or
    said third roosting wall, or
    said fourth roosting wall;
at least one wire roof panel
    attached to at least one of said wire wall panels,
    said cable hook attached to
    one of said wire wall panels or
    one of said at least one wire roof panel;
a plurality of wire-door-panel hinges
    respectively attached to one of said wire wall panels;
a wire door panel
    pivotably attached to said wire-door-panel hinges;
a latch-tip brace
    attached to said second roosting wall, or
    said second nesting wall, or
    one of said wire wall panels;

a latch-body brace
  attached to said easy-access door, or
  said nesting roof, or
  said wire door panel;
a C-shaped cut-out
  formed in said latch-body brace;
a latch
  having
    a latch locking position and a latch tip,
    said latch pivotably and slidably attached to said latch-body brace;
a latch lever
  having
    a latch-lever locking position,
    said latch lever molded to said latch;
a spring housing
  molded to said latch-body brace; and
an automatic-relatching twistable compressable spring
  having
    two opposite spring ends,
    said automatic-relatching twistable compressable spring
      attached to said latch at one of said two opposite spring ends and
      attached to said spring housing at another one of said two opposite spring ends,
    said automatic-relatching twistable compressable spring
      for twisting said latch lever back into said latch-lever locking position
        when said latch lever is lifted up out of said latch-lever locking position, and
      for pushing and twisting said latch lever back into said latch-lever locking position when said latch lever is lifted up and slid out of said latch-lever locking position
        to push and twist said latch back into said latch locking position
        to relatch said latch tip inside said latch-tip brace.

2. The draw-ramp egg-teeter-totter wild-animal-shield chicken coop of claim 1,
  said chicken coop
    having
      a chicken-coop inside,
  said chicken coop
  further comprising:
  a wire-strengthening anti-pushing vertical shield
    positioned on said chicken-coop inside against said wire wall panels and said wire door panel;
  a panel-strengthening anti-growing anti-digging horizontal shield
    molded to said wire-strengthening anti-pushing vertical shield, and
    positioned under said wire wall panels or said wire door panel;
  a plurality of wire-panel-coupling hooks
    respectively molded on or formed on said wire-strengthening anti-pushing vertical shield;
  a plurality of panel-raising anti-rotting ridges
    respectively molded on or formed on said wire-strengthening anti-pushing vertical shield and said panel-strengthening anti-growing anti-digging horizontal shield;
  a plurality of water-evaporation-inducing alleys
    respectively formed between said panel-raising anti-rotting ridges; and
  a plurality of water-draining holes
    respectively drilled in or formed in said wire-strengthening anti-pushing vertical shield or said panel-strengthening anti-growing anti-digging horizontal shield,
  wherein
  said wire-strengthening anti-pushing vertical shield is
    for strengthening said wire wall panels and said wire door panel,
    for preventing said wire wall panels and said wire door panel
      from being pushed inward by wild animals, and
    for retaining the designed shape of said chicken coop,
  wherein
  said panel-strengthening anti-growing anti-digging horizontal shield is
    for raising said wire wall panels and said wire door panel above the ground
      to allow water to drain and evaporate and
      to prevent said wire wall panels and said wire door panel from rotting away,
    for preventing wild animals from digging under said wire wall panels and said wire door panel into said chicken coop, and
    for preventing grass from growing around and close to said chicken coop,
  wherein
  said wire-panel-coupling hooks respectively are
    for hooking on said wire wall panels and said wire door panel
      to couple said wire-strengthening anti-pushing vertical shield and said panel-strengthening anti-growing anti-digging horizontal shield to said wire wall panels and said wire door panel
      to strengthen and stabilize said chicken coop,
  wherein
  said panel-raising anti-rotting ridges respectively are
    for raising said wire wall panels and said wire door panel above the ground
      to allow water to drain and evaporate
      to prevent said wire wall panels and said wire door panel from rotting away,
  wherein
  said water-evaporation-inducing alleys respectively are
    for creating empty space between said panel-raising anti-rotting ridges
      to allow water to drain and evaporate
      to prevent said wire wall panels and said wire door panel from rotting away,
  wherein
  said water-draining holes respectively are
    for allowing water to drain
      to prevent said wire wall panels and said wire door panel from rotting away.

3. The draw-ramp egg-teeter-totter wild-animal-shield chicken coop of claim 2,
  further comprising:
  a plurality of stake holes
    respectively drilled in or formed in said panel-strengthening anti-growing anti-digging horizontal shield;
  a plurality of stake handles; and
  a plurality of spiral stakes
    having
      a plurality of stake ends,
      said spiral stakes respectively screwed or driven through said
        stake holes into the ground, said stake handles respectively molded to said stake ends,
wherein
said stake holes respectively are
for driving or hammering said spiral stakes therethrough
to secure said chicken coop to the ground,
wherein
said spiral stakes are
for securing said chicken coop to the ground,
for securing said wire-strengthening anti-pushing vertical shield to the ground, and
for securing said panel-strengthening anti-growing anti-digging horizontal shield to the ground.

4. The draw-ramp egg-teeter-totter wild-animal-shield chicken coop of claim 1,
further comprising:
a pivotable-arm brace
attached to said first roosting wall;
a pivotable L-shaped arm
pivotably attached to said pivotable-arm brace;
a feeder ring
slid on said pivotable L-shaped arm;
a conventional feeder
attached to said feeder ring;
a water-container ring
slid on said pivotable L-shaped arm; and
a conventional water-container
attached to said water-container ring,
wherein
said pivotable L-shaped arm is
for conveniently hanging said conventional feeder and said conventional water-container thereon,
for conveniently swinging said conventional feeder and said conventional water-container to different locations, and
for conveniently swinging said conventional feeder and said conventional water-container to said wire door panel to conveniently replenish food and water for chickens.

5. The draw-ramp egg-teeter-totter wild-animal-shield chicken coop of claim 2,
wherein
said wire-strengthening anti-pushing vertical shield is formed into a square or a rectangular shape.

6. The draw-ramp egg-teeter-totter wild-animal-shield chicken coop of claim 2,
wherein
said wire-strengthening anti-pushing vertical shield
is made of metallic or plastic material.

7. The draw-ramp egg-teeter-totter wild-animal-shield chicken coop of claim 2,
wherein
said panel-strengthening anti-growing anti-digging horizontal shield
is formed into a square or a rectangular shape.

8. The draw-ramp egg-teeter-totter wild-animal-shield chicken coop of claim 2,
wherein
said panel-strengthening anti-growing anti-digging horizontal shield
is made of metallic or plastic material.

9. The draw-ramp egg-teeter-totter wild-animal-shield chicken coop of claim 1,
wherein
said chicken coop
is made of metal, plastic, wood, composite material, or a combination thereof.

10. An egg-teeter-totter wild-animal-shield chicken coop, comprising:
a first roosting wall
having
two opposite first-roosting-wall edges;
a second roosting wall
having
a second-roosting-wall edge;
a third roosting wall
having
a third-roosting-wall edge,
said first roosting wall attached to and between said second roosting wall and
third roosting wall along said two first-roosting-wall opposite edges;
a fourth roosting wall,
said second roosting wall attached to said fourth roosting wall along said second-roosting-wall edge,
said third roosting wall attached to said fourth roosting wall along said third-roosting-wall edge;
a roosting roof
attached to said first roosting wall, said second roosting wall, said third roosting wall, and said fourth roosting wall;
a waste-tray opening
formed in said third roosting wall;
a waste tray
inserted through said waste-tray opening;
a waste-tray handle
attached to said waste tray;
a passage opening
having
a left passage-opening edge,
a right passage-opening edge, and
a top passage-opening edge
said passage opening formed in said fourth roosting wall above said waste-tray opening;
a first nesting wall
having
a bottom first-nesting-wall edge,
said first nesting wall attached to said fourth roosting wall 105 along said left passage-opening edge;
a second nesting wall
having
a bottom second-nesting-wall edge,
said second nesting wall attached to said fourth roosting wall along said right passage-opening edge;
a third nesting wall
attached to and between said first nesting wall and said second nesting wall;
a slanted nesting floor
attached to said first nesting wall and said second nesting wall along said bottom first-nesting-wall edge and said bottom second-nesting-wall edge;
an automatic-egg-collecting-teeter-totter axle
attached to said slanted nesting floor and said third nesting wall;
an automatic egg-collecting teeter-totter
having
two opposite teeter-totter ends and a slanted teeter-totter angle, said automatic egg-collecting teeter-totter seesawingly attached to said automatic-egg-collecting-teeter-totter axle
  for collecting eggs, and
  for allowing eggs to roll down to one of said two opposite teeter-totter ends;
an automatic egg-laying indicator
  attached to one of said two opposite teeter-totter ends
    for being lowered out of said chicken coop by said automatic egg-collecting teeter-totter when there is at least one egg inside said automatic egg-collecting teeter-totter
      to indicate and to let a user from inside a house know that there is at least one egg laid inside said automatic egg-collecting teeter-totter, without the needs for getting out of a house, walking to said chicken coop to check and see whether or not there is any egg laid, and
      for eliminating the needs for a user to get out of a house to walk to said
        said chicken coop to check and see whether or not there is any egg laid inside said automatic egg-collecting teeter-totter;
a teeter-totter-angle adjusting screw
  threadedly attached to another one of said two opposite teeter-totter ends,
    for adjusting said slanted teeter-totter angle
      to allow eggs to roll down to one of said two opposite teeter-totter ends,
      to allow said automatic egg-collecting teeter-totter to lower said automatic egg-laying indicator out of said chicken coop
      to indicate that there is at least one egg inside said automatic egg-collecting teeter-totter;
a draw-ramp opening
  having
    a top draw-ramp-opening edge and
    a bottom draw-ramp-opening edge,
    said draw-ramp opening formed in said first roosting wall;
a plurality of draw-ramp hinges
  respectively attached to said first roosting wall along said bottom draw-ramp-opening edge;
a draw ramp
  having
    a first draw-ramp end,
    a second draw-ramp end, and
    a draw-ramp surface,
    said draw ramp pivotably attached to said draw-ramp hinges along said first draw-ramp end;
a plurality of draw-ramp steps
  respectively attached to said draw-ramp surface;
a draw-ramp cable
  having
    a first cable end and
    a second cable end,
    said draw-ramp cable attached to said second draw-ramp end via said first cable end;
a cable tunnel
  formed through said first roosting wall,
  said draw-ramp cable threaded through said cable tunnel;
a cable ring
  attached to said second cable end;
a cable hook;
two draw-ramp-opening rails
  respectively attached to said first roosting wall along said top draw-ramp-opening edge and said bottom draw-ramp-opening edge;
a draw-ramp-opening sliding door
  slidably attached to and between said two draw-ramp-opening rails;
a plurality of door-rod braces
  respectively attached to said draw-ramp-opening sliding door;
a door-rod hole
  formed through said second roosting wall;
a door rod
  attached to said door-rod braces and
  inserted through said door-rod hole;
a door-rod handle
  attached to said door rod;
a handle-hook ring
  attached to said second roosting wall;
an automatic spring-loaded handle hook
  seesawingly attached to said door-rod handle
    for releasably and automatically hooking on said handle-hook ring
      when said door-rod handle is pushed toward said handle-hook ring;
a plurality of wire wall panels
  respectively attached to one another, or
  said first roosting wall, or
  said second roosting wall, or
  said third roosting wall, or
  said fourth roosting wall;
a plurality of wire-door-panel hinges
  respectively attached to one of said wire wall panels;
a wire door panel
  pivotably attached to said wire-door-panel hinges;
a latch-tip brace
  attached to said second roosting wall, or
  said second nesting wall, or
  one of said wire wall panels;
a latch-body brace
  attached to said wire door panel;
a C-shaped cut-out
  formed in said latch-body brace;
a latch
  having
    a latch locking position and a latch tip,
    said latch pivotably and slidably attached to said latch-body brace;
a latch lever
  having
    a latch-lever locking position,
    said latch lever molded to said latch;
a spring housing
  molded to said latch-body brace; and
an automatic-relatching twistable compressable spring
  having
    two opposite spring ends,
    said automatic-relatching twistable compressable spring
      attached to said latch at one of said two opposite spring ends and
      attached to said spring housing at another one of said two opposite spring ends,
    said automatic-relatching twistable compressable spring
      for twisting said latch lever back into said latch-lever locking position when said latch lever is lifted up out of said latch-lever locking position, and for pushing and twisting said latch lever back into said latch-lever locking position when said latch lever is lifted up and slid out of said latch-lever locking position
to push and twist said latch back into said latch locking position
to relatch said latch tip inside said latch-tip brace.

11. The egg-teeter-totter wild-animal-shield chicken coop of claim 10,
said chicken coop
having
a chicken-coop inside,
said chicken coop
further comprising:
a wire-strengthening anti-pushing vertical shield
positioned on said chicken-coop inside against said wire wall panels and said wire door panel;
a panel-strengthening anti-growing anti-digging horizontal shield
molded to said wire-strengthening anti-pushing vertical shield, and
positioned under said wire wall panels or said wire door panel;
a plurality of wire-panel-coupling hooks
respectively molded on or formed on said wire-strengthening anti-pushing vertical shield;
a plurality of panel-raising anti-rotting ridges
respectively molded on or formed on said wire-strengthening anti-pushing vertical shield and said panel-strengthening anti-growing anti-digging horizontal shield;
a plurality of water-evaporation-inducing alleys
respectively formed between said panel-raising anti-rotting ridges; and
a plurality of water-draining holes
respectively drilled in or formed in said wire-strengthening anti-pushing vertical shield or said panel-strengthening anti-growing anti-digging horizontal shield,
wherein
said wire-strengthening anti-pushing vertical shield is
for strengthening said wire wall panels and said wire door panel,
for preventing said wire wall panels and said wire door panel
from being pushed inward by wild animals, and
for retaining the designed shape of said chicken coop,
wherein
said panel-strengthening anti-growing anti-digging horizontal shield is
for raising said wire wall panels and said wire door panel above the ground
to allow water to drain and evaporate and
to prevent said wire wall panels and said wire door panel from rotting away,
for preventing wild animals from digging under said wire wall panels and
said wire door panel into said chicken coop, and
for preventing grass from growing around and close to said chicken coop,
wherein
said wire-panel-coupling hooks respectively are
for hooking on said wire wall panels and said wire door panel
to couple said wire-strengthening anti-pushing vertical shield and said panel-strengthening anti-growing anti-digging horizontal shield to said wire wall panels and said wire door panel
to strengthen and stabilize said chicken coop,
wherein
said panel-raising anti-rotting ridges respectively are
for raising said wire wall panels and said wire door panel above the ground
to allow water to drain and evaporate
to prevent said wire wall panels and said wire door panel from rotting away,
wherein
said water-evaporation-inducing alleys respectively are
for creating empty space between said panel-raising anti-rotting ridges
to allow water to drain and evaporate
to prevent said wire wall panels and said wire door panel from rotting away,
wherein
said water-draining holes respectively are
for allowing water to drain
to prevent said wire wall panels and said wire door panel from rotting away.

12. The egg-teeter-totter wild-animal-shield chicken coop of claim 11,
further comprising:
a plurality of stake holes
respectively drilled in or formed in said panel-strengthening anti-growing anti-digging horizontal shield;
a plurality of stake handles; and
a plurality of spiral stakes
having
a plurality of stake ends,
said spiral stakes respectively screwed or driven through said
stake holes into the ground,
said stake handles respectively molded to said stake ends,
wherein
said stake holes respectively are
for driving or hammering said spiral stakes therethrough
to secure said chicken coop to the ground,
wherein
said spiral stakes are
for securing said chicken coop to the ground,
for securing said wire-strengthening anti-pushing vertical shield
to the ground, and
for securing said panel-strengthening anti-growing anti-digging horizontal shield to the ground.

13. The egg-teeter-totter wild-animal-shield chicken coop of claim 10,
further comprising:
a pivotable-arm brace
attached to said first roosting wall;
a pivotable L-shaped arm
pivotably attached to said pivotable-arm brace;
a feeder ring
slid on said pivotable L-shaped arm;
a conventional feeder
attached to said feeder ring;
a water-container ring
slid on said pivotable L-shaped arm; and
a conventional water-container
attached to said water-container ring, wherein
said pivotable L-shaped arm is
for conveniently hanging said conventional feeder and said conventional water-container thereon,
for conveniently swinging said conventional feeder and said conventional water-container to different locations, and
for conveniently swinging said conventional feeder and said conventional water-container to said wire door panel to conveniently replenish food and water for chickens.

14. The egg-teeter-totter wild-animal-shield chicken coop of claim 11,
wherein
said wire-strengthening anti-pushing vertical shield is formed into a square or a rectangular shape.

15. The egg-teeter-totter wild-animal-shield chicken coop of claim 11,
wherein
said wire-strengthening anti-pushing vertical shield is made of metallic or plastic material.

16. The egg-teeter-totter wild-animal-shield chicken coop of claim 11,
wherein
said panel-strengthening anti-growing anti-digging horizontal shield is formed into a square or a rectangular shape.

17. The egg-teeter-totter wild-animal-shield chicken coop of claim 11,
wherein
said panel-strengthening anti-growing anti-digging horizontal shield is made of metallic or plastic material.

18. The egg-teeter-totter wild-animal-shield chicken coop of claim 10,
wherein
said chicken coop
is made of metal, plastic, wood, composite material, or a combination thereof.

19. An egg-teeter-totter animal-shield chicken coop, comprising:
a first roosting wall
having
two opposite first-roosting-wall edges;
a second roosting wall
having
a second-roosting-wall edge;
a third roosting wall
having
a third-roosting-wall edge,
said first roosting wall attached to and between said second roosting wall and third roosting wall along said two first-roosting-wall opposite edges;
a fourth roosting wall,
said second roosting wall attached to said fourth roosting wall along said second-roosting-wall edge,
said third roosting wall attached to said fourth roosting wall along said third-roosting-wall edge;
a roosting roof
attached to said first roosting wall, said second roosting wall, said third roosting wall, and said fourth roosting wall;
a passage opening
having
a left passage-opening edge,
a right passage-opening edge, and
a top passage-opening edge
said passage opening formed in said fourth roosting wall above said waste-tray opening;
a first nesting wall
having
a bottom first-nesting-wall edge,
said first nesting wall attached to said fourth roosting wall 105 along said left passage-opening edge;
a second nesting wall
having
a bottom second-nesting-wall edge,
said second nesting wall attached to said fourth roosting wall along said right passage-opening edge;
a third nesting wall
attached to and between said first nesting wall and said second nesting wall;
a slanted nesting floor
attached to said first nesting wall and said second nesting wall along said bottom first-nesting-wall edge and said bottom second-nesting-wall edge;
an automatic-egg-collecting-teeter-totter axle
attached to said slanted nesting floor and said third nesting wall;
an automatic egg-collecting teeter-totter
having
two opposite teeter-totter ends and a slanted teeter-totter angle,
said automatic egg-collecting teeter-totter seesawingly attached to said automatic-egg-collecting-teeter-totter axle,
for collecting eggs, and
for allowing eggs to roll down to one of said two opposite teeter-totter ends;
an automatic egg-laying indicator
attached to one of said two opposite teeter-totter ends
for being lowered out of said chicken coop by said automatic egg-collecting teeter-totter when there is at least one egg inside said automatic egg-collecting teeter-totter
to indicate and to let a user from inside a house know that there is at least one egg laid inside said automatic egg-collecting teeter-totter, without the needs for getting out of a house, walking to said chicken coop to check and see whether or not there is any egg laid, and
for eliminating the needs for a user to get out of a house to walk to said said chicken coop to check and see whether or not there is any egg laid inside said automatic egg-collecting teeter-totter;
a teeter-totter-angle-adjusting screw
threadedly attached to another one of said two opposite teeter-totter ends,
for adjusting said slanted teeter-totter angle
to allow eggs to roll down to one of said two opposite teeter-totter ends,
to allow said automatic egg-collecting teeter-totter to lower said automatic egg-laying indicator out of said chicken coop
to indicate that there is at least one egg inside said automatic egg-collecting teeter-totter;
a draw-ramp opening
having
a top draw-ramp-opening edge and
a bottom draw-ramp-opening edge,
said draw-ramp opening formed in said first roosting wall;

a plurality of draw-ramp hinges
    respectively attached to said first roosting wall along said bottom draw-ramp-opening edge;
a draw ramp
    having
        a first draw-ramp end,
        a second draw-ramp end, and
        a draw-ramp surface,
    said draw ramp pivotably attached to said draw-ramp hinges along said first draw-ramp end;
a draw-ramp cable
    having
        a first cable end and
        a second cable end,
    said draw-ramp cable attached to said second draw-ramp end via said first cable end;
a cable tunnel
    formed through said first roosting wall,
    said draw-ramp cable threaded through said cable tunnel;
a cable ring
    attached to said second cable end;
a cable hook;
a plurality of wire wall panels
    respectively attached to one another, or
    said first roosting wall, or
    said second roosting wall, or
    said third roosting wall, or
    said fourth roosting wall;
a plurality of wire-door-panel hinges
    respectively attached to one of said wire wall panels;
a wire door panel
    pivotably attached to said wire-door-panel hinges;
a latch-tip brace
    attached to said second roosting wall, or
    said second nesting wall, or
    one of said wire wall panels;
a latch-body brace
    attached to said wire door panel;
a C-shaped cut-out
    formed in said latch-body brace;
a latch
    having
        a latch locking position and a latch tip,
    said latch pivotably and slidably attached to said latch-body brace;
a latch lever
    having
        a latch-lever locking position,
    said latch lever molded to said latch;
a spring housing
    molded to said latch-body brace; and
an automatic-relatching twistable compressable spring
    having
        two opposite spring ends,
    said automatic-relatching twistable compressable spring
    attached to said latch at one of said two opposite spring ends and
    attached to said spring housing at another one of said two opposite spring ends,
    said automatic-relatching twistable compressable spring
        for twisting said latch lever back into said latch-lever locking position
            when said latch lever is lifted up out of said latch-lever locking position, and
        for pushing and twisting said latch lever back into said latch-lever locking position when said latch lever is lifted up and slid out of said latch-lever locking position
        to push and twist said latch back into said latch locking position
        to relatch said latch tip inside said latch-tip brace.

20. The egg-teeter-totter animal-shield chicken coop of claim 19,
    said chicken coop
        having
            a chicken-coop inside,
    said chicken coop
    further comprising:
    a wire-strengthening anti-pushing vertical shield
        positioned on said chicken-coop inside against said wire wall panels and said wire door panel;
    a panel-strengthening anti-growing anti-digging horizontal shield
        molded to said wire-strengthening anti-pushing vertical shield, and
        positioned under said wire wall panels or said wire door panel;
    a plurality of wire-panel-coupling hooks
        respectively molded on or formed on said wire-strengthening anti-pushing vertical shield;
    a plurality of panel-raising anti-rotting ridges
        respectively molded on or formed on said wire-strengthening anti-pushing vertical shield and said panel-strengthening anti-growing anti-digging horizontal shield;
    a plurality of water-evaporation-inducing alleys
        respectively formed between said panel-raising anti-rotting ridges; and
    a plurality of water-draining holes
        respectively drilled in or formed in said wire-strengthening anti-pushing vertical shield or said panel-strengthening anti-growing anti-digging horizontal shield,
    wherein
    said wire-strengthening anti-pushing vertical shield is
        for strengthening said wire wall panels and said wire door panel,
        for preventing said wire wall panels and said wire door panel
            from being pushed inward by wild animals, and
        for retaining the designed shape of said chicken coop,
    wherein
    said panel-strengthening anti-growing anti-digging horizontal shield is
        for raising said wire wall panels and said wire door panel above the ground
            to allow water to drain and evaporate and
            to prevent said wire wall panels and said wire door panel from rotting away,
        for preventing wild animals from digging under said wire wall panels and
        said wire door panel into said chicken coop, and
        for preventing grass from growing around and close to said chicken coop,
    wherein
    said wire-panel-coupling hooks respectively are
        for hooking on said wire wall panels and said wire door panel
            to couple said wire-strengthening anti-pushing vertical shield and said panel-strengthening anti-growing anti-digging horizontal shield to said wire wall panels and said wire door panel to strengthen and stabilize said chicken coop,
wherein
said panel-raising anti-rotting ridges respectively are
for raising said wire wall panels and said wire door panel above the ground
to allow water to drain and evaporate
to prevent said wire wall panels and said wire door panel from rotting away,
wherein
said water-evaporation-inducing alleys respectively are
for creating empty space between said panel-raising anti-rotting ridges
to allow water to drain and evaporate
to prevent said wire wall panels and said wire door panel from rotting away,
wherein
said water-draining holes respectively are
for allowing water to drain
to prevent said wire wall panels and said wire door panel from rotting away.

\* \* \* \* \*